United States Patent
Beauchamp et al.

(10) Patent No.: US 11,017,661 B1
(45) Date of Patent: *May 25, 2021

(54) METHOD AND SYSTEM FOR PEDESTRIAN-TO-VEHICLE COLLISION AVOIDANCE BASED ON AMPLIFIED AND REFLECTED WAVELENGTH

(71) Applicant: B&H Licensing Inc., Berkeley, CA (US)

(72) Inventors: Bastien Beauchamp, Montreal (CA); Mikael Girard, Montreal (CA); Jean Francois Viens, Quebec (CA)

(73) Assignee: B&H Licensing Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,659

(22) Filed: Nov. 24, 2020

Related U.S. Application Data

(60) Provisional application No. 62/941,530, filed on Nov. 27, 2019, provisional application No. 62/988,526, (Continued)

(51) Int. Cl.
  *G08G 1/005* (2006.01)
  *G08G 1/16* (2006.01)
  (Continued)

(52) U.S. Cl.
  CPC .............. *G08G 1/005* (2013.01); *G06N 3/08* (2013.01); *G08G 1/166* (2013.01); *H04W 4/023* (2013.01); *H04W 4/025* (2013.01); *H04W 4/44* (2018.02)

(58) Field of Classification Search
  CPC ......... G08G 1/005; G08G 1/166; H04W 4/44; H04W 4/023; H04W 4/025; G06N 3/08
  See application file for complete search history.

(56) References Cited

U.S. PATENT DOCUMENTS 8,700,299 B2 * 4/2014 Morita ............. G08G 1/096716
  701/123
10,365,115 B2 * 7/2019 Nair .................. G01C 21/3492
(Continued)

FOREIGN PATENT DOCUMENTS

CN     102682594 B    6/2014
WO   WO 2019/213763   11/2019

OTHER PUBLICATIONS

International Search Report and Written Opinion received in PCT/US2020/062066, dated Mar. 15, 2021.
(Continued)

*Primary Examiner* — Hussein Elchanti
(74) *Attorney, Agent, or Firm* — Knobbe, Martens, Olson & Bear, LLP

(57) ABSTRACT

Provided are a method and a system for collision avoidance between vulnerable road users (VRUs) and vehicles, notably for pedestrian-to-vehicle (P2V) collision avoidance, in the field of intelligent transportation technology and data analytics distributed among edge and cloud systems. In one aspect, the method and the system for collision avoidance between VRUs and vehicles is further based on a reflected optical signal, wherein VRUs and vehicles are configured to emit and receive a proximity signal pertaining to road usage safety before accidents happen. The method and the system for pedestrian-to-vehicle (P2V) collision avoidance is further based on a reflected optical signal analysis at the edge. The method and system are useful for providing danger notifications pertaining to the field of road safety, and pertaining to collision avoidance before accidents happen.

20 Claims, 34 Drawing Sheets

Related U.S. Application Data filed on Mar. 12, 2020, provisional application No. 63/115,940, filed on Nov. 19, 2020.

(51) Int. Cl.
  *G06N 3/08* (2006.01)
  *H04W 4/02* (2018.01)
  *H04W 4/44* (2018.01)

(56) References Cited

U.S. PATENT DOCUMENTS

| | | | | |
|---|---|---|---|---|
| 2005/0187701 | A1* | 8/2005 | Baney | G08G 1/096716 701/117 |
| 2009/0167561 | A1* | 7/2009 | Liang | G08G 1/0104 340/907 |
| 2009/0287401 | A1* | 11/2009 | Levine | G08G 1/0141 701/117 |
| 2010/0171640 | A1* | 7/2010 | Delia | G08G 1/07 340/907 |
| 2012/0271540 | A1* | 10/2012 | Miksa | B60W 30/12 701/409 |
| 2014/0278074 | A1* | 9/2014 | Annapureddy | G08G 1/0141 701/468 |
| 2014/0336913 | A1* | 11/2014 | Fino | G01C 21/34 701/117 |
| 2015/0084791 | A1 | 3/2015 | Jang | |
| 2015/0145995 | A1* | 5/2015 | Shahraray | H04L 67/12 348/148 |
| 2015/0168169 | A1* | 6/2015 | Caceres | G08G 1/0112 701/537 |
| 2016/0080486 | A1* | 3/2016 | Ram | H04L 12/1822 709/205 |
| 2016/0148507 | A1* | 5/2016 | Pittman | G06Q 30/0255 340/917 |
| 2016/0358463 | A1* | 12/2016 | Cho | G08G 1/04 |
| 2016/0364678 | A1* | 12/2016 | Cao | G06Q 50/30 |
| 2017/0154525 | A1* | 6/2017 | Zou | G08G 1/08 |
| 2017/0285585 | A1 | 10/2017 | Weast et al. | |
| 2018/0075739 | A1* | 3/2018 | Ginsberg | G08G 1/0145 |
| 2018/0090005 | A1 | 3/2018 | Philosof et al. | |
| 2018/0151064 | A1* | 5/2018 | Xu | G08G 1/0116 |
| 2018/0253968 | A1* | 9/2018 | Yalla | G08G 1/097 |
| 2019/0272747 | A1* | 9/2019 | Raamot | G08G 1/0129 |
| 2019/0351896 | A1 | 11/2019 | Solmaz et al. | |

OTHER PUBLICATIONS

International Search Report and Written Opinion received in PCT/US2020/062059, dated Mar. 15, 2021.

* cited by examiner

200

METHOD AND SYSTEM FOR PEDESTRIAN-TO-VEHICLE COLLISION AVOIDANCE BASED ON AMPLIFIED AND REFLECTED WAVELENGTH

RELATED APPLICATIONS

This application claims priority to and the benefit of Provisional Application Nos. 62/941,530 filed on Nov. 27, 2019, 62/988,526 filed on Mar. 12, 2020, and 63/115,940 filed on Nov. 19, 2020 in the U.S. Patent and Trademark Office, the entire contents of each of which are incorporated herein by reference.

BACKGROUND

Technical Field

The described technology relates to the field of road safety. More specifically, the described technology relates to a method and a system for collision avoidance between vulnerable road users (VRUs) and vehicles based on reflected optical signal, wherein VRUs and vehicles are configured to emit and receive a proximity signal pertaining to road usage safety before accidents happen. More specifically, the described technology relates to a method and a system for pedestrian-to-vehicle (P2V) collision avoidance.

Description of the Related Technology

Vehicle based technologies detect pedestrians (V2P, V2X; vehicle to pedestrian, vehicle to everything), using technologies such as, but not limited to, radar, lidar, sonar, ultrasonic, radio-frequency identification (RFID) sensor, and camera (e.g., existing sensors). Most vehicle based systems may detect pedestrians in most cases but some cases are problematic (e.g., distance, turn of a corner, obstruction of sensor view, difficult weather, and/or view conditions). Sensors also face resolution and computational power problems.

There is still a need for a method and system for pedestrian-to-vehicle collision avoidance (P2V).

Each year, about 1.35 million people die from vehicle-related accidents, and more than half of these victims are "vulnerable road users" (VRUs) (e.g., pedestrians, bicyclists, motorcyclists). As autonomous vehicles become an increasing presence on roadways, there is growing concern about how everyone will share the road safely.

Various attempts to improve the convenience and safety of vulnerable road users have been made by static systems (such as pedestrian crosswalk markings, flashing traffic panels, etc.), or by dynamic systems (such as sensors for detecting pedestrians and assigning warning messages to traffic controllers, etc.), or by mobile systems (such as mobile communication systems to locate and track traffic violators as judged by the motion trail of the mobile terminal, etc.). a related preceding technology is disclosed in US Patent Application Publication No. 2015/0084791 A1 (entitled 'APPARATUS AND METHOD FOR MANAGING SAFETY OF PEDESTRIAN AT CROSSWALK'). This static system technology is for managing the safety of a pedestrian at a crosswalk, which determines the location of a pedestrian in a crosswalk area, and then selectively provides a pedestrian signal extension service, an approaching vehicle notification service, and a pedestrian danger notification service for respective dangerous situations of a pedestrian in connection with the time of a pedestrian signal. However, in this disclosure, no detection units are provided for detecting jaywalkers distant from the pedestrian crosswalk area, and no predicted trajectories are provided to let VRUs and vehicles react with sufficient lead time.

Another preceding technology is disclosed in US Patent Application Publication No. 2017/0285585 A1 (entitled "TECHNOLOGIES FOR RESOLVING MORAL CONFLICTS DURING AUTONOMOUS OPERATION OF A MACHINE"). This mobile system technology relates to a computer system configured to detect a moral conflict related to the operation of a machine, such as an autonomous vehicle, and determine operational choices for operation of the machine to resolve the moral conflict pertaining to the safety of vulnerable road users. However, in this disclosure, no detection units are provided for detecting jaywalkers, especially jaywalkers not readily detectable by lidar, radar or video systems integrated within automated driving systems (ADS) technology, and no predicted trajectories are provided to let VRUs and vehicles react sufficiently ahead of time.

Another preceding technology is disclosed in Chinese publication No. CN102682594B (entitled "Method and system for monitoring pedestrian violation based on mobile communication"). This mobile system technology relates to a mobile communication systems to locate and track traffic violators as judged by the motion trail of the mobile terminal, wherein the mobile communication system is being utilized to manage or punish violators. However, jaywalking laws vary widely by jurisdiction and the fault/no fault ascertainment provided by this disclosure cannot be made within other regulatory frameworks especially since the GSM/CDMA/LTE mobile terminal triangulation tracking technique does not exhibit sufficient spatial resolution in most sub-urban areas as to ascertain jaywalking detection, and is of no legal use as to ascertain traffic law violation by a specific person. Also, no predicted trajectories are provided to let VRUs and vehicles react sufficiently ahead of time.

SUMMARY OF CERTAIN INVENTIVE ASPECTS

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Inventive Embodiments," one will understand how the features of the embodiments described herein provide advantages over existing systems and methods for collision avoidance between vulnerable road users and vehicles.

One inventive aspect is a method and system for detecting a VRU device such as smartphone, beacon, chip, credit card, clothing, apparel and/or IoTs, by emitting or by reflection amplifying wavelengths, with any or all sensors present on the vehicle, or in infrastructures communicating with the vehicle; directly through sensors capabilities on the vehicle, or indirectly through infrastructures' sensors communicating with vehicle (with capabilities such as Wifi, dedicated short-range communications (DSRC), cellular V2X (C-V2X) or telecommunications systems (such as 3G, LTE, 4G, 5G, satellite) so that the vehicles receive an alert and become fully aware of when to slow down and apply brakes to prevent accidents before they happen.

Another aspect is a method and system for detecting a VRU passing, crossing or starting to cross a cross-walk or jaywalking so that nearby vehicles with sensors, connected cars or autonomous vehicles receive an alert and become fully aware of when to slow down and apply brakes to prevent accidents before they happen.

Another aspect is a VRU device for avoiding or mitigating collision between a VRU and a nearby vehicle, wherein the VRU device emits wavelengths to the nearby vehicle so that when the nearby vehicle receives the emitted wavelengths from the VRU device, it can apply brakes and slow down to avoid or mitigate collision between the VRU and the nearby vehicle.

Another aspect is an infrastructure device for avoiding or mitigating collision between a VRU and a nearby vehicle, wherein the infrastructure device receives wavelengths emitted from a VRU device and relays the received wavelengths to the nearby vehicle so that when the nearby vehicle receives the wavelengths from the infrastructure device, it can apply brakes and slow down to avoid or mitigate collision between the vehicle and the VRU.

Another aspect is a vehicle for avoiding or mitigating collision with a VRU, wherein the vehicle receives wavelengths emitted from a VRU device so that when the vehicle receives the wavelengths from the VRU device, it can apply brakes and slow down to avoid or mitigate collision between the vehicle and the VRU.

Another aspect is a VRU device for avoiding or mitigating collision between a VRU and a nearby vehicle, wherein the VRU device is coupled to the VRU or VRU's transportation device such as a wheelchair, a scooter, a bicycle, a motorcycle or other individual transportation device, wherein the VRU device receives wavelengths transmitted from the nearby vehicle and reflects and amplifies the received wavelengths, and directs the amplified wavelengths back to the nearby vehicle, so that when the nearby vehicle receives the amplified wavelengths from the VRU device, it can apply brakes and slow down to avoid or mitigate collision between the vehicle and the VRU.

Another aspect is an infrastructure device for avoiding or mitigating collision between a VRU and a nearby vehicle, wherein the infrastructure device receives wavelengths reflected from and amplified by a VRU device coupled to the VRU or the VRU's transportation device, and relays the received wavelengths to the vehicle so that when the nearby vehicle receives the wavelengths from the infrastructure device, it can apply brakes and slow down to avoid or mitigate collision between the vehicle and the VRU.

Another aspect is a vehicle for avoiding or mitigating collision with a VRU, wherein the vehicle receives wavelengths reflected from and amplified by a VRU device coupled to the VRU or the VRU's transportation device so that when the vehicle receives the amplified wavelengths from the VRU device, it can apply brakes and slow down to avoid or mitigate collision between the vehicle and the VRU.

One inventive aspect is to minimize the risks of accidents between VRUs and vehicles: cars and trucks, buses, autonomous vehicles, construction equipment, drones, etc.

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Inventive Embodiments," one will understand how the features of the embodiments described herein provide advantages over existing systems and methods for collision avoidance between VRUs and vehicles.

One inventive aspect of the present disclosure is a method for collision avoidance between vulnerable road users (VRUs) and vehicles, the method comprising: linking, to a plurality of vehicles, Long-Term Evolution (LTE)-capable user equipment (UE) terminals exhibiting international mobile subscriber identity (IMSI); and linking, to a plurality of VRUs, LTE-capable UE terminals exhibiting IMSI; and linking, to a plurality of VRUs, non-Lambertian reflecting surfaces; and first interrogating, at a communications server, the predicted spatiotemporal trajectory of any one of each the UE terminals, wherein first interrogating comprises the steps of receiving past and current spatiotemporal trajectory data from one or more sensors associated with any one of each the UE terminals, and storing the past and current spatiotemporal trajectory of any one of each the UE terminals, and computing the predicted spatiotemporal trajectory of each the UE terminals, wherein the communications server comprises a computing device and a first embedded algorithm for spatiotemporal trajectory prediction, and first determining whether the spatiotemporal distance between any one of the UE terminals is within a proximity range, and obtaining a communications server notification if the first determining relates a UE terminal belonging to a vehicle and a UE terminal belonging to a VRU, and tagging these two UE terminals as notified UE terminals; and second interrogating the predicted spatiotemporal proximity, wherein second interrogating comprises the steps of acknowledging the communications server notification, and activating a first proximity signal including a modulated optical emission, and activating a second proximity signal including a radio-frequency emission, and computing the predicted spatiotemporal proximity based on first and second proximity signals, wherein the notified UE terminal belonging to a vehicle comprise a processor device and a second embedded algorithm for spatiotemporal proximity prediction, and second determining whether the predicted spatiotemporal proximity is within a proximity threshold limit, and third determining whether the rate of approaching of the predicted spatiotemporal proximity is increasing, and setting a provision of danger notification pertaining to road usage safety based on first, second and third determining.

Another inventive aspect of the present disclosure is a system for collision avoidance between VRUs and vehicles, the system comprising: a plurality of vehicles linked to LTE-capable UE terminals exhibiting IMSI; and a plurality of VRUs linked to LTE-capable UE terminals exhibiting IMSI, and linked to non-Lambertian reflecting surfaces; and a communications server device configured to predict the spatiotemporal trajectory of any one of the UE terminals, and to receive past and current spatiotemporal trajectory data from one or more sensors associated with any one of the UE terminals, and to store past and current spatiotemporal trajectory of any one of the UE terminals, and to compute the predicted spatiotemporal trajectory of the UE terminals, wherein the communications server comprises a computing device and a first embedded algorithm for spatiotemporal trajectory prediction, and to first determine whether the spatiotemporal distance between any one of the UE terminals is within a proximity range; and to obtain a communications server notification if the first determining relates a UE terminal belonging to a vehicle and a UE terminal belonging to a VRU, and to tag these two UE terminals as notified UE terminals; and wherein each of the notified UE terminals is configured to determine their relative spatiotemporal proximity, and to acknowledge the communications server notification, and to activate a first proximity signal including a modulated optical emission, and to activate a second proximity signal including a radio-frequency emission, and to compute the predicted spatiotemporal proximity using a processor device and a second embedded algorithm for spatiotemporal proximity prediction, and to second determine whether the predicted spatiotemporal proximity between the notified UE terminals is within a proximity threshold limit, and to third determine whether the rate of approaching of the predicted spatiotemporal proximity between the notified UE terminals is increasing, and to set a provision of danger notification pertaining to road usage safety based on first, second and third determining.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system for collision avoidance between VRUs and vehicles, and any aspect of a system for collision avoidance between VRUs and vehicles can be configured to perform a method of another aspect. Furthermore, any aspect of a method can comprise another aspect of at least one of a cloud, a server, an infrastructure device, a vehicle, a VRU terminal or a vehicle terminal, and any aspect of a cloud, a server, an infrastructure device, a vehicle, a VRU terminal or a vehicle terminal can be configured to perform a method of another aspect.

DETAILED DESCRIPTION OF CERTAIN INVENTIVE EMBODIMENTS

A method and a system for pedestrian-to-vehicle (P2V) collision avoidance, in the field of intelligent transportation technology and data analytics with an artificial intelligence (AI) algorithm embedded in a user equipment (UE) terminal (hereinafter to be interchangeably used with a VRU device, user device, user terminal, VRU terminal, or VRU equipment) aiming at pedestrian-to-vehicle (P2V) collision avoidance, will now be described by the following non-limiting examples.

Figure 1A:
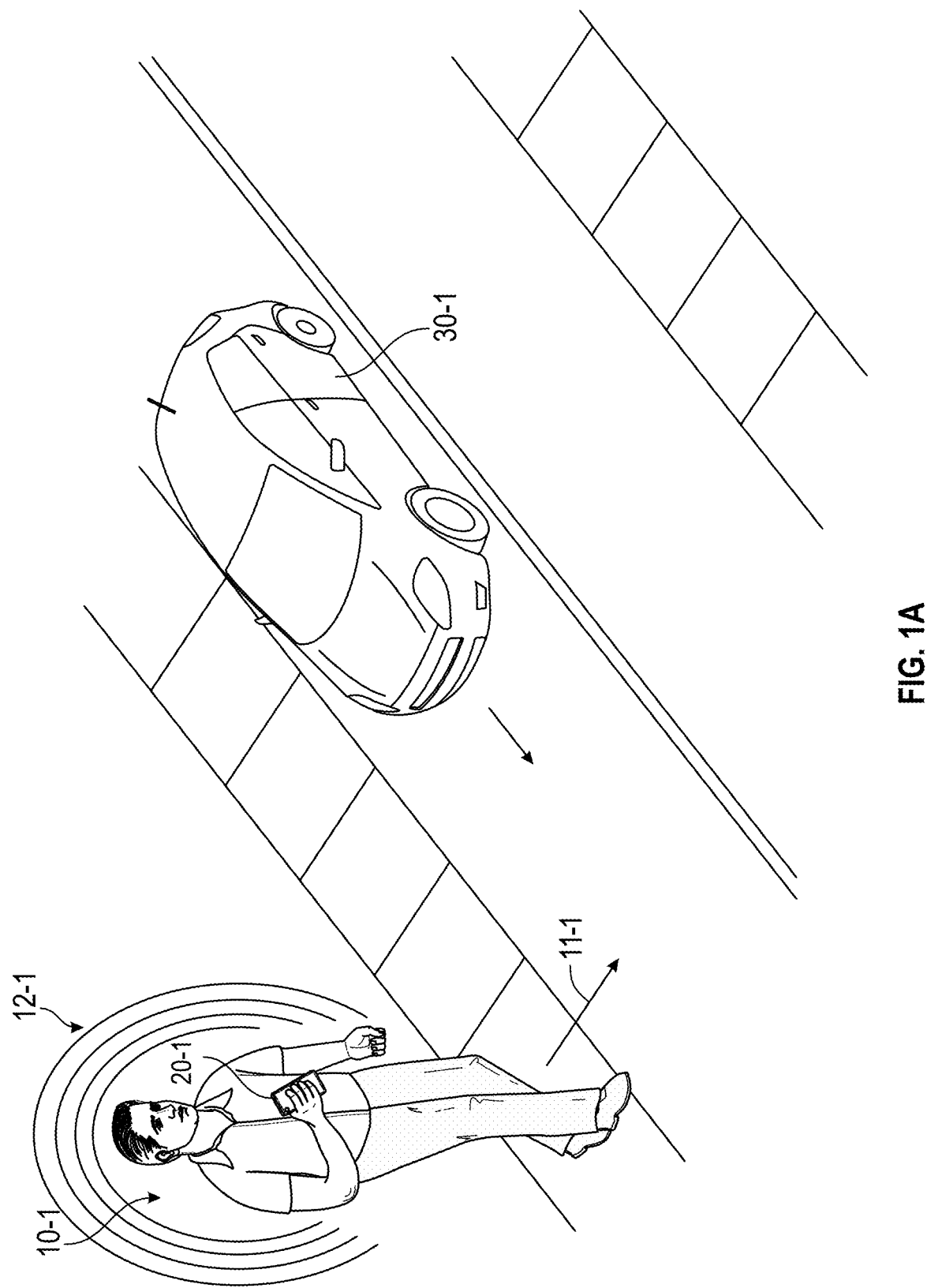
FIGS. 1A-1C includes drawings of aspects of this disclosure.
Figure 1B:
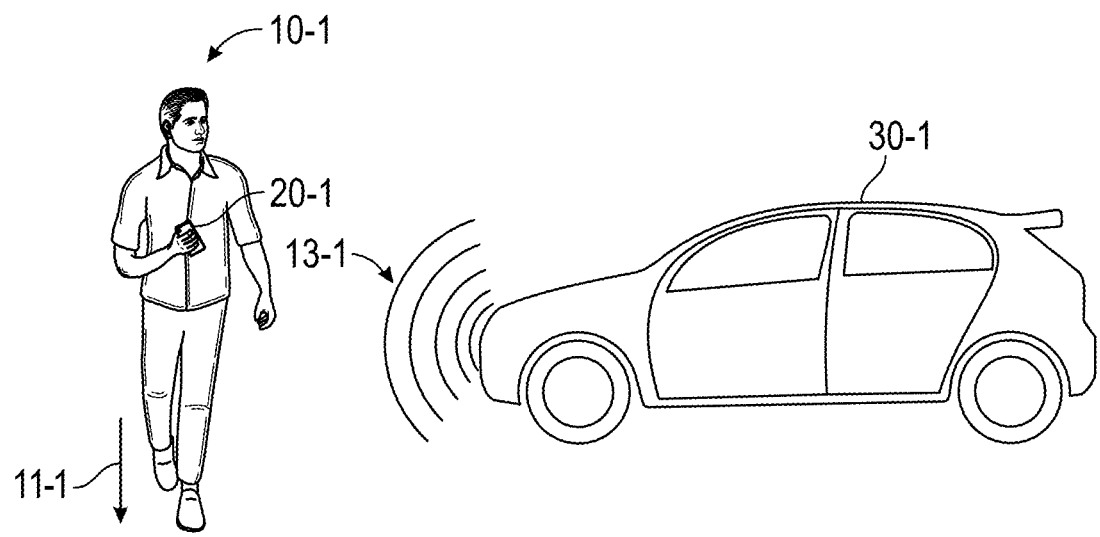
Figure 1C:
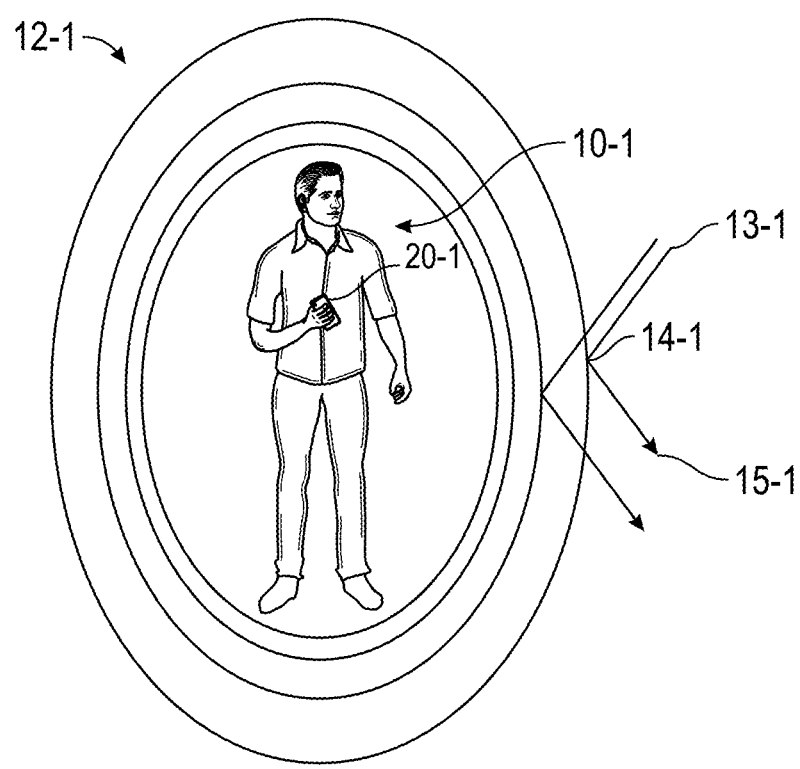

Pedestrian-To-Vehicle Collision Avoidance Based On Emitted Wavelength and Reflected and Amplified Wavelength FIGS. 1A-1C show a method and system for detecting, for example, using a beacon signal 12-1, a pedestrian, a pedestrian's pet or pedestrian's transportation device such as a bicycle, a motorcycle, a wheelchair, a scooter, etc. (hereinafter to be interchangeably used with VRU 10-1) crossing or starting to cross a cross-walk or jaywalking as illustrated by arrow 11-1 in FIGS. 1A and 1B, so that nearby vehicles 30-1 with sensors (e.g., connected cars or autonomous vehicles) become fully aware of when to slow down, apply brakes if need be to prevent accidents before they happen. In some embodiments, the beacon signal 12-1 or wavelength may be transmitted from a VRU device 20-1 (e.g., a smartphone) to a nearby vehicle 30-1 so that the nearby vehicle 30-1 receives the transmitted wavelengths 12-1 from the VRU device 20-1 and apply brakes and slow down to avoid or mitigate collision between the vehicle 30-1 and the VRU 10-1. In these embodiments, potential collision can be avoided or mitigated even if a typical pre-collision braking system of the vehicle 30-1 does not detect a nearby VRU 10-1.

In other embodiments, as shown in FIG. 1C, the beacon signal or wavelength 13-1 may be received from a nearby vehicle 30-1, reflected and amplified 14-1, and directed 15-1 by a VRU device 20-1 back to the vehicle 30-1 so that the nearby vehicle 30-1 receives the amplified wavelengths 15-1 from the VRU device 20-1, it can apply brakes and slow down to avoid or mitigate collision between the vehicle 30-1 and the VRU 10-1. In these embodiments, potential collision (s) can be avoided or mitigated even if an initial beacon signal 13-1 transmitted from a vehicle 30-1 or a reflected signal 15-1 thereby is not strong enough to be detected by the vehicle 30-1.

Figure 2:
FIG. 2 represents a street corner scenario including streets and sidewalks.
Figure 2:

FIG. 2 represents a street corner scenario including streets 200 and sidewalks 100. Vehicles travel only on the streets 200 whereas VRUs 10-1 having a device 20-1 (see FIG. 3) may travel on the sidewalks 100 and on the streets 200. One or more infrastructure devices 50-1 (see FIG. 3) may be disposed at the sidewalks 100.

Figure 3:
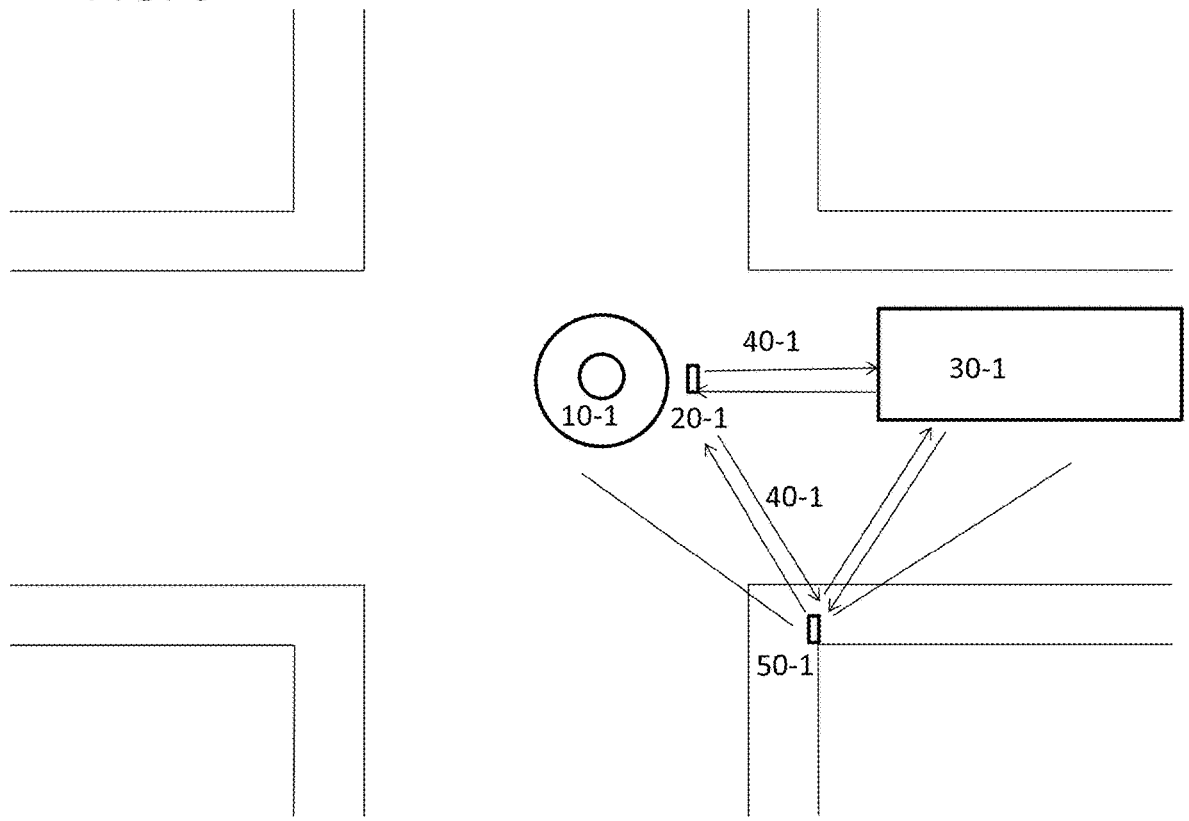
FIG. 3 is a schematic view of a system according to an embodiment of an aspect of the described technology.

FIG. 3 illustrates a method for pedestrian-to-vehicle collision avoidance (P2V) in accordance with the described technology. In some embodiments, the method includes associating (e.g., physically linking) at least one vehicle to at least one device 20-1 (e.g., smartphone, IoT, credit card, fabric, etc.) with emitting or reflective capability in the wave spectrum of radar, sonar, lidar, ultrasonic, camera, RFID, etc. in order to detect (40-1) directly the vehicle 30-1 (e.g., a car, a truck, a drone, or any other vehicle) or indirectly (through infrastructure) a VRU 10-1 such as pedestrian, a wheelchair, a bike, an electric scooter, a motorcycle. As non-limiting examples, detection of wave lengths from cameras are generally in the range of about 350 nm to about 1000 nm, lidars about 10 micrometers (infrared) to approximately 250 nm (UV), radars about 0.8 centimeters (cm) to 10.0 cm, sonars about 0.15 m to about 100 m, ultrasonics about 1.9 cm or less, WiFi about 12.5 cm, RFID from a few cm to a meter or so. These ranges are merely examples, and other ranges also possible. Detection can occur through the vehicle 30-1 or through infrastructure devices 50-1, sonar, lidar, camera, radar, or other detection technologies, so called pedestrian-to-infrastructure (P2I), such infrastructure equipment is linked or otherwise operatively coupled to the vehicle using, for example, dedicated short-range communications (DSRC) and cellular vehicle to everting (C-V2X) communication, or another communications technology (e.g., long-term evolution (LTE), 4G, 5G, global positioning system (GPS), etc.). Some embodiments may associate at least one VRU 10-1 to at least one LTE-capable other wireless telecommunication user equipment (UE) terminal 20-1 (e.g., with a physical link) in infrastructures 50-1. Some embodiments may determine a spatiotemporal positioning of each terminal determined directly to the vehicle 30-1 using the existing sensors or from a wireless communication signals (e.g., LTE cellular radio signals) mediated by at least three wireless communications base stations (e.g., LTE cellular base stations (BS)) and at least one location service client (LCS) server, firmware or software. The at least one LCS server may include an embedded AI algorithm comprising, but not limited to, a recurrent neural network (RNN) algorithm to analyze the spatiotemporal positioning of the terminals and determine a likely future trajectory of the at least one vehicle 30-1 and the at least one VRU 10-1 so as to maximize a reward metric based on reinforcement learning (RL) analysis. The at least one LCS server may communicate the likely future trajectory of the at least one vehicle 30-1 and the at least one VRU 10-1 to the at least one terminal 20-1 associated with the at least one pedestrian; the at least one terminal 20-1 associated with the at least one VRU including an embedded AI algorithm comprising, for example, a conditional random fields (CRFs) algorithm to determine if the likely future trajectory of the at least one VRU 10-1 is below a pedestrian-to-vehicle proximity threshold limit. If the proximity threshold limit is reached, the terminal 20-1 associated either with the at least one VRU 10-1, with infrastructures 50-1, or with the vehicle 30-1, communicates a collision-avoidance emergency signal to the at least one VRU 10-1 and to the at least one vehicle 30-1 that meet the proximity threshold limit.

Referring back to FIG. 3, pedestrian-to-vehicle (P2V) collision avoidance involves at least one vehicle 30-1 (V) and at least one pedestrian 10-1 (P). Each pedestrian (e.g.: VRU) can be associated with (e.g., physically linked to at least one wave length emitting or reflective capability user equipment (UE) terminal 20-1 that can or not be wireless telecommunications-capable (e.g., LTE-capable). Although aspects of this disclosure are not limited to an embodiment in which a pedestrian is physically linked to an LTE-capable user equipment terminal, embodiments of this disclosure will be described in connection with these embodiments for the ease of description. However, those skilled in the art will recognize that other wireless telecommunications networks (e.g., 3G, 4G, 5G, etc.) and other techniques for associating the user equipment terminal with the user (e.g., the user may hold the user equipment terminal, place the user equipment terminal in the user's pocket or a bag, etc.) Each vehicle 30-1 may be associated with (e.g., physically linked or otherwise operatively coupled) to at least one wireless telecommunications-capable (e.g., LTE-capable) user equipment (UE) terminal and/or has existing sensors. As used herein, the term 'physically linked' can refer to a proximal combination, or association, or attachment, or coupling between a device (e.g., the LTE-capable user equipment) and a pedestrian, a vehicle, or another object. For example, a LTE-capable user equipment (UE) terminal may be physically linked to one pedestrian, such as a mobile phone, inserted in the pocket of a pedestrian, or may be physically linked to one vehicle, such as a mobile phone secured on the dash board of a vehicle.

The spatiotemporal positioning of each user equipment (UE) terminal 20-1 may be determined from infrastructure or vehicle based sensors algorithms or from LTE cellular radio signals mediated by LTE cellular base stations (BS) and an LCS server. Signals from at least three cellular base stations (BS) may be used in order to use a triangulation method to determine the exact position of each user equipment (UE) terminal for positioning the exact position of each user equipment (UE) terminal by triangulation for instance.

The spatiotemporal positioning of each user equipment (UE) terminal may also be determined by the emitting or reflecting capability of the device for existing sensors in the vehicle or the infrastructure.

The LCS server may include a first embedded AI algorithm (AI-1), comprising, for example, an RNN) algorithm to analyze the spatiotemporal positioning of the terminals of the pedestrian 10-1 and the terminals of the vehicle 30-1 and determine a likely future trajectory of the pedestrian 10-1 and of the vehicle 30-1 so as to maximize a reward metric based on RL analysis. As used herein, the term "reward metric" can refer to the goal of minimizing the pedestrian-to-vehicle collision probability such that the AI algorithm determines the best scenario for maximizing the pedestrian-to-vehicle collision avoidance probability. The LCS server may communicate the likely future trajectory of the participants to the terminals physically linked to the pedestrian (P).

The terminals physically linked to the pedestrian (P) may include a second embedded A algorithm (AI-2) comprising, for example, a CRFs algorithm to determine if the likely future trajectory of the pedestrian 10-1 is below a pedestrian-to-vehicle (P2V) proximity threshold limit and, if this condition is met, the terminals physically linked to the pedestrian (P) may communicate a collision-avoidance emergency signal to the pedestrian 10-1 and to the vehicle 30-1 that meet the proximity threshold limit.

Similarly, the LCS server may communicate the likely future trajectory of the participants to the terminals physically linked to the vehicle 30-1. The terminals physically linked to the vehicle (V) may include the second embedded AI algorithm (AI-2) to determine if the likely future trajectory of the vehicle 30-1 is below a vehicle-to-pedestrian (V2P) proximity threshold limit and, if this condition is met, the terminals physically linked to the vehicle (V) communicate a collision-avoidance emergency signal to the to the pedestrian 10-1 and to the vehicle 30-1 that meet the proximity threshold limit.

The pedestrian-to-vehicle (P2V) proximity threshold limit between the participants can also take into account position, speed, acceleration or deceleration, direction and likely future trajectories of the participants in order to determine a dimensional safety margin for establishing proper collision avoidance measures, and in some embodiments is of at most 10 meters, for example at most 5 meters, for example at most 1 meter. Again, these numbers are merely examples and other numbers are also possible.

If the signals from at least three base stations (BS) are received, triangulation techniques may be applied to the received signal level (RSSI) technique, to the time difference of arrival (TDOA) technique, or to the angle of arrival (AOA) technique, or to a combination thereof, to determine the exact position of the user equipment (UE) terminal, since the positions of the base stations (BS) are known to a high level of accuracy. The UE terminal position may be determined by a combination of enhanced cell identity (E-CID), assisted global navigation satellite systems (GNSS) information from the UE, received signal level (RSSI) technique, time difference of arrival (TDOA) technique, or angle of arrival (AOA) technique.

The LTE may use 5G NR new radio access technology (RAT) developed by 3GPP for the 5G (fifth generation) mobile network. Communications between UE, infrastructure and vehicle, can use as well WiFi, DSRC, C-V2X, Bluetooth, RFID and other communication technologies.

The UE terminals as described herein may include, but are not limited to, a mobile phone, a wearable device, an Internet of Things (IoT) device, any other LTE-capable device connected to the telecommunications networks, any emission or reflective capable device by color, form, material, element, compound, chip, or any combination thereof. The UE terminals may comprise an application, a software, a firmware, a hardware or a device in order to store and activate the second embedded A algorithm (AI-2).

The second AI algorithm (AI-2) embedded within the UE terminals may comprise an RNN algorithm, or an RL algorithm, or a CRFs algorithm, or a machine learning (ML) algorithm, or a deep learning (DL) algorithm, or any other AI algorithm, or a combination thereof. An RNN is a class of artificial neural network where connections between nodes form a directed graph along a temporal sequence. This allows the neural network to exhibit temporal dynamic behavior in which the spatiotemporal coordinates of a participant is denoted by a matrix $X=(x,y,z,t)$. RL is an area of machine learning concerned with how participants ought to take actions in an environment so as to maximize some notion of cumulative reward. CRFs are a class of statistical modeling method often applied in pattern recognition and machine learning and used for structured prediction.

The first AI algorithm (AI-1) embedded within the LCS server may comprise an RNN algorithm, or an RL algorithm, or a CRFs algorithm, or an ML algorithm, or a DL algorithm, or any other A algorithm, or a combination thereof.

The AI algorithms may be used to predict the likely trajectory of participants based on small spatiotemporal data sets as well as large spatiotemporal data sets. A spatiotemporal trajectory model may be defined as a set of spatiotemporal points X=(x,y,z,t) of a participant moving along a trajectory represented by its geolocation coordinates in space and time (sequential datasets of participant, time and location). The data sets may also be spatiotemporal geolocation data that may comprise other types of data not classified as spatiotemporal points, such as image data or audio data or other types of data. In order to process sequential datasets, neural networks of deep learning (e.g., RNN) algorithms may be used. RNNs have been developed mostly to address sequential or time-series problems such as a sensor's stream data sets of various length. Also, Long Short Term Memory (LSTM) algorithms may be used, which mimics the memory to address the shortcomings of RNN due the vanishing gradient problems, preventing the weight (of a given variable input) from changing its value. RNN is an artificial neural network with hidden layer $h_t$, referring to a recurrent state and representing a "memory" of the network through time. The RNN algorithm may use its "memory" to process sequences of inputs $x_t$. At each time step t, the recurrent state updates itself using the input variables $x_t$ and its recurrent state at the previous time step $h_{t-1}$, in the form: $h_t=f(x_t,h_{t-1})$. The function f(xt,ht−1) in turn is equal to $g(W\psi(x_t)+Uh_{t-1}+bh)$, where $\psi(x_t)$ is the function which transforms a discrete variable into a continuous representation, while W and U are shared parameters (matrices) of the model through all time steps that encode how much importance is given to the current datum and to the previous recurrent state. Variable b is a bias, if any. Whereas neural networks of deep learning models require large data sets to learn and predict the trajectory of a participant, conditional Random Fields (RFs) may be used for the same purpose for smaller data sets. RFs may be better suited for small datasets and may be used in combination with RNN. Models with small datasets may use Reinforcement learning algorithms when trajectory predictions consider only nearest spatiotemporal geolocation data.

The AI algorithms may be used to predict the likely trajectory of participants based on expanded spatiotemporal data sets and other type of data sets, which may relate to the trajectory intent of the vehicle or the pedestrian, including spatiotemporal velocity and acceleration data sets that determine spatiotemporal change of position (dx/dt, dy/dt, dz/dt, $d^2x/dt^2$, $d^2y/dt^2$, $d^2z/dt^2$), spatiotemporal angular, or gyroscopic, data sets that determine spatiotemporal orientation and change of orientation ($\theta_x$, $\theta_y$, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$), or other spatiotemporal data sets or a combination thereof. A spatiotemporal trajectory model may be defined as a set of spatiotemporal points X=(x, y, z, t) or a set of expanded spatiotemporal points X=(x, y, z, t, dx/dt, dy/dt, dz/dt, $d^2x/dt^2$, $d^2y/dt^2$, $d^2z/dt^2$, $\theta_x$, $\theta_y$, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$) of a participant moving along a trajectory represented by its geolocation, velocity, and gyroscopic coordinates in three-dimensional space and time. The RNN algorithm may use its "memory" to process sequences of inputs=(x, y, z, t, dx/dt, dy/dt, dz/dt, $d^2x/dt^2$, $d^2y/dt^2$, $d^2z/dt^2$, dz/dt, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$). At each time step t, the recurrent state updates itself using the input variables $x_t$ and its recurrent state at the previous time step $h_{t-1}$ in the form: $h_t=f(x_t,h_{t-1})$.

The AI algorithm embedded in the UE terminals or in the infrastructure terminals may be specific to terminals physically linked to a vehicle (V), or to terminals physically linked to a pedestrian (P), or to a LCS server of any kind. For example, the UE terminals physically linked to a vehicle (V) or to a pedestrian (P) may comprise a computational unit or processor (hardware, software or middleware) for processing an AI algorithm, the computational unit being one of: a mobile application, a software, a firmware, a hardware, a physical device, and a computing device, or a combination thereof. The AI algorithm may use different algorithmic codes in order to provide specific results for different UE terminals, or to provide specific results for different end users, who may be related to the automobile sector, or to the cell phone sector, or to the telecommunications sector, or to the transportation sector, or to any other sectors. End users may include automobile OEMs, or cell phone applications providers, or mobile telephony providers, or any other end users.

The UE terminals may be physically linked to vehicles including autonomous vehicles, non-autonomous vehicles, self-driving vehicles, off-road vehicles, trucks, manufacturing vehicles, industrial vehicles, safety & security vehicles, electric vehicles, low-altitude airplanes, helicopters, drones (UAVs), boats, or any other types of automotive, aerial, or naval vehicles with some proximity to pedestrians such as encountered in urban, industry, airport, or naval environments. The UE terminals physically linked to vehicles may comprise a computational unit or processor for processing an AI algorithm, the computational unit being one of: a mobile application, a software, a firmware, a hardware, a physical device, a computing device, any reflective capable device by color, form, material or a combination thereof, which may be connected to the second AI algorithm (AI-2) to determine if the likely future trajectory of the vehicles is below a vehicle-to-pedestrian (V2P) proximity threshold limit and, if this condition is met, to communicate a collision-avoidance emergency signal. The signal may take the form of a direct actuation on the vehicle, including changing the direction of the vehicle (e.g., course correction), or changing the speed of the vehicle (e.g., applying brakes), or sending a signal to the pedestrian (e.g., visual or audio signaling), or any other actuation measures by direct action on the vehicle's controls for collision avoidance. For example, the collision-avoidance emergency signal comprises a decision process for enabling at least one of: changing the direction of the vehicle; changing the speed of the vehicle; and sending a signal to the at least one pedestrian.

The UE terminals physically linked to vehicles may receive geolocation or wave reflections or emission inputs from other types of sensors including for example any one of global navigation satellite systems (GNSS) (or GPS), camera, sonar, lidar, radar, RFID, accelerometry, inertial, or gyroscopic sensors, or any other sensors or a combination thereof. The first AI algorithm (AI-1) may weight or prioritize LTE inputs, or GPS inputs, or camera inputs, or sonar inputs, or lidar inputs, or radar inputs, or accelerometry inputs, or gyroscopic inputs depending on the accuracy or reliability of each inputs. The position of the UE terminals physically linked to vehicles may be determined by other types of sensors embedded in the terminals including any one of global navigation satellite systems (GNSS), camera, sonar, lidar, radar, accelerometry, or gyroscopic sensors, or any other sensors or a combination thereof.

The UE terminals may be physically linked to pedestrians including sidewalk pedestrians, on-road pedestrians, intersection pedestrians, construction workers, manufacturing workers, safety & security workers, airport workers, naval workers, wheelchair users, bicycle drivers, pets, or any other types of pedestrians. The UE terminals physically linked to pedestrians may comprise an application, a software, a firmware, a hardware or a physical or computing device, which may be connected to the A algorithm (AI-2) to determine if the likely future trajectory of the pedestrians is below a vehicle-to-pedestrian (V2P) proximity threshold limit and, if this condition is met, to communicate a collision-avoidance emergency signal. The signal may take the form of a direct actuation on the vehicle meeting the proximity threshold limit, including changing the direction of the vehicle (e.g. course correction), or changing the speed of the vehicle (e.g. applying brakes), or sending a signal to the pedestrian (e.g. visual or audio signaling), or any other actuation measures by direct action on the vehicle's controls for collision avoidance, or a combination thereof.

The UE terminals physically linked to pedestrians may receive geolocation input from other types of sensors including for example any one of GPS, camera, sonar, lidar, radar, accelerometry, inertial, or gyroscopic sensors, or any other sensors or a combination thereof from vehicles or infrastructures. The AI algorithm may weight or prioritize LTE inputs, or GPS inputs, or camera inputs, or sonar inputs, or lidar inputs, or radar inputs, or accelerometry inputs, or gyroscopic inputs depending on the accuracy or reliability of each inputs. The position of the UE terminals physically linked to pedestrians may be determined by other types of sensors embedded in the terminals including any one of global navigation satellite systems (GNSS), camera, sonar, lidar, radar, RFID, accelerometry, or gyroscopic sensors, or any other sensors or a combination thereof.

Figure 4:
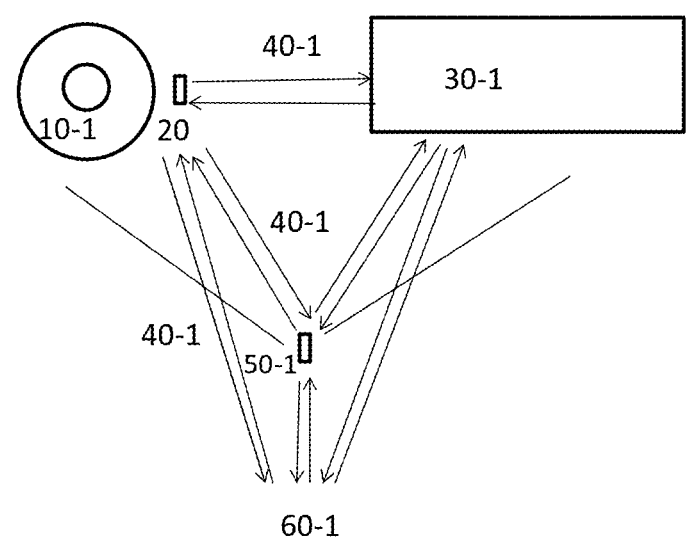
FIG. 4 is a schematic view of a system according to an embodiment of an aspect of the described technology where communication between the VRU's device and the vehicle's sensors.

FIG. 4 is a schematic view of a system according to an embodiment of the described technology. Referring to FIG. 4, communication between the VRU device 20-1 and sensors of the vehicle 30-1 happens through reflection of signal or direct signal emission through any wavelength range used by vehicle's sensors (such as cameras, lidars, radars, sonars, RFID, ultrasonic, WiFi, Bluetooth) (40-1), or indirectly through an infrastructure device 50-1 communicating with the vehicle 30-1 via a fog or cloud 60-1 through LTE, 4G, 5G or another wireless telecommunications technology.

Figure 5A:
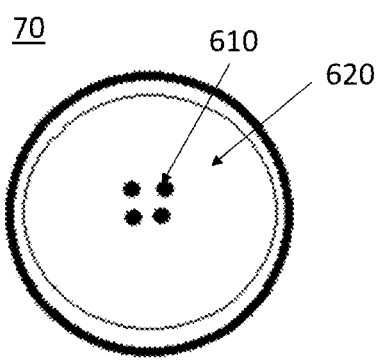
FIGS. 5A-5C are an embodiment of an aspect of the described technology showing a reflector device.
Figure 5B:
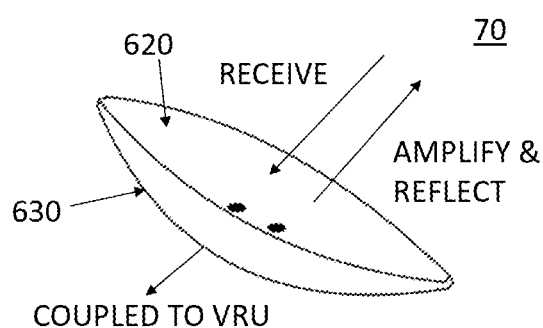
Figure 5C:
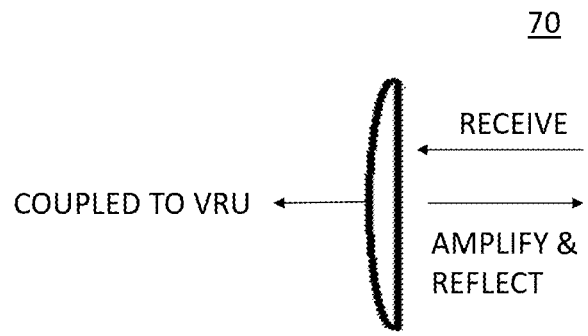

FIGS. 5A-5C illustrate a VRU reflector device 70 for reflecting and amplifying (or amplifying and reflecting) wavelengths received from a vehicle according to some embodiments. The reflector device 70 may have an inwardly curved or concave shape as shown in FIGS. 5A-5C. For example, the VRU reflector device 70 may have a lens shape, a concave reflector shape, or a cross-section of the VRU device 70 may have a semicircular shape. However, the VRU reflector device 70 may have other shapes, for example, shaped in a non-linear manner such as a parabolic cross-sectional shape.

The VRU reflector device 70 may be formed of metal or other material (hard wood or plastic, stone, etc.) that can reflect and amplify a received signal. The VRU reflector device 70 can reflect wavelengths from radar, sonar, ultrasonic and lidar to help a pedestrian become more visible from vehicles and drones. The VRU reflector device 70 may have a button form and can easily be implemented on a device (e.g., the above described VRU device 20-1), a piece of clothing, an accessory, etc. The VRU reflector device 70 may have one or more openings via which the VRU reflector device 70 is connected to or attached to a VRU or VRU's belongings. For example, the VRU reflector device 70 may be connected to a button of a VRU's clothing via the openings.

The VRU reflector device 70 may have a first surface 620 facing or configured to receive wavelengths from the vehicle 30-1, and amplify and reflect the received wavelengths to the infrastructure device 50-1 or the vehicle 30-1. The VRU reflector device 70 may also have a first surface 630 to be coupled to a VRU or VRU's belongings such as a hat, tie, glove, backpack, clothing, bracelet, shoe or collar, etc. As described above, the first surface 620 may have a concave shape. In some embodiments, the reflector device 70 may be incorporated or integrated into the VRU device such as the device 20-1 shown in FIG. 3, 4, 6 or 9.

Figure 6:
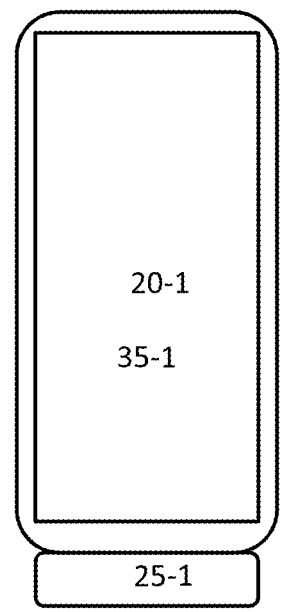
FIG. 6 is an embodiment of an aspect of the described technology where a device has an external dongle or an internal chip.

FIG. 6 is an embodiment of an aspect of the described technology. Referring to FIG. 6, a device, for example, a smartphone 20-1, has an external dongle 25-1 or an internal chip 35-1, with software, middleware or hardware for emitting wavelengths in a range detected either directly by vehicle's sensors or indirectly by infrastructure's sensors.

Figure 7:
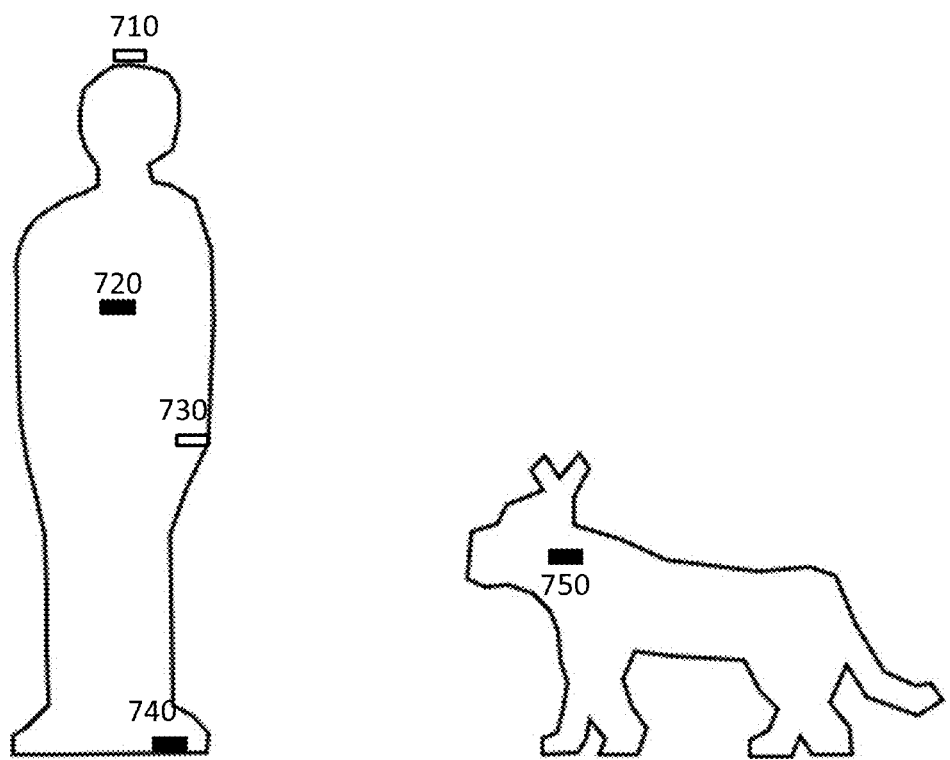
FIG. 7 is an embodiment of an aspect of the described technology showing example locations of a VRU device.

FIG. 7 is an embodiment of an aspect of the described technology showing example VRU devices on a VRU or a VRU's pets. VRU devices may include a VRU device 710 on a hat 710, a VRU device 720 on a piece of clothing, a VRU device 730 on a bracelet 730, a VRU device 740 on a shoe 740, a VRU device 750 on a collar 750 of a VRU's pet, all reflecting or emitting wavelengths in a range detected either directly by vehicle's sensors or indirectly by infrastructure's sensors. The positions of the VRU devices 710-750 are merely examples and the devices 710-750 may be located in other positions on the VRU or VRU's pet. The VRU devices 710-750 may include at least one of the VRU device 20-1 shown in FIG. 9 or the reflector device 70 shown in FIGS. 5A-5C.

Figure 8:
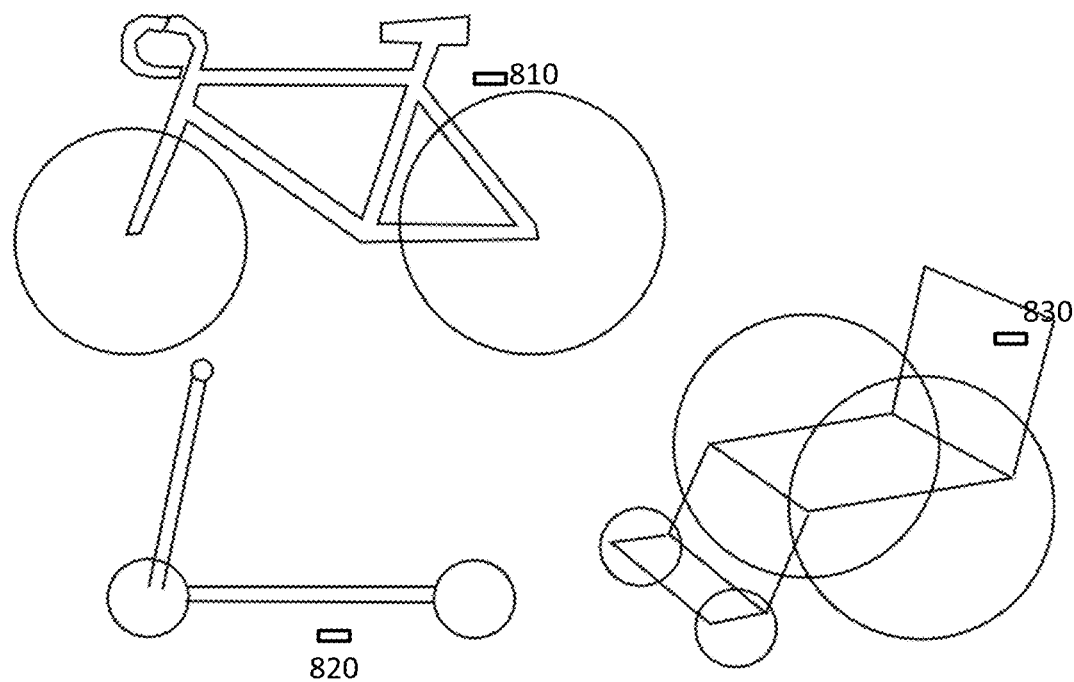
FIG. 8 is an embodiment of an aspect of the described technology showing other example locations of a VRU device.

FIG. 8 is an embodiment of an aspect of the described technology showing example VRU devices on VRU transportation devices. VRU devices may include a VRU device 810 on a bicycle, a VRU device 820 on a scooter, a VRU device 830 on a wheelchair, all reflecting or emitting wavelengths in a range detected either directly by vehicle's sensors or indirectly by infrastructure's sensors. These VRU devices 810-830 are merely examples and other VRU equipment or other VRU transportation devices are also possible. Furthermore, the positions of the VRU devices 810-830 are also merely examples and the devices 810-830 may be located in other positions on the VRU transportation devices. The VRU devices 810-830 may include at least one of the VRU device 20-1 shown in FIG. 9 or the reflector device 70 shown in FIGS. 5A-5C.

Figure 9:
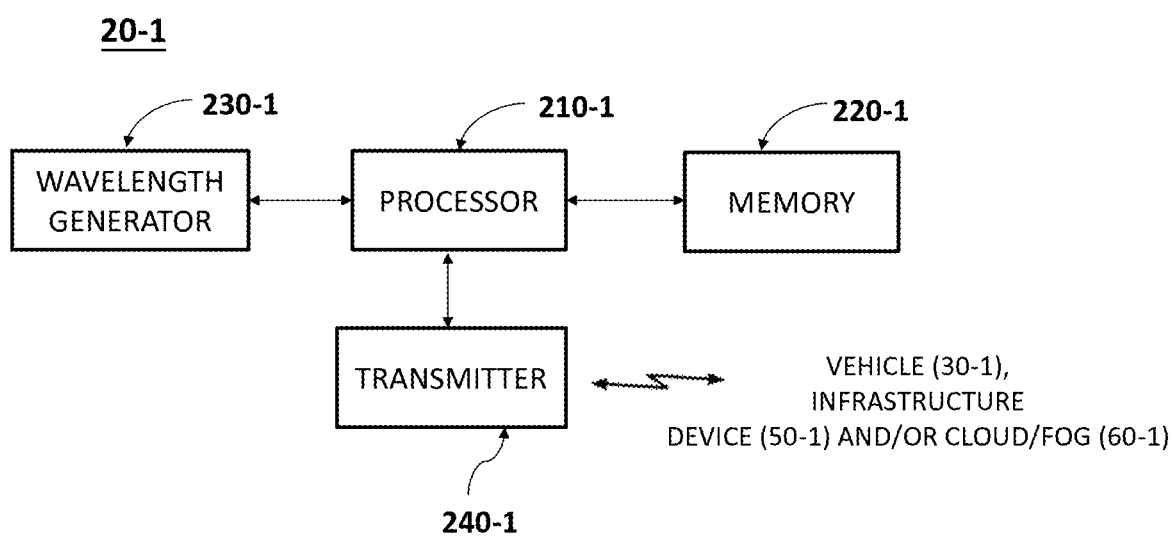
FIG. 9 is an example block diagram of the VRU device according to an embodiment of the described technology.

FIG. 9 is an example block diagram of the VRU device 20-1 according to an embodiment of the described technology. FIG. 9 is merely an example block diagram of the VRU device 20-1, and certain elements may be removed, other elements added, two or more elements combined or one element can be separated into multiple elements depending on the specification and requirements. The VRU device 20-1 may include a processor (or controller) 210-1, a memory 220-1, a wavelength generator 230-1 and a transmitter 240-1. In some embodiments, at least one of the processor 210-1, the memory 220-1, the wavelength generator 230-1 and the transmitter 240-1 can be implemented with corresponding elements (e.g., processor, memory, user interface or transceiver circuit) used in Android based smartphones or tablets, or iPhone or iPad. In other embodiments, at least one of the processor 210-1, the memory 220-1, the wavelength generator 230-1 and the transmitter 240-1 can be implemented with corresponding elements used in other portable mobile terminals. In other embodiments, the VRU device 20-1 may be implemented with a beacon generator, an IC chip, a credit card, a mobile terminal, or other IoT device. The processor 210-1 may communicate data and signals with and control the operations of the memory 220-1, the wavelength generator 230-1 and the transmitter 240-1.

The wavelength generator 230-1 may generate wavelengths described above under the control of the processor 210-1. As described above, the wavelengths may be any type of an electromagnetic wave or wireless signal that can be sensed by a sensor of the vehicle 30-1 to slow down or stop the vehicle 30-1. The transmitter 240-1 may transmit the generated wavelengths to the vehicle 30-1, the infrastructure device 50-1 and/or the cloud or fog 60-1. The memory 220-1 may communicate data with the processor 210-1. The memory 620 may store types or strengths of wavelengths to be generated. The memory 220-1 may also store instructions to be performed by the processor 210-1 (e.g., process 1000-1 shown in FIG. 10).

Figure 10:
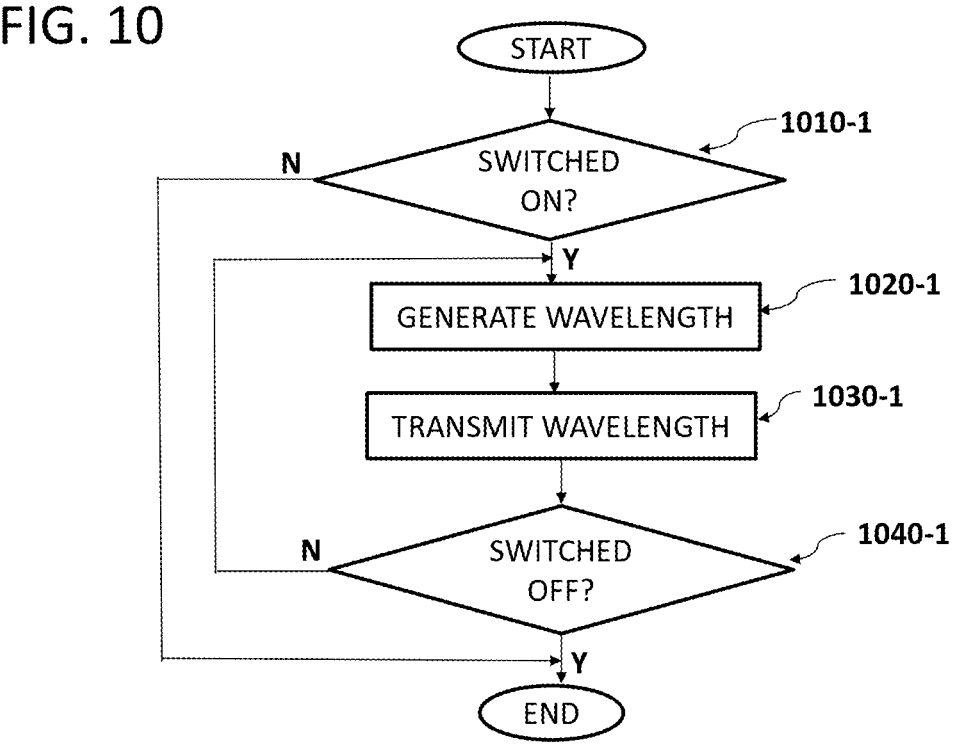
FIG. 10 is an example flowchart of a process for operating the VRU device according to an embodiment of the described technology.

FIG. 10 is an example flowchart of a process 1000-1 for operating the VRU device 20-1 according to an embodiment of the described technology. The process 1000-1 can be performed by the processor 210-1 of the VRU device 20-1. The process 1000-1 can be programmed with any type of programming languages including, but not limited to, Java (or JavaScript), React, Native, React Native, C++, Kotlin, Python, HTML5+CSS+JavaScript, or other mobile application languages. The process 1000-1 can be stored in the memory 220-1 of the VRU device 20-1. Although the process 1000-1 is described herein with reference to a particular order, in various embodiments, states herein may be performed in a different order, or omitted, and additional states may be added. This may apply to the processes 1200 in FIGS. 12 and 1400-1 in FIG. 14.

In state 1010-1, the processor 210-1 may determine whether the VRU device 20-1 is switched on to generate wavelengths. In some embodiments, the state 1010-1 may be omitted, and the processor 210-1 may control the wavelength generator 230-1 to generate wavelengths while the VRU device remains turned on. In state 1020-1, if the VRU device is switched on, the processor 210-1 may generate wavelengths via the wavelength generator 230-1. In state 1030-1, the processor 210-1 may control the transmitter 240-1 to transmit the generated wavelengths to at least one of the vehicle 30-1, the infrastructure device 50-1, the cloud or fog 60-1. In state 1040-1, the processor 210-1 may determine whether the VRU device is switched off to stop generating wavelengths. If it is determined that the VRU device is not switched off to stop generating wavelengths, the process 1000-1 may repeat the states 1020-1 to 1040-1. If it is determined that the VRU device is switched off to stop generating wavelengths, the process 1000-1 may end. In some embodiments, the state 1040-1 may be omitted, and the wavelength generator 230-1 may stop generating when the VRU device is turned off.

Figure 11:
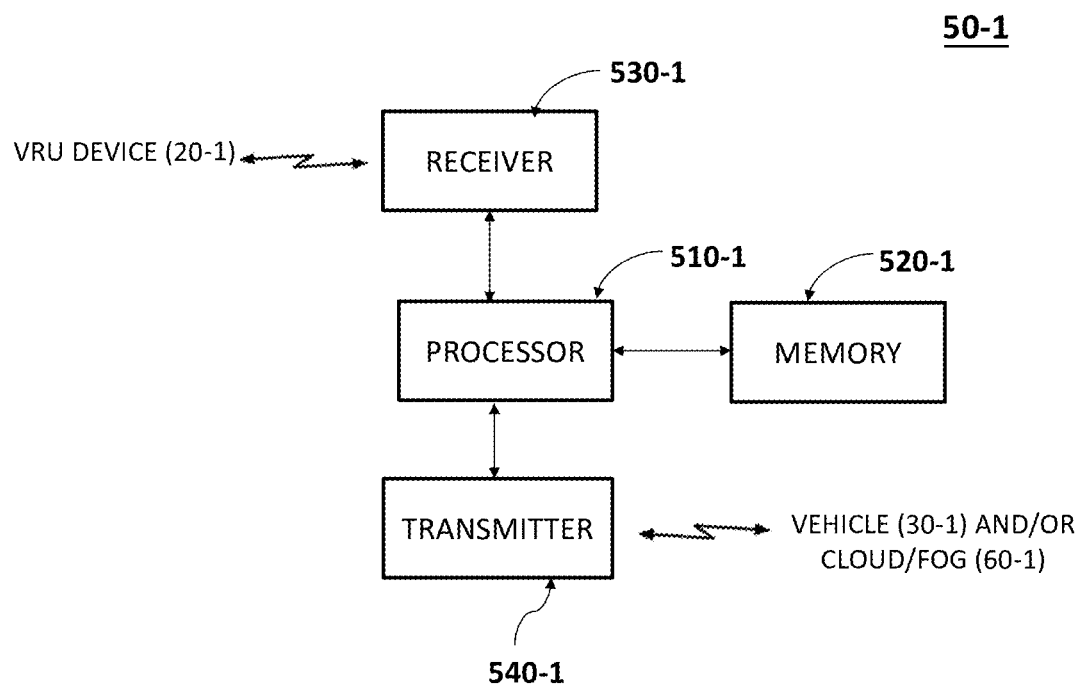
FIG. 11 is an example block diagram of the infrastructure device according to an embodiment of the described technology.

FIG. 11 is an example block diagram of the infrastructure device 50-1 according to an embodiment of the described technology. FIG. 11 is merely an example block diagram of the infrastructure device 50-1, and certain elements may be removed, other elements added, two or more elements combined or one element can be separated into multiple elements depending on the specification and requirements. The infrastructure device 50-1 may be implemented with one or more of a base stations (BS), an LCS server, firmware or software. The infrastructure device 50-1 may include a processor (or controller) 510-1, a memory 520-1, a receiver 530-1 and a transmitter 540-1. The processor 510-1 may communicate data and signals with and control the operations of the memory 520-1, the receiver 530-1 and the transmitter 540-1.

The receiver 530-1 may receive wavelengths emitted from the VRU device 20-1. In some embodiments, the wavelengths may be generated and transmitted by the VRU device 20-1. In other embodiments, the wavelengths may originally be transmitted from the vehicle 30-1, and amplified and reflected by the VRU device 20-1. The transmitter 540-1 may transmit the received wavelengths to at least one of the vehicle 30-1, the cloud or the fog 60-1. The memory 520-1 may communicate data with the processor 510-1. The memory 520-1 may also store instructions to be performed by the processor 510-1 (e.g., process 1200 shown in FIG. 12).

Figure 12:
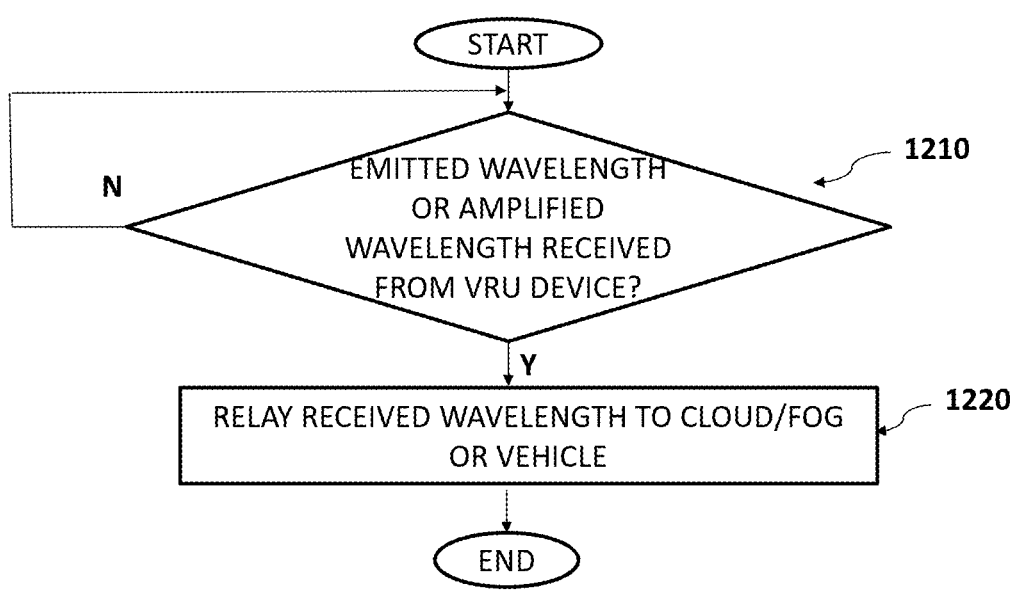
FIG. 12 is an example flowchart of a process for operating the infrastructure device according to an embodiment of the described technology.

FIG. 12 is an example flowchart of a process 1200 for operating the infrastructure device 50-1 according to an embodiment of the described technology. The process 1200 can be performed by the processor 510-1 of the infrastructure device 50-1. In state 1210, the processor 510-1 may determine whether the infrastructure device 50-1 has received emitted wavelengths or reflected (or amplified and reflected) wavelengths from the VRU device 20-1. As described above, the infrastructure device 50-1 may receive wavelengths originally generated and transmitted from the VRU device 20-1, or wavelengths originally transmitted from the vehicle 30-1 and amplified and reflected by the VRU device 20.

If it is determined that the infrastructure device 50-1 has received emitted wavelengths or reflected wavelengths from the VRU device 20-1, the processor 510-1 may relay the received wavelengths to at least one of the vehicle 30-1, the cloud or fog 60-1 (state 1220). The cloud or fog 60-1 may forward the received wavelengths to the vehicle 30-1 or control the vehicle 30-1 to slow down the vehicle 30-1. If it is determined, that the infrastructure device 50-1 has not received emitted wavelengths or reflected wavelengths from the VRU device 20-1, the state 1210 may repeat.

Figure 13:
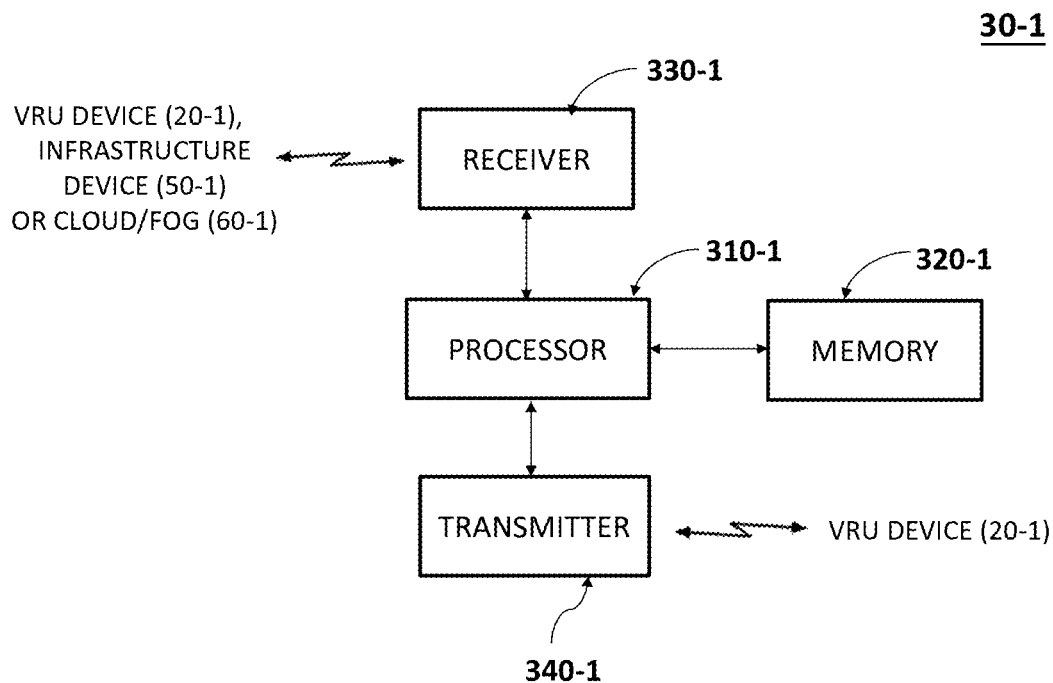
FIG. 13 is an example block diagram of the vehicle according to an embodiment of the described technology.

FIG. 13 is an example block diagram of the vehicle 30-1 according to an embodiment of the described technology. FIG. 13 is merely an example block diagram of the vehicle 30-1, and certain elements may be removed, other elements added, two or more elements combined or one element can be separated into multiple elements depending on the specification and requirements. For example, other components (e.g., engine or motor, transmission, steering wheel, suspension, brakes, etc.) of the vehicle are not shown in FIG. 13. The vehicle 30-1 may be a combustion based vehicle, or an electric or hybrid vehicle.

The vehicle 30-1 may include a processor (or controller) 310-1, a memory 320-1, a receiver 330-1 and a transmitter 340-1. The processor 310-1 may communicate data and signals with and control the operations of the memory 320-1, the receiver 330-1 and the transmitter 340-1. At least one of the processor 310-1, the receiver 330-1 and the transmitter 340-1 may be part of an advanced driver assistant system (ADAS) or similar pre-collision braking/collision mitigation system of the vehicle 30-1. The receiver 330-1 may receive wavelengths from at least one of the VRU device 20-1, the infrastructure device 50-1, the cloud or fog 60-1. In some embodiments, the wavelengths may be originally generated and transmitted from the VRU device 20-1, or may be originally transmitted from the vehicle 30-1 and amplified and reflected by the VRU device 20-1. In other embodiments, the wavelengths may be relayed by the infrastructure device 50-1, the cloud or fog 60-1.

The transmitter 340-1 may transmit wavelengths (generated at the vehicle 30-1) to the VRU device, for example, the VRU device 60-1 shown in FIGS. 5A-5C, the VRU device 20-1 shown in FIG. 6, the VRU devices 710-750 shown in FIG. 7 or the VRU devices 810-830 shown in FIG. 8 such that the VRU devices may amplify and reflect the transmitted wavelengths. The memory 320-1 may communicate data with the processor 310-1. The memory 320-1 may also store instructions to be performed by the processor 310-1 (e.g., process 1400-1 shown in FIG. 14).

Figure 14:
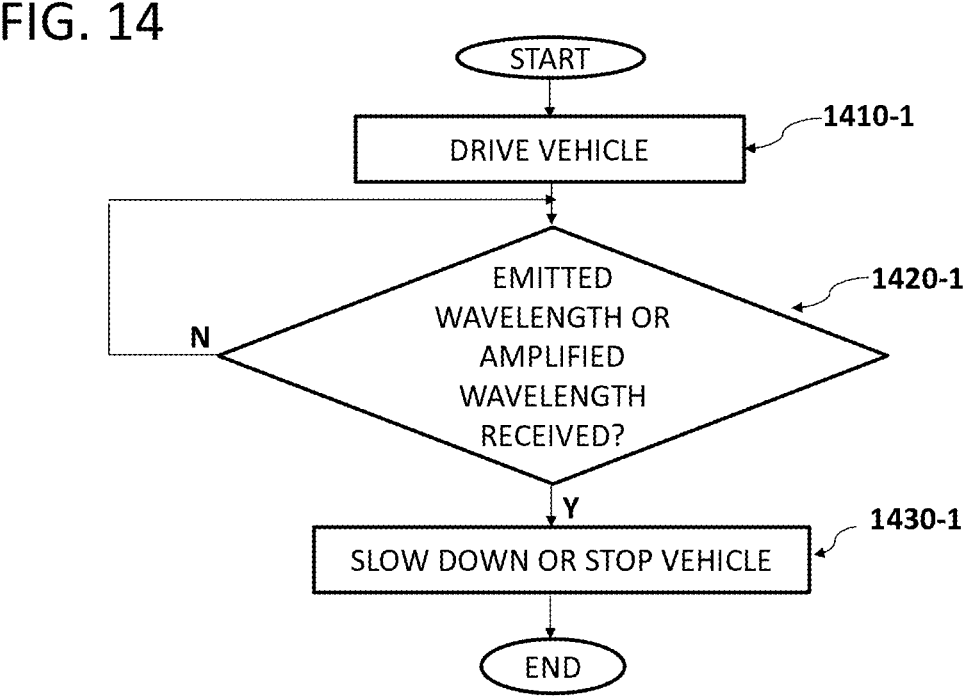
FIG. 14 is an example flowchart of a process for operating the vehicle according to an embodiment of the described technology.

FIG. 14 is an example flowchart of a process 1400-1 for operating the vehicle 30-1 according to an embodiment of the described technology. The process 1400-1 can be performed by the processor 310-1 of the vehicle 30-1. In state 1410-1, the processor 310-1 may control the vehicle 30-1 to drive, for example, at certain speeds. In state 1420-1, the processor 310-1 may determine whether the vehicle 30-1 has received emitted wavelengths or reflected (or amplified and reflected) wavelengths from at least one of the VRU device 20-1, the infrastructure device 50-1, the cloud or fog 60-1.

If it is determined that the vehicle 30-1 has not received emitted wavelengths or reflected wavelengths, the state 1420-1 may repeat. If it is determined that the vehicle 30-1 has received emitted wavelengths or reflected wavelengths, the processor 310-1 may control the ADAS of the vehicle to slow down the vehicle 30-1 (state 1430). In some embodiments, the processor 310-1 may control the ADAS to apply brake to slow down or stop the vehicle 30-1. In some embodiments, the processor 310-1 may control the transmission system of the vehicle 30-1 to apply engine braking (e.g., switching higher gear to lower gear) to slow down or stop the vehicle 30-1.

Those skilled in the art will appreciate that, in some embodiments, additional components and/or steps can be utilized, and disclosed components and/or steps can be combined or omitted.

Distributed AI System Among Edge and Cloud Devices

The AI-enabled methods and systems herein described are configured to create a virtual protection zone around pedestrians, wheelchair users, cyclists, and/or motorcyclists using their mobile devices. The methods and systems herein described are configured to send the vulnerable road user (VRU) position coordinates to all nearby connected vehicles, augmenting the vehicles' sensor input to ensure the VRU is recognized and tracked. If a connected vehicle gets too close to a VRU, its brakes can be triggered automatically before a collision can occur.

Mobile terminals, smartphones, and tablets are now the primary computing devices for many people. In many cases, these devices are rarely separated from their owners, and the combination of rich user interactions and powerful sensors means they have access to an unprecedented amount of data, much of it private in nature. Models learned on such data hold the promise of greatly improving usability by powering more intelligent applications, but the sensitive nature of the data means there are risks and responsibilities to storing it in a centralized location. The amount of data that mobile terminals collect is rapidly increasing. Consequently, powering more intelligent applications in practice is often impossible on a single node, as merely storing the whole dataset on a single node becomes infeasible. This necessitates the use of a distributed computational framework, in which the training data describing the problem is stored in a distributed fashion across a number of interconnected nodes and the optimization problem is solved collectively by the cluster of nodes. Loosely speaking, one can use any network of nodes to simulate a single powerful node, on which one can run any algorithm. The practical issue is that the time it takes to communicate between a processor and memory on the same node is normally many orders of magnitude smaller than the time needed for two nodes to communicate; similar conclusions hold for the energy required. Further, in order to take advantage of parallel computing power on each node, it can be advantageous to subdivide the problem into subproblems suitable for independent/parallel computation. State-of-the-art optimization algorithms are typically inherently sequential. Moreover, they usually rely on performing a large number of very fast iterations. The problem stems from the fact that if one needs to perform a round of communication after each iteration, practical performance drops down dramatically, as the round of communication is much more time-consuming than a single iteration of the algorithm.

The use of a distributed computational framework, in which the training data describing the problem is stored in a distributed fashion across a number of interconnected nodes, may be implemented in the context of distributed AI among edge and cloud systems. In such distributed AI, cloud systems may be charged with computationally intensive applications, and edge systems may be charged with low-latency, time-critical, low-energy and low-data consuming applications, such that the optimization problem is solved collectively and efficiently (time-wise, energy-wise and data-wise) by the cluster of interconnected edge and cloud nodes.

Collision avoidance between VRUs and vehicles may benefit from such a distributed AI among edge and cloud systems. As "collision avoidance" relates to the field of road safety, collision avoidance between VRUs and vehicles requires providing a "danger notifications" to the VRUs and to nearby approaching vehicles, wherein the danger notifications may be triggered according to a set of rules that take into account VRUs and vehicles past, current and predicted trajectories, as well as proximity threshold limits for danger avoidance between VRUs and vehicles.

The usefulness of providing danger notifications relates to the field of road safety since accidents between pedestrians and vehicles occur on a daily basis, and human injury can be severe enough that vulnerable road users may be injured or killed by vehicular traffic, and thus vulnerable road users and vehicles must observe their respective traffic rules. To be useful, danger notifications relating to the field of road safety may require timely notification, or precautious triggering, in order to let VRUs and vehicles sufficient lead time to react, such as to correct a road usage offence, or to actively prepare to prevent the danger before an accident occurs. For most road circumstances, lead time to react may correspond to a provision of danger notifications provided to VRUs and vehicles at least 5 seconds in advance, or more. Therefore, algorithms configured to compute 'predicted trajectories' of VRUs and vehicles may be useful in achieving such timely notifications, wherein predictions may be based on modern signal processing of spatiotemporal trajectories including dead reckoning techniques and AI. Accordingly, disclosed herein are a method and system for distributed predictive VRU-to-vehicle collision avoidance and for providing a danger notifications to the VRUs and to nearby approaching vehicles for the sake of collision avoidance, wherein the danger notifications are triggered according to a set of rules that take into account VRUs and vehicles past, current, and predicted trajectories.

Vehicle-to-pedestrian collision avoidance methods and systems involve precise spatiotemporal positioning accuracies of the order of 1 meter or less, in order to discriminate for example a pedestrian crossing the street from a pedestrian walking on the sidewalk where significant V2P collision probability differences exist. In currently deployed LTE networks, the level of spatiotemporal positioning accuracy is on the order of tens of meters, which may not provide enough positioning discrimination and therefore may limit the applicability of currently deployed LTE networks for accurate vehicle-to-pedestrian collision avoidance. In currently deployed global positioning system (GPS), the level of spatiotemporal positioning accuracy is on the order of about 5 meters, but exhibits some urban coverage drawback, seconds-level measurement latencies, and high battery electrical consumption, which may not provide enough spatiotemporal positioning discrimination and therefore may limit the applicability of GPS for accurate vehicle-to-pedestrian collision avoidance. Therefore, there is still a need for a method and system for precise spatiotemporal positioning accuracies applied to vehicle-to-pedestrian collision avoidance, where currently-deployed 5G-LTE communications networks and new radio (NR) technologies may provide for more accuracy in such field of road safety.

Accordingly, the described technology has been made keeping in mind the above problems occurring in the related technology, and an object of the described technology is to provide a method and a system for automatically detecting VRUs and for providing a danger notifications to the VRUs and to nearby approaching vehicles for the sake of collision avoidance with sufficient lead time to react. The usefulness of the described technology is for providing danger notifications relating to the field of road safety, and the novelty of the described technology relates to precautious VRU-to-vehicle proximity detection using past, current and predicted trajectories of VRUs.

Therefore, there is still a need for a method and system for vehicle-to-pedestrian collision avoidance overcoming current technological drawbacks.

The described technology relates to a method and a system for collision avoidance between VRUs and vehicles, notably for P2V collision avoidance, in the field of intelligent transportation technology and data analytics distributed among edge and cloud systems. Other embodiments provide a method and a system for collision avoidance between VRUs and vehicles based on reflected optical signal, wherein VRUs and vehicles are configured to emit and receive a proximity signal pertaining to road usage safety before accidents happen. Other embodiments provide a method and a system for P2V collision avoidance based on reflected optical signal analysis at the edge. The usefulness of the described technology is for providing danger notifications pertaining to the field of road safety, and pertaining to collision avoidance before accidents happen. In addition, one aspect of the described technology relates to precautious collision avoidance notifications using past, current and predicted trajectories of VRUs and vehicles, and using reflected optical signal analysis at the edge.

As used herein, the term "vulnerable road users", or "VRU", generally refers to any human or living being that has to be protected from road hazards. The term includes but is not limited to: non-motorized road users such as pedestrians, construction workers, emergency services workers, policemen, firefighters, bicyclists, wheelchair users, or motorized road users such as scooters, motorcyclists, or any other vulnerable road users, or persons with disabilities or reduced mobility and orientation. Also, as used herein, the term "vehicle" generally refers to any motor propelled device that could present a road hazard for VRUs. It includes but is not limited to: cars, autonomous vehicles, non-autonomous vehicles, self-driving vehicles, off-road vehicles, trucks, manufacturing vehicles, industrial vehicles, safety & security vehicles, electric vehicles, low-altitude airplanes, helicopters, drones (UAVs), boats, or any other types of automotive, aerial, or naval vehicles with some proximity to VRUs such as encountered in urban, industrial, commercial, airport, or naval environments.

A method for collision avoidance between two entities requires the knowledge of their respective spatiotemporal positioning. As used herein, the term 'spatiotemporal positioning' generally refers to the position coordinates of an entity of interest determined with both spatial and temporal quantities. The current spatiotemporal positioning of a VRU may be determined from LTE cellular radio signals mediated by cellular base stations (BS) and a Location Service Client (LCS) server. With such technique, signals from at least three cellular base stations may be used to determine by triangulation the position of a VRU if an LTE-capable mobile terminal is physically linked to the VRU, such as a mobile phone inserted in the pocket of the VRU. Also, the current spatiotemporal positioning of a VRU may be determined from other types of sensors including for example any one of GPS sensors, or global navigation satellite systems (GNSS) sensors, embedded in the mobile terminal of the VRU.

However, obtaining a precise measure of the spatiotemporal trajectory can be very challenging if the measurement scheme uses only current spatiotemporal positioning data, as the spatiotemporal positioning offered by GPS- or LTE-capable terminals may be highly inaccurate. The GSM/CDMA/LTE mobile terminal triangulation tracking technique does not exhibit sufficient spatial resolution in most sub-urban areas as to ascertain spatiotemporal positioning within tens of meters accuracy. LTE using 5G NR new radio access technology (RAT) developed by 3GPP for 5G mobile networks may improve mobile terminal triangulation tracking techniques within a few meters accuracy. As for GPS/GNSS sensors embedded in mobile terminals, spatiotemporal positioning inaccuracies may be about 5 meters or more, which may not be sufficiently accurate to positively ascertain collision probability between a VRU and a vehicle. Furthermore, the techniques of map-matching VRUs and vehicles onto digital road maps may not be accurate enough to positively ascertain collision probability since road maps often do not include precise path widths, crossing walk locations, or updates of paths marked for VRU exclusive use. Furthermore, shadowing and multi-reflecting effects of buildings in urban environments generate poor LTE- and GPS-data acquisition, leading to the degradation of measurement accuracies. As a result, using only current spatiotemporal positioning data, or simply matching the current spatiotemporal positioning to road maps, may yield inaccurate results, meaning a high occurrence of false positives and/or false negatives for the determination of collision probability.

The spatiotemporal positioning accuracy of GPS- or LTE-capable terminals may be improved by taking into account past and current spatiotemporal positioning data points and by signal processing of the data points, such as with the Kalman filter, or other signal filtering techniques, that averages past and current spatiotemporal data points using specific models in order to reduce data noise. And road maps inaccuracies may be improved by storing past spatiotemporal trajectory data of vehicles and VRUs in order to determine their respective likely road usage paths based on statistical techniques.

The predicted spatiotemporal positioning of a VRU may be determined from modern signal processing techniques applied to past and current spatiotemporal data points of a VRU, including dead reckoning techniques and artificial intelligence (AI) techniques. Past and current speed, acceleration, and direction data points may also be used, in addition to spatiotemporal position data points, in order to enhance prediction accuracy and reliability. Therefore, in addition to GPS- or LTE-capable terminals, other terminals exhibiting speed, accelerometry and gyroscopic sensing capabilities may be useful.

In the dead reckoning technique, the process of predicting spatiotemporal positioning including calculating VRU's future position by using past and current positions, as well as estimations of speed, acceleration and direction over elapsed time. The dead reckoning technique may use a Kalman filter based on Newton's laws of motion, wherein the filtering is based on position, speed, acceleration and direction data. With such a technique, the position and speed can be described by the linear state space $X_k=\{X\ dX/dt\}'$, where $dX/dt$ is the speed, that is, the derivative of the three-dimensional position $X=f(x,y,z)$ with respect to time. It can be assumed that between the (k−1) and k timestep uncontrolled forces cause a constant acceleration of $a_k$ that is normally distributed, with mean 0 and standard deviation $\sigma_a$. From Newton's laws of motion, the signal filtering on the spatiotemporal positioning $X_k$ may take the following analytical form: $X_k=F\ X_{k-1}+G\ a_k$, where $F=\{1\ \Delta t,\ 0\ 1\}$ and $G=\{\Delta t^2/2\ \Delta t^2\}'$.

In the AI technique, the process of predicting spatiotemporal positioning may include embedding a recurrent neural network (RNN) algorithm, a reinforcement learning (RL) algorithm, a conditional random fields (CRFs) algorithm, a machine learning (ML) algorithm, a deep learning (DL) algorithm, any other AI algorithm, or a combination thereof. RNN is an artificial neural network algorithm where connections between nodes form a directed graph along a temporal sequence, this allows the neural network to exhibit temporal dynamic behavior in which the spatiotemporal coordinates of a VRU is denoted by a matrix $X=\{x\ y\ z\ t\}$. RL is an area of ML concerned with how participants ought to take actions in an environment so as to maximize some notion of cumulative reward. CRF is a class of statistical modeling method often applied in pattern recognition and ML and used for structured prediction.

The AI algorithm may be used to predict the likely trajectory of a VRU based on small spatiotemporal data sets as well as large spatiotemporal data sets. A spatiotemporal trajectory model may be defined as a set of spatiotemporal points $X=\{x\ y\ z\ t\}$ of a participant moving along a trajectory represented by its geolocation coordinates in space and time (sequential datasets of participant, time and location). The data sets may also be spatiotemporal geolocation data that may comprise other types of data not classified as spatiotemporal points, such as speed data, acceleration data, direction data, and/or other types of data. In order to process sequential datasets, neural networks of deep learning (recurrent neural networks, or RNN) algorithms may be used. RNNs have been developed mostly to address sequential or time-series problems such as sensor' stream data sets of various length. Also, long short term memory (LSTM) algorithms may be used, which mimics the memory to address the shortcomings of RNN due the vanishing gradient problems, preventing the weight (of a given variable input) from changing its value. RNN is an artificial neural network with hidden layer $h_t$, referring to a recurrent state and representing a "memory" of the network through time. The RNN algorithm may use its "memory" to process sequences of inputs $X_t$. At each time step t, the recurrent state updates itself using the input variables $x_t$ and its recurrent state at the previous time step $h_{t-1}$, in the form: $h_t=f(X_t,h_{t-1})$. The function $f(X_t,h_{t-1})$ in turn is equal to $g(W\psi(X_t)+Uh_{t-1}+bh)$, where $\psi(X_t)$ is the function which transforms a discrete variable into a continuous representation, while W and U are shared parameters (matrices) of the model through all time steps that encode how much importance is given to the current datum and to the previous recurrent state. Variable b is a bias, if any. Whereas neural networks of deep learning models require large data sets to learn and predict the trajectory of a participant, CRFs may be used for the same purpose for smaller data sets. CRFs may be better suited for small datasets and may be used in combination with RNN. Models with small datasets may use Reinforcement learning algorithms when trajectory predictions consider only nearest spatiotemporal geolocation data.

Also, the AI algorithm may be used to predict a likely trajectory based on expanded spatiotemporal data sets and other type of data sets, which may relate to the trajectory intent of a vehicle or a VRU, including spatiotemporal velocity and acceleration data sets that determine spatiotemporal change of position ($dx/dt$, $dy/dt$, $dz/dt$, $d^2x/dt^2$, $d^2y/dt^2$, $d^2z/dt^2$), spatiotemporal angular, or gyroscopic, data sets that determine spatiotemporal orientation and change of orientation ($\theta_x$, $\theta_y$, $\theta_z$, $d\theta_x/dt$, $d\theta_y/dt$, $d\theta_z/dt$, $d^2\theta_x/dt^2$, $d^2\theta_y/dt^2$, $d^2\theta_z/dt^2$), or other spatiotemporal data sets or combination thereof. A spatiotemporal trajectory model X may be defined as a set of spatiotemporal points $X=X(x,\ y,\ z,\ t)$ or a set of expanded spatiotemporal points $X=X(x,\ y,\ z,\ t,\ dx/dt,\ dy/dt,\ dz/dt,\ d^2x/dt^2,\ d^2y/dt^2,\ d^2z/dt^2,\ \theta_x,\ \theta_y,\ \theta_z,\ d\theta_x/dt,\ d\theta_y/dt,\ d\theta_z/dt,\ d^2\theta_x/dt^2,\ d^2\theta_y/dt^2,\ d^2\theta_z/dt^2)$ of a vehicle or a VRU moving along a trajectory represented by its geolocation, velocity, and gyroscopic coordinates in three-dimensional space and time. The RNN algorithm may use its memory to process sequences of inputs $X=X(x,\ y,\ z,\ t,\ dx/dt,\ dy/dt,\ dz/dt,\ d^2x/dt^2,\ d^2y/dt^2,\ d^2z/dt^2,\ \theta_x,\ \theta_y,\ \theta_z,\ d\theta_x/dt,\ d\theta_y/dt,\ d\theta_z/dt,\ d^2\theta/dt^2,\ d^2\theta/dt^2,\ d^2\theta_z/dt^2)$. At each time step t, the recurrent state updates itself using the input variables X, and its recurrent state at the previous time step $h_{t-1}$, in the form: $h_t=f(X_t,h_{t-1})$.

The dead reckoning and AI techniques may also be used to determine the size, area and shape of a vehicle-to-VRU proximity threshold limit, which determines a dimensional safety margin for the VRU to establish a safe distance between the VRU and a vehicle. The vehicle-to-VRU proximity threshold limit may be based on mapping zones, e.g., regions of the environment based on a level of risk probability of identified spaces. For example, spatial coordinates coincident with sidewalks may be classified as low-danger zones for VRUs. Spatial coordinates coincident with streets may be classified as high-danger zones for VRUs. Spatial coordinates coincident with parks may be considered as safe zones for VRU. Since sidewalks represent safe zones for VRUs, the proximity threshold limit for a sidewalker may be set to the size of the sidewalk itself (usually less than about 3 meters). Whereas, as streets represent dangerous zones for VRUs, the proximity threshold limit may be set to a larger size (e.g., about 3 meters for vehicle-to-pedestrian, and about 5 meters for truck-to-pedestrian) taking into account past, current and predicted trajectories of VRU and vehicles in order to determine a dimensional safety margin for establishing a provision of danger notifications with sufficient lead time to react.

The AI algorithm embedded in the user equipment (UE) terminals may be specific to terminals physically linked to a vehicle (V), or to terminals physically linked to a vulnerable road user (VRU), or to terminals physically linked to a pedestrian (P). For example, the UE terminals physically linked to a vehicle (V) or to a pedestrian (P) may comprise a computational unit or processor (hardware, or firmware, or software) for processing an AI algorithm, the computational unit being one of: a mobile application, a software, a firmware, a hardware, a physical device, and a computing device, or a combination thereof. The AI algorithm may use different algorithmic codes in order to provide specific results for different UE terminals, or to provide specific results for different road users, who may be related to the automobile sector, to the cell phone sector, to the telecommunications sector, to the transportation sector, and/or to any other sectors. Road users may include automobile OEMs, cell phone applications providers, mobile telephony providers, and/or any other road users.

According to one aspect of the described technology, a method for determining, or predicting, the spatiotemporal trajectory of VRUs and vehicles may comprise: linking, to a plurality of vehicles, as well as to a plurality of VRU, LTE-capable UE terminals exhibiting international mobile subscriber identity (IMSI); and applying an AI algorithm to predict a likely trajectory for each UE terminals based on spatiotemporal data sets, as one or more sensors associated with each UE terminals may provide for past and current spatiotemporal positioning data. According to one aspect of the described technology, the LTE-capable UE terminals may use 5G NR new radio access technology (RAT) developed by 3GPP for 5G mobile networks.

The current spatiotemporal positioning of a VRU or of a vehicle may be determined from LTE cellular radio signals mediated by cellular BS and an LCS server. Signals from at least three cellular base stations may be used to determine by triangulation the position if an LTE-capable mobile terminal is physically linked to the VRU or to the vehicle, such as a mobile phone inserted in the pocket of the VRU or attached to the dashboard of the vehicle. Also, the current spatiotemporal positioning of a VRU or of a vehicle may be determined from other types of sensors including for example any one of GPS sensors, or GNSS sensors, embedded in the mobile terminal. As used herein, the terms 'user equipment terminal' and 'mobile terminal' generally refer to a device or functionality which provides the capabilities for user applications, e.g., telephony, including the user interface.

According to one aspect of the described technology, a method for determining, or predicting, the spatiotemporal trajectory of VRUs and vehicles may comprise: first interrogating, at a communications server, the predicted spatiotemporal trajectory of any one of each of the UE terminals, wherein first interrogating comprises the steps of receiving past and current spatiotemporal trajectory data from one or more sensors associated with any one of each of the UE terminals, and storing the past and current spatiotemporal trajectory of any one of the UE terminals, and computing the predicted spatiotemporal trajectory of each of the UE terminals, wherein the communications server comprises a computing device and a first embedded algorithm for spatiotemporal trajectory prediction, and first determining whether the spatiotemporal distance between any one of the UE terminals is within a proximity range, and obtaining a communications server notification if the first determining relates a UE terminal belonging to a vehicle and a UE terminal belonging to a VRU, and tagging these two UE terminals as notified UE terminals. According to one embodiment of the described technology, the first embedded algorithm for spatiotemporal trajectory prediction may include a cloud-based AI algorithm. According to another embodiment of the described technology, the first embedded algorithm for spatiotemporal trajectory prediction may including an AI algorithm distributed among edge and cloud systems, and may more specifically refer to a distributed ML process among edge and cloud systems.

Figure 15:
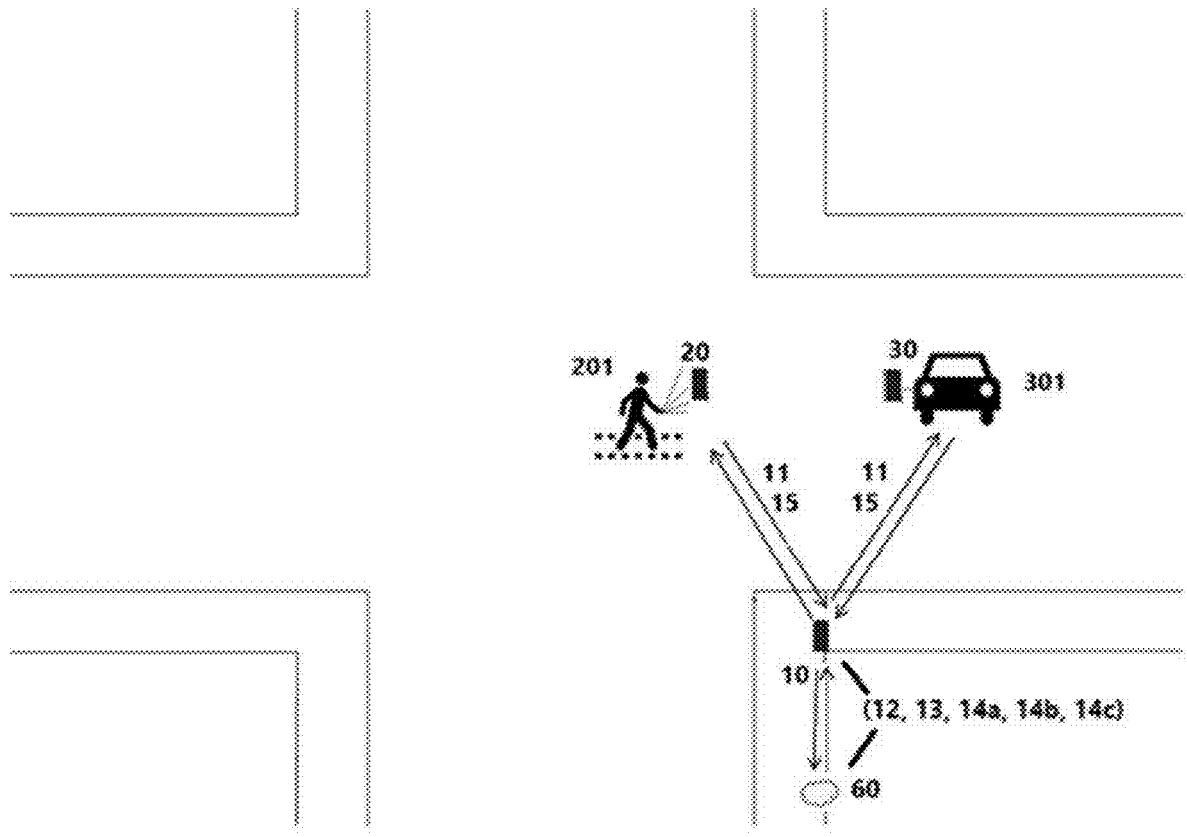
FIG. 15 illustrates one embodiment of the method of collision avoidance between Vulnerable Road Users (VRUs) and vehicles, comprising a communications configuration relating edge and cloud systems at a road intersection, and a cloud-based embedded algorithm for spatiotemporal trajectory prediction.

FIG. 15 illustrates one embodiment of the method of collision avoidance between VRUs and vehicles, comprising a communications configuration relating to edge and cloud systems at a road intersection, and a cloud-based embedded algorithm for spatiotemporal trajectory prediction. According to one embodiment, and referring to FIG. 15, a method and system for collision avoidance between VRUs and vehicles may comprise: linking, to a VRU (201) (which may include a road-crossing pedestrian) and a vehicle (301) (which may include an autonomous car driving on the road), LTE-capable UE terminals (20, 30) having an IMSI. The method and system may further comprise a communications server (10) which may include any one of an LCS server, an LTE base station server, an LTE wireless network communications server, a gateway server, a cellular service provider server, a cloud server, or a combination thereof. In one embodiment, the communications server (10) may include an LTE base station server linked to the Internet and to a cloud system (60) providing on-demand computational capabilities available over the Internet. The method may further comprise first interrogating, at a communications server (10), the predicted spatiotemporal trajectory of any one of the UE terminals (20, 30). The first interrogating comprises receiving (11) past and current spatiotemporal trajectory data from one or more sensors associated with any one of the UE terminals, and storing (12) the past and current spatiotemporal trajectory of any one of the UE terminals, and computing (13) the predicted spatiotemporal trajectory of the UE terminals, wherein the communications server comprises a computing device and a first embedded algorithm for spatiotemporal trajectory prediction. The method may further comprise first determining (14a) whether the spatiotemporal distance between any one of the UE terminals is within a proximity range, and obtaining (14b) a communications server notification if the first determining relates a UE terminal belonging to a vehicle and a UE terminal belonging to a VRU, and tagging (15) these two UE terminals as notified UE terminals. Some of the steps of first interrogating (12, 13, 14a, 14b, 14c) may be distributed among edge (10) and cloud (60) systems. Also, VRU and vehicle UE terminals (20, 30) at the edge may take charge of specific, time-sensitive, low-CPU computational tasks, whereas the cloud (60) may take charge of CPU-intensive computational tasks such as ML training. These tasks distributed at the edge and at the cloud may refer to computer-executable tasks comprising hardware, firmware or software algorithms, or a combination thereof. Other communications configuration relating edge (10, 20, 30) and cloud (60) systems at a road intersection may be contemplated within the scope of the described technology for first determining whether the spatiotemporal distance between any one of the UE terminals (20, 30) is within a proximity range.

As used herein, the term 'proximity range' generally refers to a dimensional safety margin for providing danger notification(s) pertaining to road safety with sufficient lead time to react, which may represent a distance of about 20 meters to about 50 meters or more between a VRU and a vehicle. This range of proximity between a VRU and a vehicle may be required in order to provide sufficient lead time to react to a potential accident as well as to establish a provision of danger notifications pertaining to road safety, for both the VRU and the vehicle. Also, as used herein, the term 'edge' generally refers to a computing paradigm distributed to electronic peripherals that brings computation and data storage closer to the location where it is needed, to improve response times and save bandwidth. According to one aspect of the described technology, the UE terminals linked to VRUs or to vehicles may represent edge systems as they provide computational capabilities close to the location where it is needed (e.g., at the VRUs or at the vehicles). Also, as used herein, the term 'cloud' generally refers to on-demand availability of computer system resources, especially data storage and computing power, without direct active management by the user. The term is generally used to describe distant data centers or central servers available to many users over the Internet. According to one aspect of the described technology, the communications server may represent a cloud system as it provides extensive on-demand computational capabilities available over the Internet. According to one aspect of the described technology, the communications server may include any one of an LCS server, an LTE base station server, an LTE wireless network communications server, a gateway server, a cellular service provider server, a cloud server, or a combination thereof. Also, as used herein, the term 'machine learning (ML)' generally refers to a subset of AI that refers to the study of computer algorithms that improve automatically through increasing data accumulation. ML algorithms build a mathematical model (e.g., a model configuration) based on sample data (known as "training data"), in order to make predictions or decisions without being explicitly programmed to do so. As used herein, the term ML may also refer to the subset of Supervised learning, wherein the computer (e.g., the communications server) is presented with example inputs and their desired outputs (e.g., training data), given by a predetermined model or configuration, and the goal is to learn a general rule (e.g., model configuration) that maps inputs to outputs (e.g., best-fitting model parameters). For example, in the dead reckoning technique, the model configuration may relate to Newton's laws of motion, whereas, in the AI technique, the model configuration may relate to an RNN algorithm, or an RL algorithm, and/or a CRFs algorithm. The described technology is not limited to these specific model configurations.

According to one aspect of the described technology, the method for collision avoidance between VRUs and vehicles may include comparing a set of past, current and predicted expanded spatiotemporal points $X=X(x, y, z, t, dx/dt, dy/dt, dz/dt, d^2x/dt^2, d^2y/dt^2, d^2z/dt^2, \theta_x, \theta_y, \theta_z, d\theta_x/dt, d\theta_y/dt, d\theta_z, d^2\theta_x/dt^2, d^2\theta_y/dt^2, d^2\theta_z/dt^2)$ for a plurality of VRU ($X_{VRU}$) and for a plurality of vehicles ($X_{vehicle}$) moving along trajectories represented by their geolocation, velocity, and gyroscopic coordinates in three-dimensional space and time. The comparison between $X_{VRU}$ and $X_{vehicle}$ may thus involve a wide range of possible different combinations between their respective sets of past, current and predicted spatiotemporal points (x, y, z, t, dx/dt, dy/dt, dz/dt, $d^2x/dt^2$, $d^2y/dt^2$, $d^2z/dt^2$, $\theta_x$, $\theta_y$, $\theta_z$, $d\theta_x/dt$, $d\theta_y/dt$, $d\theta_z$, $d^2\theta_x/dt^2$, $d^2\theta_y/dt^2$, $d^2\theta_z/dt^2$). Such range of possible different combinations may represent about $n^2(n+1)$ different combinations for comparison determinations, or about 7000 possible different combinations if 19 spatiotemporal points are considered in the expanded spatiotemporal data sets.

According to one aspect of the described technology, a 'proximity range' R may be defined by comparing the predicted spatiotemporal distance between $X_{VRU}(x, y, t)$ and $X_{vehicle}(x, y, t)$ at a given future time t such that the difference for a given two-dimensional roadspace framework is minimized, e.g., $R=\min|(X_{VRU}(x, y, t)-X_{vehicle}(x, y, t))|$, whereas the proximity range may represent the closest predicted approach between a VRU and a vehicle on a road at a future time t based on the first embedded algorithm for spatiotemporal trajectory prediction. In the context of road safety, the proximity range may represent a distance at which a collision-avoidance system may start to 'look more carefully' for possible unsafe close approach between a VRU and a vehicle, given the intrinsic accuracy and reliability positioning limits of GPS- or LTE-capable terminals and the need to establish a safe distance between the VRU and a vehicle upon closest approach. Therefore, according to one embodiment, the method for collision avoidance between VRUs and vehicles may comprise a set of rules based on the spatiotemporal distance between $X_{VRU}$ and $X_{vehicle}$ such that a proximity range R may be given by: $R=\min|(X_{VRU}-X_{vehicle})|$.

More generally, according to one aspect of this disclosure, the proximity range may represent a distance at which a collision-avoidance system may start to 'look more carefully' for possible unsafe close approach between a VRU and a vehicle, and at which it may start to activate a more accurate 'proximity measure' based on short-range communications devices, given the intrinsic accuracy and reliability positioning limits of GPS- or LTE-capable terminals.

In the context of road safety, the proximity range may be used advantageously in order to determine a dimensional safety margin for establishing a provision of danger notifications with sufficient lead time to react. For the purpose of collision avoidance between VRUs and vehicles, 'time to react' may refer to the reaction time of the driver to become fully aware of the danger and to decide how and when to slow down the vehicle to prevent an accident before it happens. Likewise for the VRU, 'time to react' may refer to the reaction time of a pedestrian to become fully aware of the danger and to decide how and when to move away to avoid the accident before it happens. Typically, the reaction time to become fully aware of a danger is of the order of about 2 seconds, and the time required to slow down a vehicle to prevent an accident depends on its speed, and may be of the order of about 5 seconds at a speed of about 50 km/h. Therefore, a dimensional safety margin (e.g., a proximity range) of about 20 meters or more, about 30 meters or more, or about 50 meters or more, depending on vehicle speed and driver alertness, may be necessary for establishing a provision of danger notifications with sufficient lead time to react, which may represent about 5 seconds or more, about 10 seconds or more, or about 15 seconds or more, before reaching the vehicle-to-VRU proximity threshold limit, which is a dimensional safety margin for the VRU to establish a safe distance between the VRU and a vehicle, which may represent a distance of about 2 to about 5 meters.

Therefore, according to one aspect of the described technology, a proximity range R may be defined by comparing the predicted spatiotemporal distance between $X_{VRU}(x, y, dx/dt, dy/dt, t)$ and $X_{vehicle}(x, y, dx/dt, dy/dt, t)$ at a given future time t and for given speeds (dx/dt, dy/dt), such that the difference for a given two-dimensional roadspace framework is minimized and is function of speed, e.g., $R(x, y, dx/dt, dy/dt)=\min|(X_{VRU}(x, y, dx/dt, dy/dt, t)-X_{vehicle}(x, y, dx/dt, dy/dt, t))|$, whereas the proximity range represents the closest predicted approach between a VRU and a vehicle on a road at a future time t that may be about 5 seconds or more, about 10 seconds or more, or about 15 seconds or more into the future. If the proximity range R is smaller than a dimensional safety margin M of about 20 meters or more, about 30 meters or more, or about 50 meters or more (e.g., if R<M), then the collision-avoidance system may start to 'look more carefully' for possible unsafe close approach between a VRU and a vehicle, and decide to implement a provision of danger notification to the VRU and the vehicle for collision avoidance.

As 'collision avoidance' relates to the field of road safety, collision avoidance between VRUs and vehicles requires a provision of "danger notifications" to VRUs and to nearby approaching vehicles, wherein the danger notifications may be triggered according to a set of rules that take into account VRUs and vehicles past, current and predicted trajectories, as well as proximity threshold limits for danger avoidance between VRUs and vehicles.

Figure 16:
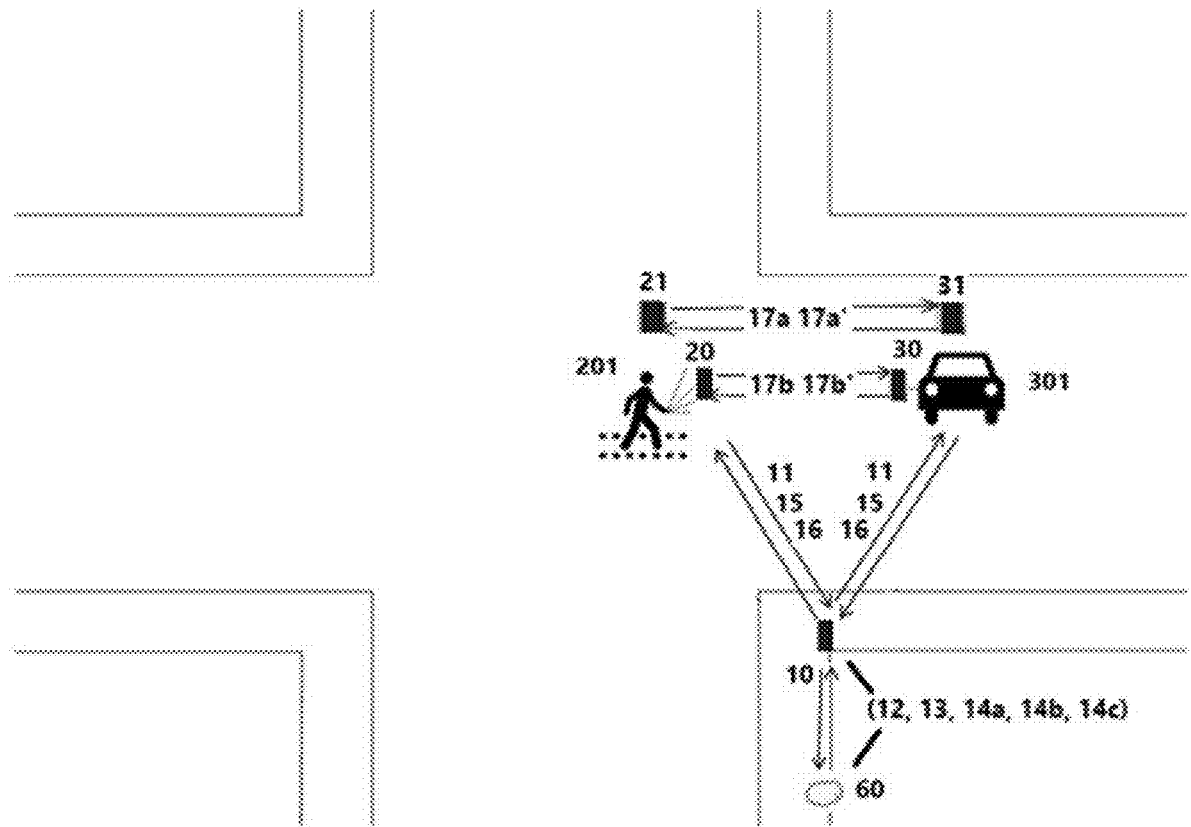
FIG. 16 illustrates one embodiment of a communications configuration for the method of collision avoidance between VRUs and vehicles, wherein the communications configuration includes proximity communications among edge systems at a road intersection.

FIG. 16 illustrates one embodiment of a communications configuration for the method of collision avoidance between VRU and vehicles, wherein the communications configuration may include proximity communications among edge systems at a road intersection. According to one embodiment, if the two UE terminals are tagged (15) as notified UE terminals, then the method for collision avoidance between VRUs and vehicles may further comprise a second interrogating, wherein the second interrogating occurs among the edge participants (10, 201, 301) of the configuration illustrated in FIG. 16. The second interrogating may comprise acknowledging (16) the communications server notification (e.g., such that the notified UE terminals (20, 30) 'confirm that they are aware' of a probable accident course), and activating (17a) a first proximity signal including a modulated optical emission. The first proximity signal is emitted by an optical device (31) attached to the vehicle (301) linked to the notified UE terminal (30) belonging to the vehicle, and the first proximity signal is reflected (17a') by the non-Lambertian reflecting surface (21) linked to the VRU (201). The second interrogating may further comprise activating (17b) a second proximity signal between the notified UE terminals (20, 30), including a radio frequency emission, such that the second proximity signal (17b), and any replication or acknowledgement (17b') from the other notified UE terminal, may create a 'beacon that forces the notified UE terminals (20, 30) to be seen' despite any obstacles that block the direct optical/lidar/radar view. According to one embodiment, the second proximity signal (17b) may include a radio frequency communication signal configured with any one of IEEE 802, IEEE 802.11, or IEEE 802.15 signal protocols, or a combination thereof.

According to one aspect of the described technology and referring to FIG. 16, the first proximity signal (17a) may include a light-emitting diode (LED) optical signal, or a laser optical signal, emitting in the range of optical wavelengths comprising visible or infrared wavelengths. The first proximity signal (17a) may be modulated with, for example, time modulation, frequency modulation, phase modulation, polarization modulation, or a combination thereof. The optical receiver (31) receiving the retro-reflected optical signal from the non-Lambertian reflecting surface (21) may further comprise a time-, frequency-, phase-, or polarization-based amplifier such as a positive-feedback loop amplifier, a heterodyne amplifier, and/or any other type of amplifiers. Improving proximity signal receptivity may be provided by a photodiode, which is an optical receiving device that can increase the power of an optical signal through transistor-based amplifiers such as operational amplifiers, positive-feedback amplifiers, heterodyne amplifiers, or the like. This aspect of the described technology may provide for an improved signal-to-noise ratio and improved signal selectivity in reception in the context of high street-lamp optical noise in urban environments. As used herein, the term 'positive feedback loop' generally refers to an electronics process that occurs in a feedback loop which amplifies small input signals, or which provides positive gain in order to boost small signal in reception. As used herein, the term 'heterodyne' generally refers to a type of radio receiver that uses frequency mixing to convert a received signal to a fixed intermediate frequency which can be more conveniently processed (e.g., filtered and amplified) than the original carrier frequency. The present described technology is not limited to these specific examples for amplifying reflected optical wavelength.

Also, according to one aspect of the described technology and referring to FIG. 16, the second proximity signal (17b) may include a radio frequency communication signal configured with any one of IEEE 802, IEEE 802.11, or IEEE 802.15 signal protocols, or a combination thereof. The second proximity signal (17b) may be modulated with, for example, time modulation, frequency modulation, phase modulation, polarization modulation, or a combination thereof. The notified UE terminals (20, 30) may further comprise a time-, frequency-, phase-, or polarization-based amplifier such as a positive-feedback loop amplifier, a heterodyne amplifier, and/or any other type of amplifiers. Improving proximity signal receptivity may be provided by an electronic amplifier, which is an electronic device that can increase the power of a signal (either voltage or current), such as a transistor-based amplifier such as operational amplifiers, positive-feedback amplifiers, heterodyne amplifiers, or the like. This aspect of the described technology may provide for an improved signal-to-noise ratio and improved signal selectivity in reception (e.g., better proximity signal receptivity and selectivity at the other notified UE terminal) in the context of high radio-frequency noise in urban environments at unregulated, for example, 900 MHz, 2.4 GHz, and 5.8 GHz band frequencies. These frequencies are merely examples and other unregulated frequency ranges may also be used. As used herein, the term 'positive feedback loop' generally refers to an electronics process that occurs in a feedback loop which amplifies small input signals, or which provides positive gain in order to boost small signal in reception. As used herein, the term 'heterodyne' generally refers to a type of radio receiver that uses frequency mixing to convert a received signal to a fixed intermediate frequency which can be more conveniently processed (e.g., filtered and amplified) than the original carrier frequency. The present described technology is not limited to these specific examples, and the proximity signal may be configured as an interoperable edge system that enables communications between (IEEE 802)-capable UE terminals exhibiting other types of electronics devices for improving signal-to-noise ratio and improving signal selectivity in reception.

Figure 17:
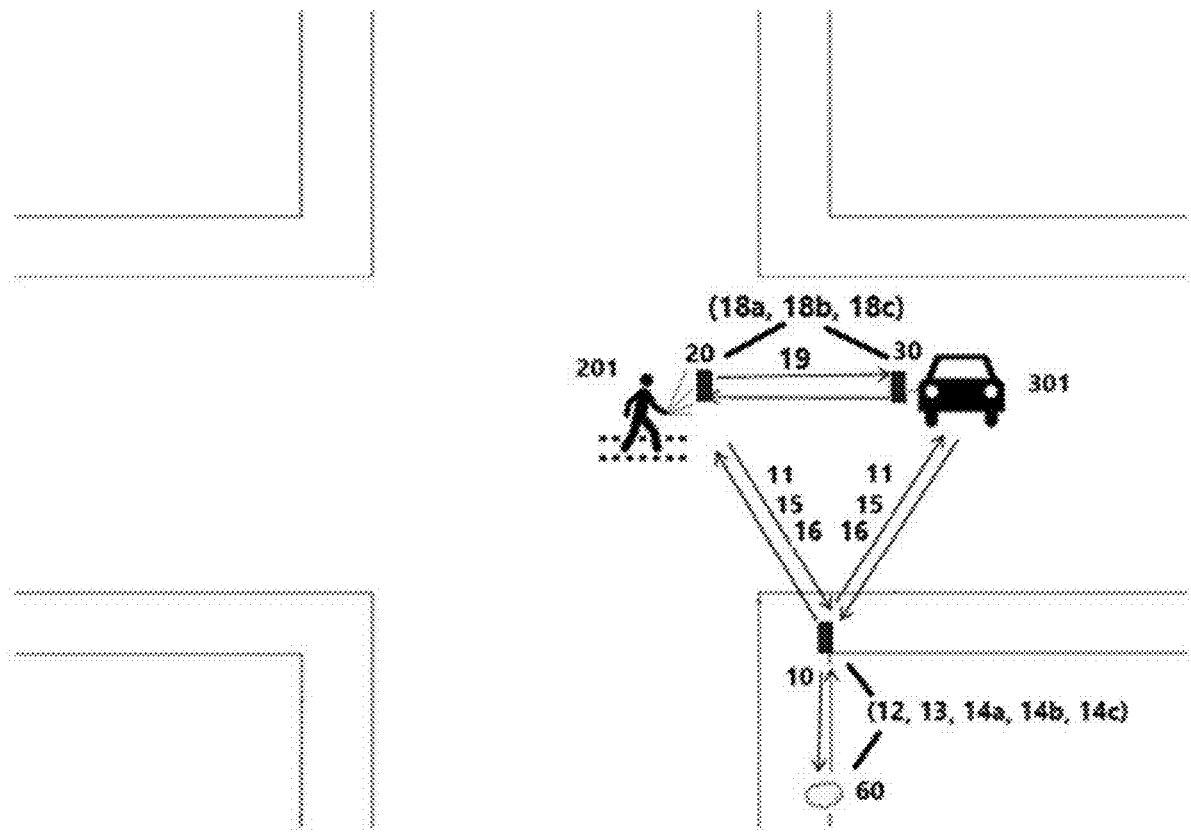
FIG. 17 illustrates one embodiment of a communications configuration for the method of collision avoidance between VRUs and vehicles, wherein the communications configuration includes a distributed artificial intelligence (A) among edge systems at a road intersection.

FIG. 17 illustrates one embodiment of a communications configuration for the method of collision avoidance between VRUs and vehicles, wherein the communications configuration may include a distributed AI among edge systems at a road intersection. According to one embodiment, if the two UE terminals are tagged (15) as notified UE terminals, then the method for collision avoidance between VRUs and vehicles may comprise second interrogating. The second interrogating may include computing (18a) the predicted spatiotemporal proximity of each the notified UE terminals (20, 30), wherein each of the notified UE terminals comprises a processor device (e.g., a smartphone processor) and a second embedded algorithm for spatiotemporal proximity prediction (e.g., an AI application). The second interrogating may also include second determining (18b) whether the predicted spatiotemporal proximity between the notified UE terminals is within a proximity threshold limit. The second interrogating may further comprise providing (19) a danger notification to each of the notified UE terminals (20, 30) pertaining to road usage safety based on the results of computational steps (18a, 18b, 18c).

According to one aspect of the described technology, the method for collision avoidance between VRUs and vehicles may comprise a set of rules that take into account whether the proximity range $R=\min|(X_{VRU}-X_{vehicle})|$ between any one of the UE terminals is smaller than a given dimensional safety margin M at a future time t. If the proximity condition (e.g., if R<M) is reached, the communications server may obtain a 'communications server notification' if the proximity range involves a UE terminal belonging to a vehicle and a UE terminal belonging to a VRU. The communications server may tag these two approaching UE terminals as 'notified UE terminals', and the communications server notification may include a duet comprising the mobile equipment identifier (MEID) of the notified UE terminal belonging to the vehicle and the MEID of the notified UE terminal belonging to the VRU. As used herein, the term 'MEID' generally refers to a globally unique number identifying a physical piece of mobile equipment. Depending on the closest predicted approach R between the notified VRU and the notified vehicle, and depending on their respective speeds, the communications server may set, for each of the notified UE terminals, providing a danger notification pertaining to road usage safety. The danger notification may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, or any combination thereof.

According to one aspect of the described technology, the danger notification may include a prescription for collision avoidance including the prescription for applying brakes to slow down or to stop the vehicle through the advanced driver assistant system (ADAS) or the automated driving system (ADS) of the notified vehicle. The braking distance refers to the distance a vehicle will travel from the point when its brakes are fully applied to when it comes to a complete stop. It is primarily affected by the original speed dx/dt of the vehicle and the coefficient of friction between the tires and the road surface, and the reaction distance, which is the product of the speed and the perception-reaction time of the driver. An average perception-reaction time of $t_r$=1.5 seconds ($\sigma t_r$=0.5 second), and an average coefficient of kinetic friction of $\mu_x$=0.7 ($\sigma\mu_x$=0.15) are standard for the purpose of determining a bare baseline for accident reconstruction and judicial notice. However, a keen and alert driver may have perception-reaction times well below 1 second, and a modem car with computerized anti-skid brakes may have a friction coefficient above 0.9, thus the braking distance problem involves variances (e.g., standard deviations ($\sigma$)) for both $t_r$ and $\mu_x$. The total stopping distance $D_x$ along the driving direction is the sum of the perception-reaction distance and the braking distance: $D_x=t_r\cdot dx/dt+(dx/dt)^2/2\mu_x$ g. Other measures pertaining to road safety may be included in the provision of danger notification. Other measures pertaining to changing the vehicle direction, or swerving to avoid the VRU, may be considered as well. In this case, the total swerving distance $D_y$ away from (or transversal to) the driving direction is given by the capacity of the vehicle to stay in axial control during a turn, which relates to an average lateral coefficient of kinetic friction of about $\mu_y$=0.3 ($\sigma\mu_y$=0.1): $D_y=(dy/dt)^2/2\mu_y$ g. Therefore, when the vehicle is notified of a danger, the danger notification may include a prescription for collision avoidance including (dx/dt) and $(dy/dt^2)$ terms in the predicted spatiotemporal trajectory of the notified UE terminal belonging to the vehicle, which relates approximately to the shape of an ellipse if mapped on the road. Since the capacity to brake is higher than the capacity to swerve (e.g., $\mu_x > \mu_y$), the predicted spatiotemporal trajectory of the notified UE terminal belonging to the vehicle may exhibit a higher trajectory probability along the direction of driving in order to maintain vehicle control, and a progressively lower trajectory probability given the standard deviations ($\sigma$) for $t_r$, $\mu_x$ and, $\mu_y$. Therefore, the set of rules for providing a danger notification may relate to a proximity range shaped like an ellipse, wherein the major axis of the ellipse is coincident with the predicted spatiotemporal trajectory of the notified UE terminal belonging to the vehicle, and wherein the major axis length is 20 meters or more, or 30 meters or more, or 50 meters or more. The proximity range R(x, y, dx/dt, dy/dt) may be shaped like an ellipse because vehicle control is best preserved if the driving is maintained along the vehicle trajectory.

According to one aspect of the described technology, the dimensional safety margin M may relate to a collision-probability assessment, or a Confidence factor, such that if the dimensional safety margin M is set at a small value, the probability of collision will be higher. Therefore, the proximity range R may be shaped like an ensemble of n concatenated ellipses, wherein smaller ellipses relate to higher collision-probability assessments. If the proximity condition (e.g., if $R<M_n$) is reached, the collision-probability assessments (or the Confidence factor) will be progressively higher as $M_n$ goes from $M_1$=50 meters, to $M_2$=30 meters, to $M_3$=20 meters, and so forth, with n scaled to a collision-probability assessment, or to a Confidence factor. Other scales may be used for collision-probability assessment.

The use of a distributed computational framework, in which the training data describing the problem is stored in a distributed fashion across a number of interconnected nodes, may be implemented in the context of distributed AI among edge and cloud systems. In such distributed AI, cloud systems may be charged with computationally intensive applications, and edge systems may be charged with low-latency, time-critical, low-energy, and low-data consuming applications, such that the optimization problem is solved collectively and efficiently (time-wise, energy-wise and data-wise) by the cluster of interconnected edge and cloud nodes. According to one aspect of the described technology, the computer-intensive steps (e.g., determining the ML model) may be executed at a cloud system (e.g., at the communications server), whereas the time-critical non-computer-intensive steps (e.g., updating the spatiotemporal trajectory prediction with the latest available data) may be executed at an edge system (e.g., distributed over the UE terminals), such that the problem (e.g., predicting the spatiotemporal trajectory of VRUs and vehicles) is solved collectively and efficiently (e.g., time-wise, energy-wise and data-wise) by the cluster of interconnected edge and cloud nodes.

According to one aspect of the described technology, and following the above-mentioned methods for determining, or predicting, the spatiotemporal trajectory of VRUs and vehicles, the method for collision avoidance between VRUs and vehicles based on reflected optical signal may comprise linking, to a plurality of VRUs, non-Lambertian reflecting surfaces. As used herein, the term 'non-Lambertian reflecting surface' generally refers to the optical reflecting property such that the surface's reflecting luminance is non-isotropic, and the reflective luminous intensity does not obey Lambert's cosine law. More technically, the apparent reflecting brightness of a non-Lambertian surface to an observer is different depending on the observer's angle of view. Such optical property is usually found in non-matte surfaces. According to one embodiment, non-Lambertian reflecting surfaces may include corrugated surfaces, woven surfaces, textile surfaces, retro-reflective surfaces, off-specular reflection surfaces, polarizing surfaces, photonic-bandgap surfaces, or a combination thereof.

According to one aspect of the described technology, the method for collision avoidance between VRUs and vehicles based on reflected optical signal may comprise: second interrogating the predicted spatiotemporal proximity, wherein second interrogating comprises the steps of acknowledging the communications server notification, and activating a first proximity signal including a modulated optical emission, and activating a second proximity signal including a radio-frequency emission, and computing the predicted spatiotemporal proximity based on first and second proximity signals, wherein the notified UE terminal belonging to a vehicle comprise a processor device and a second embedded algorithm for spatiotemporal proximity prediction, and second determining whether the predicted spatiotemporal proximity is within a proximity threshold limit, and third determining whether the rate of approaching of the predicted spatiotemporal proximity is increasing, and providing a danger notification pertaining to road usage safety based on first, second, and third determining.

As used herein, the term 'emission' generally refers to an electromagnetic signal produced or emitted by a radio-transmitting or optical-emitting device, and may refer more broadly to any frequencies of electromagnetic radiation produced or emitted by a device, wherein the device refers to any one of each of the notified UE terminals. Also, as used herein, the term 'emitted signal' generally refers to a modulated electromagnetic radiation emitted by a device, wherein the modulation is configured in space and time to act on the intensity, the frequency, the phase, the polarization of the electromagnetic radiation, or a combination thereof. Also, as used herein, the term 'predicted spatiotemporal proximity' generally refers to a distance at a given time coincident with the closest predicted spatiotemporal trajectory approach between a VRU and a vehicle, based on the second embedded algorithm for spatiotemporal proximity prediction. Also, as used herein, the term 'proximity threshold limit' generally refers to a dimensional safety margin for the VRU to establish a safe distance between a VRU and a vehicle at their closest approach, which may represent a distance of at least about 2 to about 5 meters or more.

According to one aspect of the described technology, if the proximity condition (e.g., if R<M) is reached, then the method for collision avoidance between VRUs and vehicles may further comprise the step of acknowledging, at the notified UE terminals, the communications server notification, wherein the acknowledging of the communications server notification further comprises the step of activating 'proximity signals' between the two notified UE terminals, wherein the proximity signals are configured to act as ranging signals for determining spatial proximity between the two notified UE terminals.

According to one aspect of the described technology, if the proximity condition (e.g., if R<M) is reached, then a first proximity signal including a modulated optical emission may be activated at the vehicle linked to the notified UE terminal belonging to the vehicle. The first proximity signal may include an LED optical signal, or a laser optical signal, emitting in the range of optical wavelengths comprising visible and/or infrared wavelengths, and may further comprise time modulation, frequency modulation, phase modulation, polarization modulation, or a combination thereof. According to one embodiment, the first proximity signal may include a circularly-polarized LED optical signal activated by an optical device attached to the vehicle linked to the notified UE terminal belonging to the vehicle (e.g., on the vehicle rooftop or at the vehicle headlights). As used herein, the term 'circular polarization' generally refers to an electromagnetic polarization state in which, at each point of the electromagnetic wave, the electromagnetic field of the wave has a constant magnitude but its direction rotates at a constant rate in a plane perpendicular to the direction of the wave, wherein the rate may be adjusted in the Hertz to Megahertz regime.

According to one embodiment, the first proximity signal may include a time-modulated dual-wavelength laser optical signal activated by a laser device attached to the vehicle linked to the notified UE terminal belonging to the vehicle (e.g., on the vehicle rooftop or at the vehicle headlights). The laser device may include a semiconductor laser emitting at two different near-infrared wavelengths (e.g., about 750 nm and about 920 nm) sequentially switched on and off, or interleaved, at a constant rate, wherein the rate may be adjusted in the Hertz to Megahertz regime.

According to one aspect of the described technology, if the proximity condition (e.g., if R<M) is reached, then a second proximity signal may be activated at any one of the notified UE terminals, wherein the second proximity signal may include a radio frequency communication signal configured with any one of IEEE 802, IEEE 802.11, or IEEE 802.15 signal protocols, or a combination thereof. Most UE terminals based on smartphones or mobile tablets provide telephony capabilities, as well as local area network (LAN) wireless communications capabilities (e.g., wireless communications configured to IEEE 802.11 standards, e.g., WiFi), and as well as wireless personal area network (WPAN) capabilities (e.g., wireless communications configured to IEEE 802.15 standards, e.g., Bluetooth), including the user interface for setting these capabilities. Without limiting the scope of the described technology, other UE terminals may comprise other IEEE 802 communications configurations including Ultra-wide Band (UWB), Low-Energy Bluetooth (BLE), low-frequency or high-frequency WiFi, etc., which may provide signal ranges (e.g., maximum emitter-receiver distance) anywhere between about 20 meters to about 50 meters or more for receiving reliably the proximity signal.

According to one aspect of the described technology, the second proximity signal may include a radio frequency communication signal configured with any one of IEEE 802, IEEE 802.11, or IEEE 802.15 signal protocols, or a combination thereof, and may comprise time modulation, frequency modulation, phase modulation, polarization modulation, or a combination thereof. This signal-modulation aspect of the described technology may provide for an improved signal-to-noise ratio in reception (e.g., better proximity signal receptivity at the other notified UE terminal) in the context of high radio-frequency noise in urban environments at unregulated 900 MHz, 2.4 GHz, and 5.8 GHz band frequencies. These frequencies are merely examples and other unregulated frequency ranges may also be used. According to one embodiment, the proximity signal may include a time-frequency modulation configured to direct sequence spread spectrum (DSSS), which is a spread spectrum technique whereby the original data signal is multiplied with a pseudo random noise spreading code. According to another embodiment, the proximity signal may include a time-frequency modulation configured to frequency-hopping spread spectrum (FHSS), which is a transmission technology used in LAN transmissions where the data signal is modulated with a narrowband carrier signal that "hops" in a random but predictable sequence from frequency to frequency as a function of time over a wide band of frequencies. Other time modulations, frequency modulations, phase modulations, polarization modulations, or combination thereof, may be used for the proximity signal.

Figure 18:
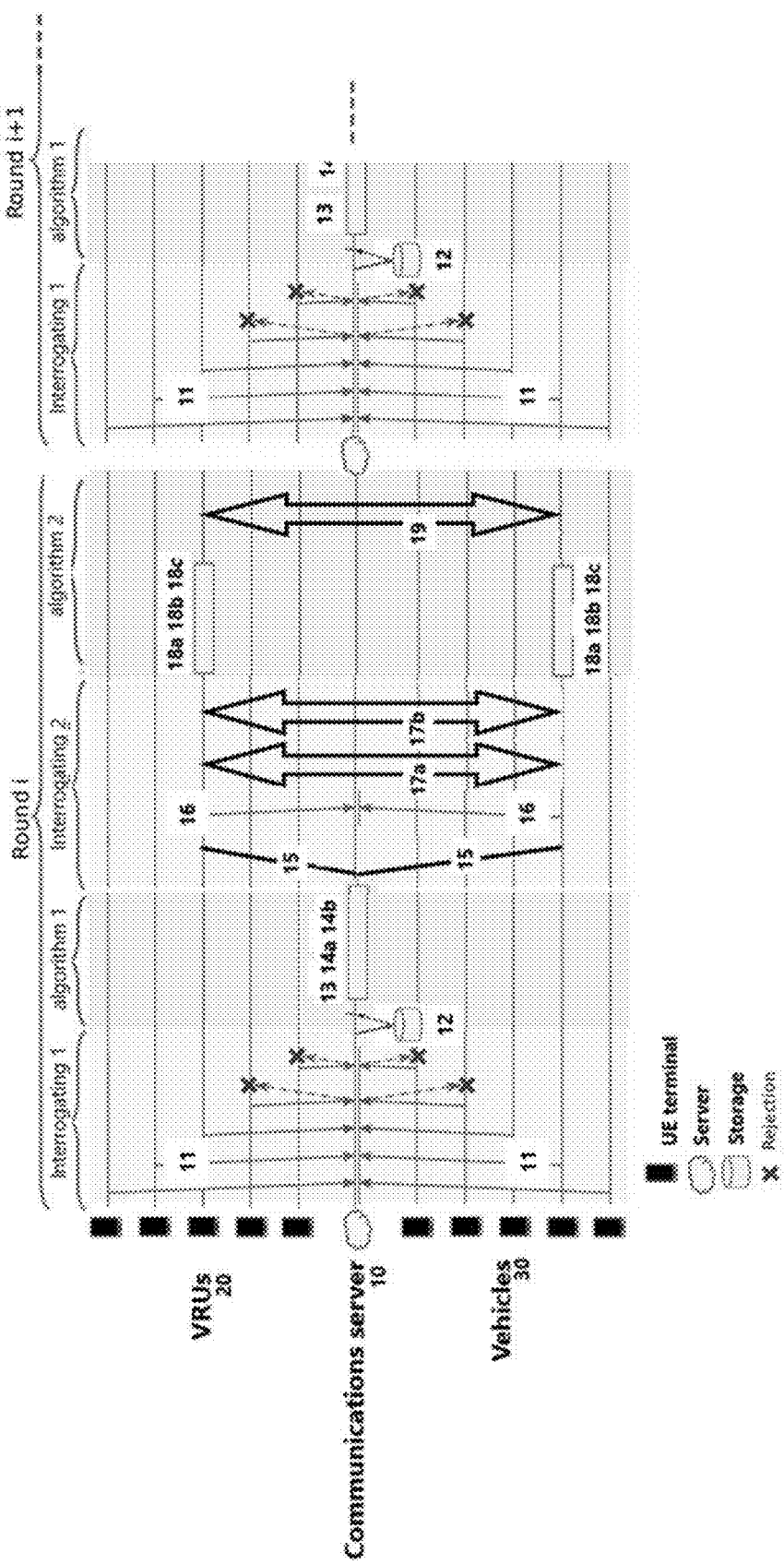
FIG. 18 illustrates a flow diagram related to a method and a system for collision avoidance between VRUs and vehicles as a distributed AI among edge and cloud systems.

FIG. 18 illustrates a flow diagram related to a method and a system for collision avoidance between VRUs and vehicles as a distributed AI among edge and cloud systems. Referring to FIGS. 15 to 18, the method comprises: linking, to a plurality of vehicles (301), LTE-capable UE terminals (30) including or exhibiting IMSI, linking, to a plurality of VRUs (201), LTE-capable UE terminals (20) including or exhibiting IMSI and linking, to a plurality of VRUs (201), non-Lambertian reflecting surfaces (21). The method may also comprise first interrogating, at a communications server (10), the predicted spatiotemporal trajectory of at least one of the UE terminals (20, 30). The first interrogating may comprise receiving (11) past and current spatiotemporal trajectory data from one or more sensors associated with at least one of the UE terminals (20, 30), and storing (12) the past and current spatiotemporal trajectory of the at least one of the UE terminals. The first interrogating may also comprise computing (13) the predicted spatiotemporal trajectory of the UE terminals, wherein the communications server (10) comprises a computing device and a first embedded algorithm for spatiotemporal trajectory prediction. The first interrogating may further comprise first determining (14a) whether the spatiotemporal distance between any one pair of the UE terminals is within a proximity range. The first interrogating may further comprise obtaining (14b) a communications server notification if the first determining relates a first one of the UE terminals belonging to a vehicle and a second one of the UE terminals belonging to a VRU, and tagging (15) these two UE terminals as notified UE terminals. The method may also comprise second interrogating the predicted spatiotemporal proximity. The second interrogating may comprise acknowledging (16) the communications server notification, activating a first proximity signal (17a) including a modulated optical emission, and activating a second proximity signal (17b) including a radio-frequency emission. The second interrogating may also comprise computing (18a) the predicted spatiotemporal proximity based on first and second proximity signals, wherein the second one of the notified UE terminals belonging to a vehicle comprises a processor device and a second embedded algorithm for spatiotemporal proximity prediction. The second interrogating may further comprise second determining (18b) whether the predicted spatiotemporal proximity is within a proximity threshold limit, and third determining (18c) whether the rate of approaching of the predicted spatiotemporal proximity is increasing. The second interrogating may further comprise providing (19) a danger notification pertaining to road usage safety based on the first, second, and third determining.

Figure 19:
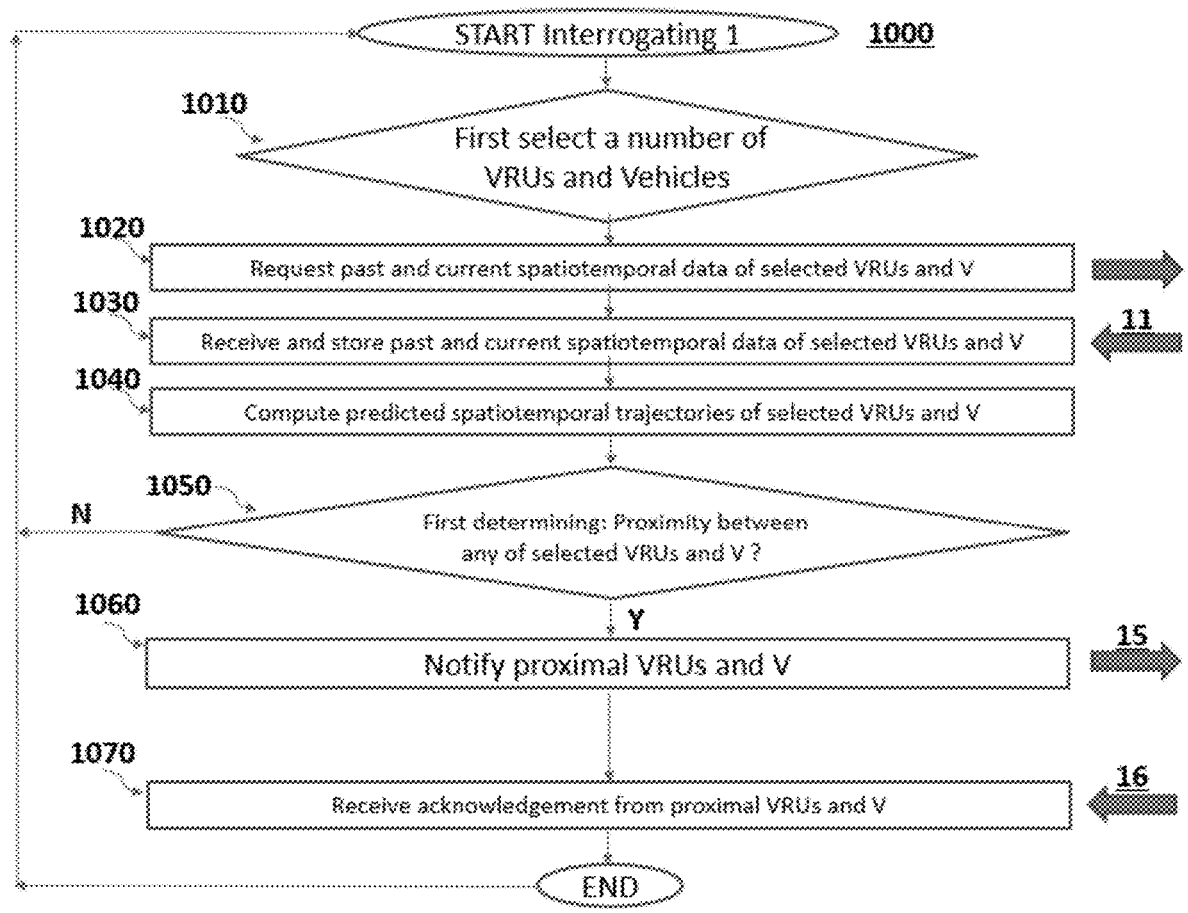
FIG. 19 illustrates a flowchart to be performed by the communications server pertaining to the first interrogating for the method and system for collision avoidance between VRUs and vehicles, as a distributed AI comprising a series of transactions and communications among edge and cloud systems.

FIG. 19 illustrates a flowchart for a process 1000 to be performed by the communications server pertaining to the first interrogating for the method and system for collision avoidance between VRUs and vehicles, as a distributed AI comprising a series of transactions and communications among edge and cloud systems. According to one embodiment, the flow diagram of FIG. 18 may be translated into one or more flowcharts that can provide the functional steps required to perform the first interrogation (e.g., interrogating 1) at the communications server 10. Referring to FIGS. 18 and 19, and according to one embodiment, the process 1000 for collision avoidance between VRUs and vehicles may start interrogating (first interrogating), at a communications server (10), for predicting the spatiotemporal trajectory of any one of a plurality of UE terminals belonging to the VRUs (20) and vehicles (30). The communications server (10), which may be referred to herein as a cloud system, may start executing this flowchart (also referred to the 'start' point of FIG. 19, or to the start point of 'Round-i' of FIG. 18) by selecting (1010) a number of VRUs (20) and a number of vehicles (30) located within a given geographic area. The given geographic area may correspond, for example, to a number of VRUs and vehicles located within a specific geographic area that may be equivalent to about 1 kilometer by about 1 kilometer, or located within one city block, or to any area encompassing one hundred or more VRUs and vehicles, or to any other numbers of VRUs and vehicles or to some other geographic area dimensions. The selected VRUs and vehicles located within this given geographic area may then be requested (1020) to send past and current spatiotemporal trajectory data from one or more sensors associated with the UE terminals corresponding to each of the selected VRUs and vehicles to the communications server (10). This data, sent (11) by the UE terminals belonging to the selected VRUs and vehicles, and received and stored (1030) by the communications server (10), may provide the data necessary to compute the predicted spatiotemporal trajectory of the selected VRUs and vehicles. In order to perform this computation, the communications server may comprise a computing device and a first embedded algorithm for spatiotemporal trajectory prediction (1040), and for first determining whether the spatiotemporal distance between a UE terminal belonging to a vehicle and a UE terminal belonging to a VRU is within a proximity range (1050). If the distance is within a proximity range, then the communications server may tag these two UE terminals as notified UE terminals and a communications server notification (1060) may be sent (15) by the communications server (10) to the proximal UE terminal belonging to the tagged vehicle and to the UE terminal belonging to the tagged VRU. The first interrogating (1000) may be completed once the communications server (10) receives (16) acknowledgement messages (1070) from the UE terminal belonging to the tagged vehicle and from the UE terminal belonging to the tagged VRU. In one embodiment, one round of first interrogating (1000) may include at least four distinct communications between edge and cloud systems, lasting less than one second per series. The flowchart of the first interrogating (1000) is not limited to this example, as other transactions and configurations among edge (20, 30) and cloud (10) systems may be implemented for collision avoidance between VRU and vehicles.

Figure 20:
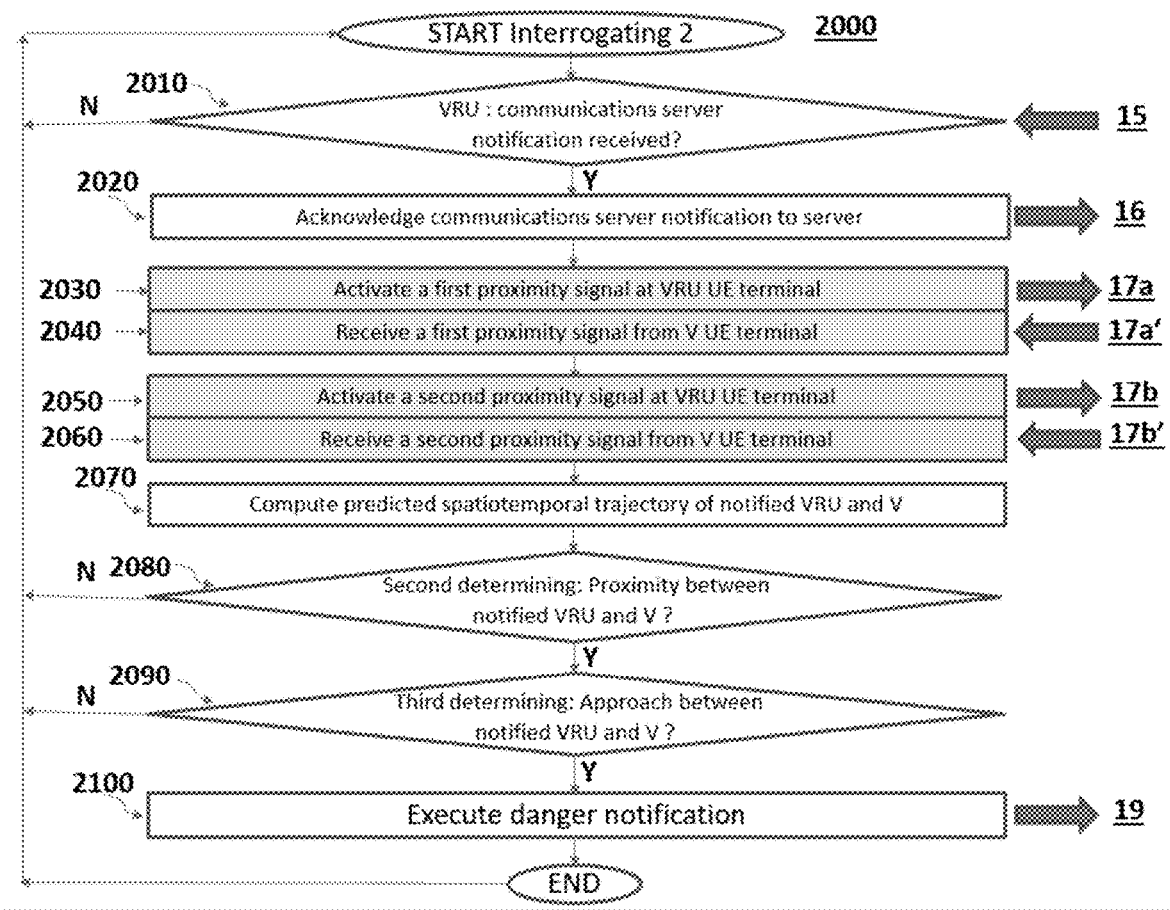
FIG. 20 illustrates a flowchart to be performed by the VRU pertaining to the second interrogating of the method and system for collision avoidance between VRUs and vehicles, as a distributed A comprising a series of transactions and communications among edge and cloud systems.

FIG. 20 illustrates a flowchart for a process 2000 to be performed by the VRU pertaining to the second interrogating of the method and system for collision avoidance between VRUs and vehicles, as a distributed AI comprising a series of transactions and communications among edge and cloud systems. According to one embodiment, the flow diagram of FIG. 18 may also be translated into a flowchart that can provide the functional steps required to perform the second interrogation (e.g., interrogating 2) at the VRU (20). Referring to FIGS. 18 and 20, and according to one embodiment, the process 2000 for collision avoidance between VRUs and vehicles may start interrogating (second interrogating), at a VRU (20), for predicting the spatiotemporal proximity of any one of UE terminals belonging to the VRUs (20) and vehicles (30). The VRU UE terminal (20), which may be referred to herein as an edge system, may start executing this block diagram for the second interrogation (also referred to the 'start' point of FIG. 20, or to the mid-point of 'Round-i' of FIG. 18) by awaiting that a communications server notification is received (2010, 15) from the communications server (10). If received, the notified VRU UE terminal (20) may acknowledge (2020, 16) the communications server notification and then activate a first proximity signal (2030, 17a) including a modulated optical emission radiated from an optical transmitter embedded within the notified VRU UE terminal (20). Concurrently, the notified VRU UE terminal (20) may activate its optical receiver in order to receive a first proximity signal (2040, 17a') including a modulated optical emission radiated and/or retro-reflected, from an optical transmitter embedded within the notified VRU UE terminal (30). Subsequently, the notified VRU UE terminal (20) may activate a second proximity signal (2050, 17b) including a radio frequency emission radiated from a RF transmitter embedded within the notified VRU UE terminal (20). Concurrently, the notified VRU UE terminal (20) may activate its RF receiver in order to receive a second proximity signal (2060, 17b') including a radio frequency emission from a RF transmitter embedded within the notified VRU UE terminal (30). Each of the notified UE terminals may comprise a processor device and a second embedded algorithm for spatiotemporal proximity prediction in order to compute (2070) the predicted spatiotemporal proximity of each of the notified UE terminals. A second determining (2080) is then performed by the processor device of the notified VRU UE terminal (20) to determine whether the predicted spatiotemporal proximity between each of the notified UE terminals is within a proximity threshold limit. If the second determining is positive, then a third determining (2090) is performed by the processor device of the notified VRU UE terminal (20) to determine whether the rate of approaching of the predicted spatiotemporal proximity between each of the notified UE terminals is increasing. If the third determining is positive, then a danger notification pertaining to road usage safety is set and executed (2100, 19) based on first, second, and third determining. In one embodiment, one round of second interrogating (2000) may include at least seven distinct communications between edge and cloud systems, lasting less than one second per series. The process 2000 of the second interrogating is not limited to this example, as other transactions and configurations among edge (20, 30) and cloud (10) systems may be implemented for collision avoidance between VRUs and vehicles.

Figure 21:
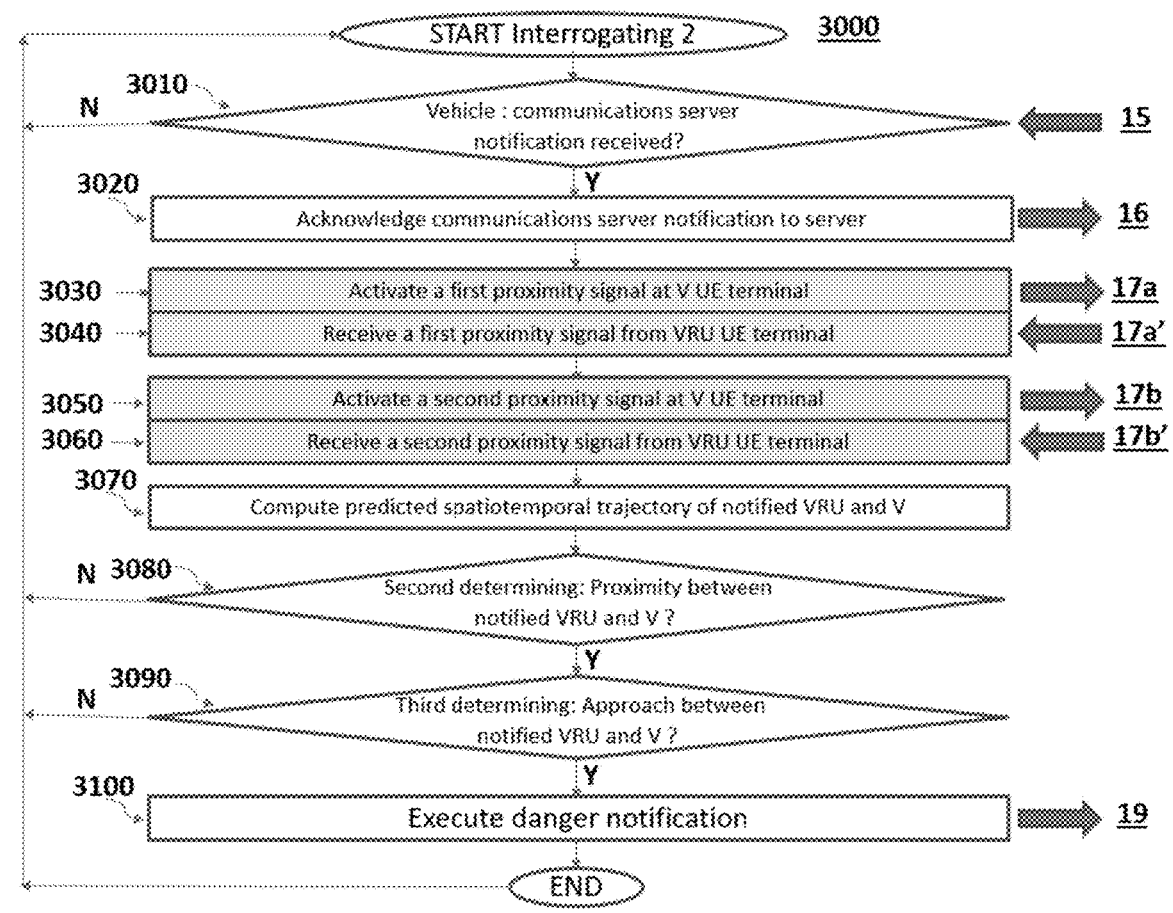
FIG. 21 illustrates a flowchart to be performed by the vehicle pertaining to the second interrogating of the method and system for collision avoidance between VRUs and vehicles, as a distributed A comprising a series of transactions and communications among edge and cloud systems.

FIG. 21 illustrates a flowchart for a process 3000 to be performed by the vehicle pertaining to the second interrogating of the method and system for collision avoidance between VRUs and vehicles, as a distributed AI comprising a series of transactions and communications among edge and cloud systems. According to one embodiment, the flow diagram of FIG. 18 may also be translated into a flowchart that can provide the functional steps required to perform the second interrogation (e.g., interrogating 2) at the vehicle (30). Referring to FIGS. 18 and 21, and according to one embodiment, the process 3000 for collision avoidance between VRUs and vehicles may start interrogating (second interrogating), at a vehicle (30), for predicting the spatiotemporal proximity of any one of UE terminals belonging to the VRUs (20) and vehicles (30). The vehicle UE terminal (30), which may be referred to herein as an edge system, may start executing this block diagram for the second interrogation (also referred to the 'start' point of FIG. 21, or to the mid-point of 'Round-i' of FIG. 18) by awaiting that a communications server notification is received (3010, 15) from the communications server (10). If received, the notified vehicle UE terminal (30) may acknowledge (3020, 16) the communications server notification and then activate a first proximity signal (3030, 17a) including a modulated optical emission radiated from an optical transmitter embedded within the notified vehicle UE terminal (30). Concurrently, the notified vehicle UE terminal (30) may activate its optical receiver in order to receive a first proximity signal (3040, 17a') including a modulated optical emission radiated and/or retro-reflected, from an optical transmitter embedded within the notified VRU UE terminal (20). Subsequently, the notified vehicle UE terminal (30) may activate a second proximity signal (3050, 17b) including a radio frequency emission radiated from a RF transmitter embedded within the notified vehicle UE terminal (30). Concurrently, the notified vehicle UE terminal (30) may activate its RF receiver in order to receive a second proximity signal (3060, 17b') including a radio frequency emission from a RF transmitter embedded within the notified VRU UE terminal (20). Each of the notified UE terminals may comprise a processor device and a second embedded algorithm for spatiotemporal proximity prediction in order to compute (3070) the predicted spatiotemporal proximity of each of the notified UE terminals. A second determining (3080) is then performed by the processor device of the notified vehicle UE terminal (30) to determine whether the predicted spatiotemporal proximity between each of the notified UE terminals is within a proximity threshold limit. If the second determining is positive, then a third determining (3090) is performed by the processor device of the notified vehicle UE terminal (30) to determine whether the rate of approaching of the predicted spatiotemporal proximity between each of the notified UE terminals is increasing. If the third determining is positive, then a danger notification pertaining to road usage safety is set and executed (3100, 19) based on first, second, and third determining. In one embodiment, one round of the process of second interrogating (3000) may exhibit at least seven distinct communications between edge and cloud systems, lasting less than one second per series. The process (3000) of the second interrogating is not limited to this example, as other transactions and configurations among edge (20, 30) and cloud (10) systems may be implemented for collision avoidance between VRUs and vehicles.

Figure 22:
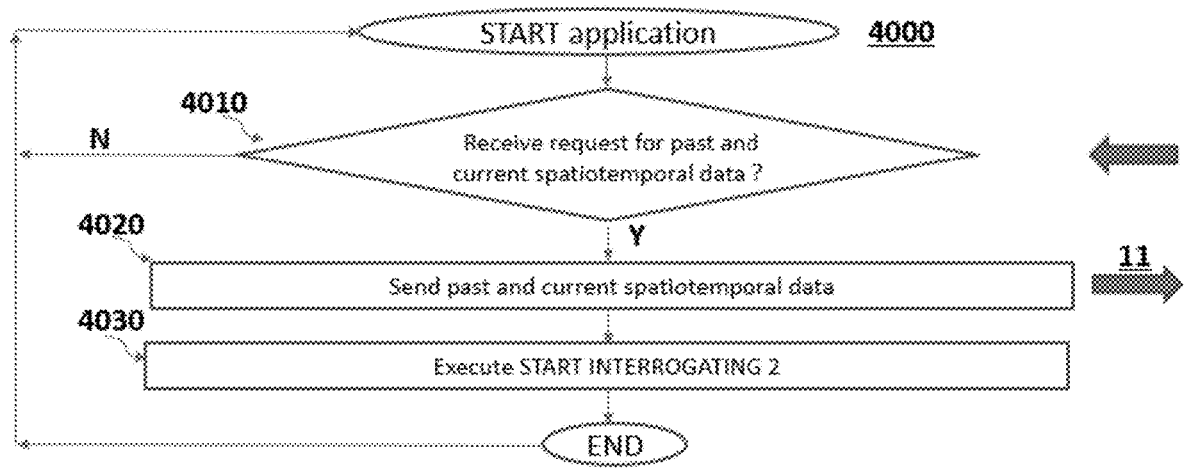
FIG. 22 illustrates a flowchart to be performed by the cloud-enabled application embedded within the UE terminals of the VRUs and vehicles, the application enabling the method and system for collision avoidance between VRUs and vehicles, as a distributed AI comprising a series of transactions and communications among edge and cloud systems.

FIG. 22 illustrates a flowchart for a process (4000) pertaining to a cloud-enabled application embedded within the UE terminals of the VRUs and vehicles. In this example, the process (4000) enables the execution of the second interrogating (4030) only if the UE terminal receives a request (4010) from the cloud to send past and current spatiotemporal trajectory data (4020, 11). UE terminals (20, 30), such as a mobile phone inserted in the pocket of the VRU or held by the VRU, attached to the dashboard of the vehicle, or disposed somewhere inside the vehicle (e.g., UE terminal that belongs to a driver or passenger of the vehicle, may comprise an internally-integrated and/or externally-attached computational unit or processor (hardware, firmware, and/or software) for processing the AI algorithms involved during interrogating 1 and interrogating 2. The computational unit may include at least one of: a mobile application, a software, a firmware, a hardware, a physical device, and a computing device, or a combination thereof. Such application may be cloud-enabled, or activated by the communications server (10), at step (1020) when the UE terminals (20, 30) are requested by the cloud (e.g., the communications server (10)) to send their past and current spatiotemporal trajectory data. The process 4000 of the application is not limited to this example, as other application-activating transactions and configurations may be implemented for enabling the execution of the second interrogating (4030) within the UE terminals of the VRUs and vehicles.

The flowcharts of FIGS. 19, 20, 21, and 22 may be grouped into one overall flowchart involving cloud and edge systems. According to one embodiment, the overall flowchart may group a sequence of functional steps involving the first interrogating (1000) and the second interrogating (2000, 3000) of the method and system for collision avoidance between VRUs (20) and vehicles (30). The sequence of functional steps distributed among cloud and edge systems may correspond to a synchronized series of cloud-edge (1000, 2000, 3000), and edge-edge (2000, 3000), transactions and communications among edge (20, 30) and cloud systems (30). The synchronization may be driven by an internal clock at the communications server (10) in order to synchronize the transmitting and receiving of data during cloud-edge transactions (11, 15, 16) and during edge-edge transactions (17a, 17a', 17b, 17b', 19).

In the context of proximity, time is critical, therefore the step of activating a second proximity signal between the two notified UE terminals may reduce LTE-based communications latency and may improve time-critical applications, such as exchanging locally (e.g., at the edge) the communications server notification and the providing of the danger notification for fast response in reaction to a potential danger. More broadly, the second proximity signal may be configured as an interoperable edge system that enables communications between (IEEE 802)-capable UE terminals and, also, that enables communications between with intelligent transportation systems (ITS)-based standards, including DSRC and C-V2X communication, which relate to local (edge) wireless communications infrastructure. As used herein, the term 'intelligent transportation system (ITS)' generally refers to traffic management applications which aim to provide road users information pertaining to the use of transport networks. The information may be provided by DSRC which are one-way or two-way short-range to medium-range wireless communication channels specifically designed for automotive use and a corresponding set of protocols and standards.

According to one embodiment of the described technology, the second embedded algorithm may include computer-executable instructions (e.g., instructions coded in hardware, firmware, software form, or a combination thereof) embedded in any one of the UE terminals, and configured to perform spatiotemporal proximity prediction based on the emitted signal.

According to one embodiment of the described technology, the second embedded algorithm may include computer-executable instructions (e.g., instructions coded in hardware, firmware, software form, or a combination thereof) embedded in any one of the UE terminals, and configured to execute received signal level (RSSI) proximity calculations, time difference of arrival (TDOA) proximity calculations, angle of arrival (AOA) proximity calculations, or a combination thereof, wherein any one of the calculations may be configured to analyze optical-frequency signals (17a), radio-frequency signals (17b), or a combination of both.

According to one embodiment of the described technology, the second embedded algorithm may be configured to execute RSSI proximity calculations. In the RSSI technique, a UE Terminal measures the received signal intensity S, generally in units of Watts, or in log(Watts) such as in dBm. Such measurement may be obtained for both optical-frequency (17a) and radio-frequency (17b) signals. This information can then be used to calculate the relative distance between two UE Terminals emitting signals at a predetermined power level. Most UE terminals based on smartphones or mobile tablets provide local area network (LAN) wireless communications capabilities (e.g., wireless communications configured to IEEE 802.11 standards, e.g., WiFi emitting omni-directionally at a predetermined power level of 0 dBm), and as well as wireless personal area network (WPAN) capabilities (e.g., wireless communications configured to IEEE 802.15 standards, e.g., Bluetooth emitting omni-directionally at a predetermined power level of −5 dBm), including the user interface for setting these capabilities. As the relative distance between two proximal UE Terminals may change from $d_1$ to $d_2$, the received signal intensity S may change according to the power law: $S_1 d_1^2 = S_2 d_2^2$. Therefore, the second embedded algorithm may be configured to determine the spatiotemporal proximity of the two UE Terminals if one of the distances is known to a certain degree of accuracy within a range from about 20 meters or less, about 30 meters or less, or about 50 meters or less, depending on the radiation range of the emitted signal.

According to one embodiment of the described technology, the second embedded algorithm may include computer-executable instructions (e.g., instructions coded in hardware, firmware, software form, or a combination thereof) configured to execute RSSI proximity calculations, and may further include a dead reckoning algorithm, an A algorithm, a RNN algorithm, a RL algorithm, a CRFs algorithm, or a combination thereof. These computer-executable instructions may be configured to predict the spatiotemporal proximity d between each of the notified UE terminals based on an expanded set of the received signal intensity S, such that $d = d(S, dS/dt, d^2S/dt^2, \ldots)$.

According to one embodiment of the described technology, the second embedded algorithm may comprise computer-executable instructions configured to determine whether the predicted spatiotemporal proximity between each of the notified UE terminals is within a proximity threshold limit δ at future time $t_2$, such that $S_{r1} d_{r1}^2 = S_{r2} \delta^2$ (where δ may represent a distance of about 2 to about 5 meters) or, for example, to determine whether the rate of approaching of the predicted spatiotemporal proximity between each of the notified UE terminals is increasing at the same future time $t_2$, such that $(dS/dt)|t_2 > 0$. If these two conditions are reached (e.g., if the relative distance between each the notified UE terminals is within a proximity threshold limit at future time $t_2$, and still in approach), then each the notified UE terminals may be configured to provide a danger notification pertaining to road usage safety, and/or a collision avoidance notification.

According to one embodiment of the described technology, the second embedded algorithm may comprise computer-executable instructions configured to determine whether the rate of approaching of the predicted spatiotemporal proximity between each of the notified UE terminals is increasing at the same future time $t_2$, such that $(dS/dt)|t_2>0$, and configured to determine whether the rate of approaching of the predicted spatiotemporal proximity between each of the notified UE terminals is accelerating at the same future time $t_2$, such that $(d^2S/dt_2)|t_2>0$. If these two conditions are reached (e.g., if the relative distance between each of the notified UE terminals is in approach and accelerating), then each of the notified UE terminals may be configured to provide a danger notification pertaining to road usage safety, and/or a collision avoidance notification. These are merely examples and other rules may be considered and implemented to provide a danger notification.

According to one embodiment of the described technology, the second embedded algorithm may be configured to execute different proximity calculations. For example, the second embedded algorithm may be configured to execute RSSI proximity calculations, TDOA proximity calculations, AOA proximity calculations, or a combination thereof. In the TDOA technique, the time difference between each pair of received signals can be estimated by a receiver and the position from the intersection of the two hyperbolas can be determined. In general, the TDOA measurement is made by measuring the difference in received phase at each signal in the antenna array. The AOA technique includes measuring the angle of arrival of a signal from a UE terminal using for example the antenna emissive patterns. In the AOA technique, the delay of arrival at each element in the antenna array is measured directly and converted to an angle of arrival measurement. These are merely examples and other different proximity calculations may be considered and implemented.

According to one embodiment, the method for collision avoidance may further comprise transmitting the danger notification to: a communications network infrastructure, a road traffic infrastructure, a pedestrian crosswalk infrastructure, a cloud computing server, an edge computing device, an IoT device, a fog computing device, any information terminal pertaining to the field of road safety, or a combination thereof.

According to one embodiment, and referring to the flow chart of FIG. 18, the method for collision avoidance between VRUs and vehicles may further comprise: computing (18a) the predicted spatiotemporal proximity of each of the notified UE terminals, wherein each of the notified UE terminals comprises a processor device (e.g., a smartphone processor) and a second embedded algorithm for spatiotemporal proximity prediction (e.g., an AI application), and second determining (18b) whether the predicted spatiotemporal proximity between each of the notified UE terminals is within a proximity threshold limit (e.g., such that $S_{t1} d_{t1}^2 = S_{t2} \delta^2$, where $\delta$ may represent a distance of about 2 to about 5 meters), and third determining (18c) whether the rate of approaching of the predicted spatiotemporal proximity between each of the notified UE terminals is increasing (e.g., such that $(dS/dt)|t_2>0$); and providing (19) a danger notification pertaining to road usage safety based on first, second, and third determining.

According to one embodiment, and referring to the flow chart of FIG. 18, the method for collision avoidance between VRUs and vehicles at step (18) may comprise different sets of rules for providing (19) the danger notification pertaining to road usage safety. For example, a set of rules at step (18) may comprise computer-executable instructions configured to determine whether the rate of approaching of the predicted spatiotemporal proximity between each of the notified UE terminals is increasing (e.g., such that $(dS/dt)|t_2>0$) and configured to determine whether the rate of approaching of the predicted spatiotemporal proximity between each of the notified UE terminals is accelerating (e.g., such that $(d^2S/dt^2)|t_2>0$). The set of rules for providing (19) the danger notification pertaining to road usage safety is not limited to the preceding examples.

According to one embodiment, and referring to the flow chart of FIG. 18, the method for collision avoidance between VRUs and vehicles may represent a distributed AI among edge (10, 20, 30) and cloud (60) systems, and may be updated sequentially every time a new spatiotemporal data acquisition is performed at the UE terminals (20, 30). If the first embedded algorithm for spatiotemporal trajectory prediction (13) relates to an AI algorithm based on RNN algorithms, the method may use its memory (12) to process sequences of spatiotemporal data inputs $X_t$. At each time step t (or Round i+1), the recurrent state updates itself using the input variables X, and its recurrent state at the previous time step $h_{t-1}$ (or Round i), in the form: $h_t = f(X_t, h_{t-1})$, as explained previously.

According to one embodiment of the described technology, and still referring to FIG. 18, the method for collision avoidance between VRUs and vehicles may be a distributed AI among edge and cloud systems, wherein the A technique (e.g., ML training) is distributed between cloud (13, 14) and edge (18) computer-executable tasks comprising hardware, firmware or software algorithms, or a combination thereof. The method for collision avoidance between VRUs and vehicles may use various arrangements of distributed computational frameworks, in which the training data describing the problem is executed in a distributed fashion across a number of interconnected nodes (10, 20, 30, 60). The practical issue determining this distribution among edge and cloud systems is that the time it takes to communicate between a processor and memory on the same node is normally many orders of magnitude smaller than the time needed for two nodes to communicate; similar conclusions hold for the energy required. In order to take advantage of parallel computing power on each node, it is necessary to subdivide the problem into subproblems suitable for the computational power, the available energy, the available bandwidth, and the data acquisition rate of UE terminals at the edge. These subproblems distributed at the edge and at the cloud may refer to computer-executable tasks comprising hardware, firmware or software algorithms, or a combination thereof.

According to one embodiment of the described technology, and still referring to FIG. 18, the participants in this distributed computational framework are UE terminals (20, 30) (which may be Android-based and/or iOS-based smartphones) and the communications server (10) (which may be a local LTE Base Station server, and/or a cloud-based distributed service). UE terminals may announce (11) to the communications server that they are ready to run a task for a given learning problem (13), or application, which is worked upon. The task (13) may relate to a specific computation for a set of spatiotemporal data, such as training to be performed with given trained ML models for predicting VRU and vehicle trajectories. From the potential tens of thousands of UE terminals (20,30) announcing availability to the communications server (10) during a certain Round time window, the communications server may select (11) a subset of a few hundred nearby UE terminals which are invited to work on a specific task at a specific road location (e.g., near an intersection and/or near a pedestrian roadway). These selected UE terminals stay connected to the communications server for the duration of the round. The communications server then instructs (15) the selected UE terminals what computation to run with a specific ML model, a data structure configuration that may include a TensorFlow graph and instructions for how to execute it. As used herein, the term 'TensorFlow' generally refers to an open-source software library for dataflow and differentiable programming across a range of tasks. It is a symbolic math library, and is also used for ML applications such as neural networks. The instructions (15) may include current global model configurations and parameters and any other necessary state as a training checkpoint, which may relate to the serialized state of a TensorFlow session. Each participant may then perform a local computation (18) based on the global state and its local dataset, and may then send an update in the form of a training checkpoint back to the communications server. The communications server may then incorporate, or aggregate, these updates into its global state for the sake of ML improvement, and the process may repeat during subsequent rounds (which may be determined by the refresh rate of GPS data acquisition).

According to one embodiment of the described technology, and still referring to FIG. 18, the method for collision avoidance between VRUs and vehicles is a distributed AI among edge and cloud systems, wherein the ML technique is distributed between cloud (13, 14) and edge (18) devices and may be configured as a Federated learning technique. As used herein, the term 'Federated learning' (also known as collaborative learning) generally refers to a ML technique that trains an algorithm across multiple decentralized edge devices or servers holding local data samples, without exchanging them. This approach stands in contrast to traditional centralized ML techniques where all the local datasets are uploaded to one server, as well as to more classical decentralized approaches which assume that local data samples are identically distributed. Federated learning enables multiple actors to build a common, robust ML model without sharing data, thus allowing to address critical issues such as data privacy, data security, data access rights and access to heterogeneous data. Federated learning also allows to address critical issues such as CPU, energy and bandwidth savings at the mobile UE terminals while keeping low-latency.

Figure 23:
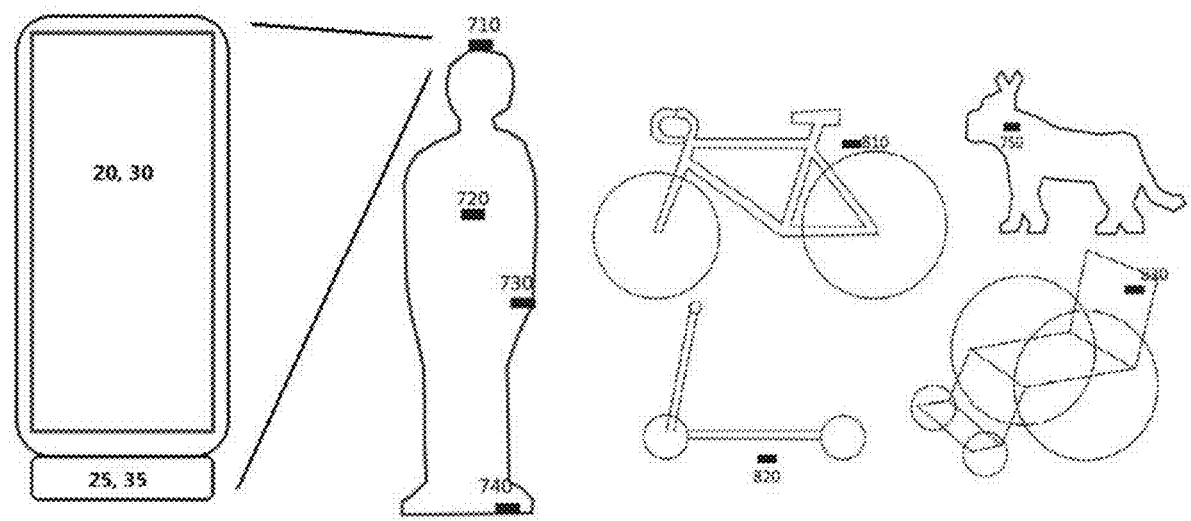
FIG. 23 illustrates a long-term evolution (LTE)-capable user equipment (UE) terminal having an international mobile subscriber identity (IMSI), that may be linked to a vehicle or to a VRU (such as a mobile phone inserted in the pocket of the VRU or attached to the dashboard of the vehicle), and that may comprise an internally-integrated or externally-attached computational unit or processor (hardware, or firmware, or software) for processing an AI algorithm, the computational unit being one of: a mobile application, a software, a firmware, a hardware, a physical device, and a computing device, or a combination thereof.

FIG. 23 illustrates an LTE-capable UE terminal (20, 30) including or exhibiting an IMSI, that may be linked to a vehicle (301) or to a VRU (201). The UE terminal (20, 30) may include, for example, a mobile phone inserted in the pocket of the VRU or held by the VRU, attached to the dashboard of the vehicle, or disposed somewhere inside the vehicle (e.g., UE terminal that belongs to a driver or passenger of the vehicle). The UE terminal (20, 30) may comprise an internally-integrated (20, 30) or externally-attached (25, 35) computational unit or processor (hardware, firmware, and/or software) for processing an AI algorithm. The computational unit may include at least one of: a mobile application, a software, a firmware, a hardware, a physical device, and a computing device, or a combination thereof. The VRU (201) may refer to any human or living being that has to be protected from road hazards. The term includes but is not limited to: non-motorized road users such as pedestrians, construction workers, emergency services workers, policemen, firefighters, bicyclists, wheelchair users, or motorized road users such as scooters, motorcyclists, or any other vulnerable road users or persons with disabilities or reduced mobility and orientation. For example, a pedestrian-to-vehicle (P2V) collision avoidance method and system may involve at least one vehicle (301) and at least one VRU (201) such as a pedestrian. The VRU may be associated with (e.g., physically linked to) at least one UE terminal (20) LTE-capable of 3G, 4G, 5G, etc. cellular communications. Although aspects of this disclosure are not limited to an embodiment in which a VRU is physically linked to an LTE-capable UE terminal, embodiments of this disclosure will be described in connection with these embodiments for the ease of description. However, those skilled in the art will recognize that other techniques for associating the UE terminal with a VRU. For example, the VRU may hold the UE terminal with his hand, attach it to a hat (710), place it in a pocket (720,730), or insert it into a shoe (740), or in a bag, or attach it to a bicycle (810), scooter (820), wheelchair (830), or attach it a pet (750), etc. Likewise, the vehicle 301 may be associated with (e.g., physically linked or otherwise operatively coupled to) at least one LTE-capable UE terminal (30), such as a mobile phone secured on the dash board of a vehicle, or a LTE-capable UE terminal operatively coupled to an ADAS, to an ADS of a vehicle, etc. These examples are not limiting examples.

Figure 24:
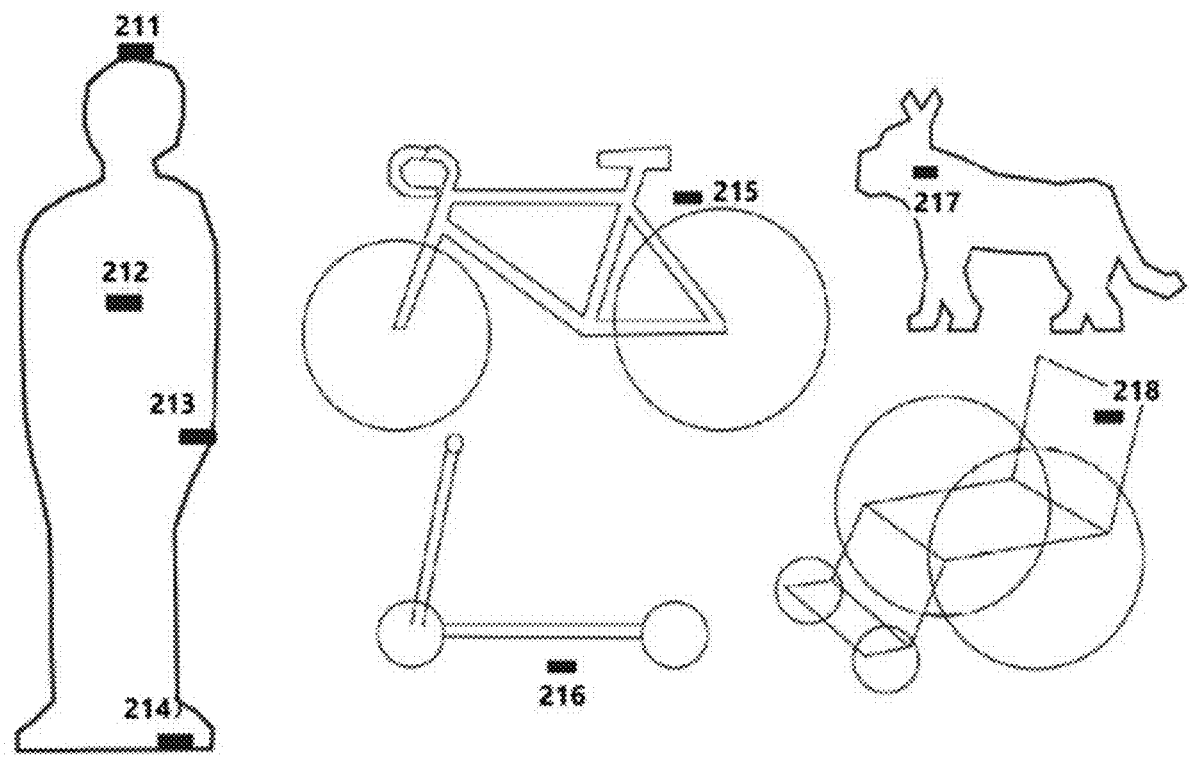
FIG. 24 illustrates various placements of non-Lambertian reflecting surfaces onto VRUs.

FIG. 24 illustrates various placements of non-Lambertian reflecting surfaces onto VRUs. Although aspects of this disclosure are not limited to an embodiment in which a VRU is physically linked to a non-Lambertian reflecting surface, embodiments of this disclosure will be described in connection with these embodiments for the ease of description. However, those skilled in the art will recognize that other techniques for associating the non-Lambertian reflecting surface with a VRU may apply. For example, the VRU may hold the non-Lambertian reflecting surface with his hand (213), the non-Lambertian reflecting surface may be attached to a hat (211), affixed to a pocket (212, 213), glued onto a shoe (214), on a bag, attached to a bicycle (215), a scooter (216), a wheelchair (218), attached to a pet (217), etc. Likewise, a vehicle may also be associated with a non-Lambertian reflecting surface, which may be affixed to any surface parts of the vehicle. These examples are not limiting examples.

Figure 25:
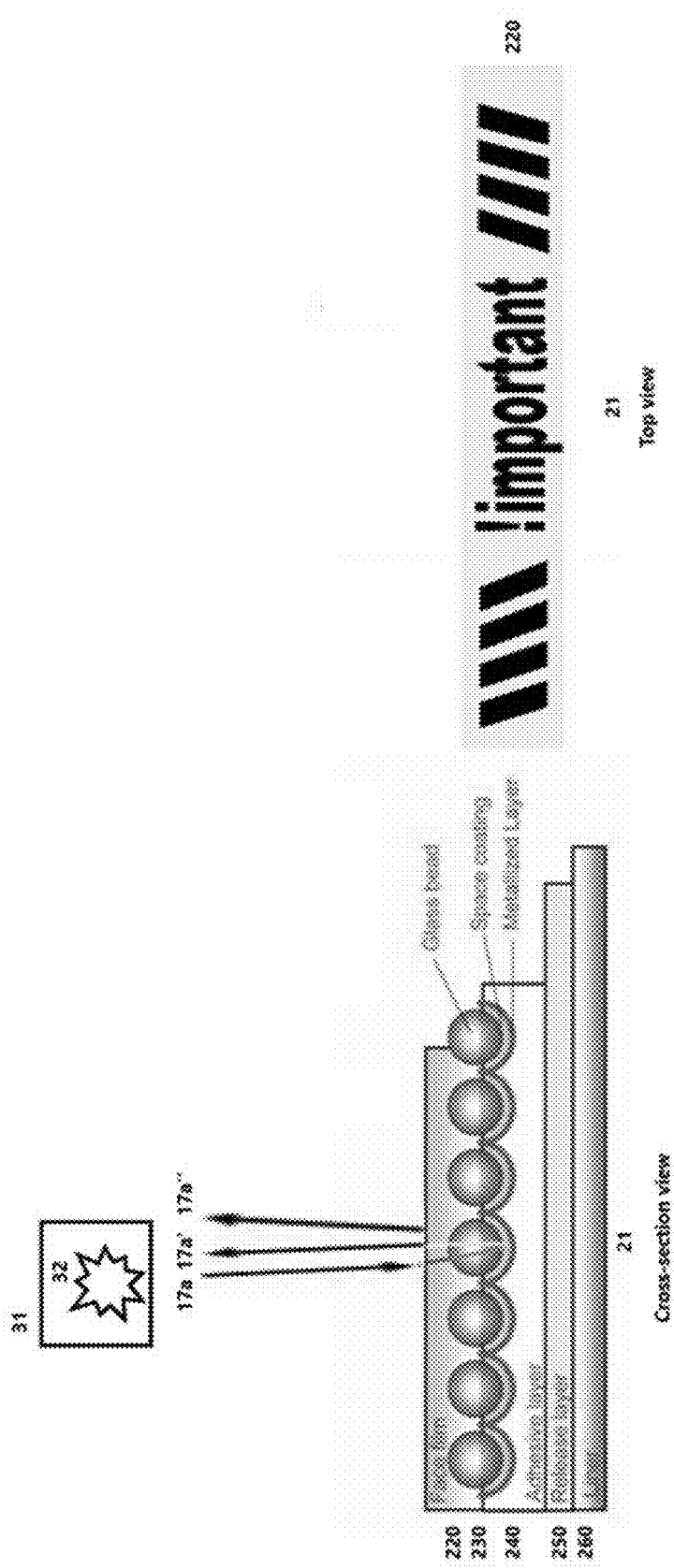
FIG. 25 illustrates one embodiment of the non-Lambertian reflecting surface affixed to the plurality of VRUs (cross-section and top views).

FIG. 25 illustrates one embodiment of the non-Lambertian reflecting surface affixed to the plurality of VRUs (cross-section and top views). According to one embodiment, non-Lambertian reflecting surfaces may include corrugated surfaces, woven surfaces, textile surfaces, retro-reflective surfaces, off-specular reflection surfaces, polarizing surfaces, photonic-bandgap surfaces, or a combination thereof. According to one embodiment, the non-Lambertian reflecting surface may include one or more of: a flexible laminated combination of liner polymer (260), a release layer (250), an adhesive layer (240), a retro-reflecting layer (230) comprising a metalized layer and glass beads, and a face film (220). The retro-reflecting layer (230) may be formed of metallized corrugation. The face film (220) may further comprise a printed logo design at the top surface. The face film (220) may comprise a polarizing face film.

According to one aspect of the described technology and referring to FIG. 25, if the proximity condition (e.g., if R<A) is reached, then a first proximity signal including a modulated optical emission (17*a*) may be activated at the vehicle linked to the notified UE terminal belonging to the vehicle. The first proximity signal may be provided by a device (31) affixed to the vehicle rooftop or at the vehicle headlights, comprising a light-emitting diode or a laser (32), emitting in the range of optical wavelengths comprising visible and/or infrared wavelengths, and may further comprise time modulation, frequency modulation, phase modulation, polarization modulation, or a combination thereof.

According to one embodiment and referring to FIG. 25, the first proximity signal (17*a*) may include a circularly-polarized LED optical signal activated by an optical device (32) attached to the vehicle linked to the notified UE terminal belonging to the vehicle (e.g., on the vehicle rooftop and/or at the vehicle headlights), and the non-Lambertian reflecting surface (21) may include a retro-reflective surface comprising a metallized corrugation (230) and a polarizing face film (220). With such embodiment, x-axis polarization emitted by the optical source (32) may be retro-reflected (17a') back to the optical source (32), while y-axis polarization emitted by the optical source (32) may be attenuated significantly (17a') and not reflected back to the optical source (32). Such embodiment may provide for an "optical blinking effect" as the polarization direction rotates at a constant rate in a plane perpendicular to the direction of the wave, wherein the rate may be adjusted in the Hertz to Megahertz regime for an improved VRU detection.

According to one embodiment and referring to FIG. 25, the first proximity signal (17a) may include a dual-wavelength optical signal activated by a multi-wavelength LED or laser device (32) attached to the vehicle linked to the notified UE terminal belonging to the vehicle (e.g., on the vehicle rooftop), and the non-Lambertian reflecting surface (21) may include a retro-reflective surface comprising a metallized corrugation (230) and a resin-laced colored face film (220). With such embodiment, one wavelength emitted by the optical source (32) may be retro-reflected (17a') back to the optical source (32), while the other wavelength emitted by the optical source (32) may be attenuated significantly (17a') and not reflected back to the optical source (32). Such embodiment may provide for an "optical blinking effect" as the optical source switches from one wavelength to the other at a constant rate, wherein the rate may be adjusted in the Hertz to Megahertz regime for an improved VRU detection.

According to one embodiment and still referring to FIG. 25, the first proximity signal (17a) may include a dual-wavelength optical signal activated by a multi-wavelength LED and/or laser device (32) attached to the vehicle linked to the notified UE terminal belonging to the vehicle (e.g., on the vehicle rooftop), and the non-Lambertian reflecting surface (21) may include a retro-reflective surface comprising a metallized corrugation (230) and a multi-layer photonic-bandgap face film (220). With such embodiment, one wavelength emitted by the optical source (32) may be retro-reflected (17a') back to the optical source (32), while the other wavelength emitted by the optical source (32) may be reflected away (17a') from the optical source (32). Such embodiment may provide for an "optical blinking effect" as the optical source switches from one wavelength to the other at a constant rate, wherein the rate may be adjusted in the Hertz to Megahertz regime for an improved VRU detection. These embodiments for the optical sources (32) and non-Lambertian reflecting surfaces (21) are not limiting embodiments.

Figure 26:
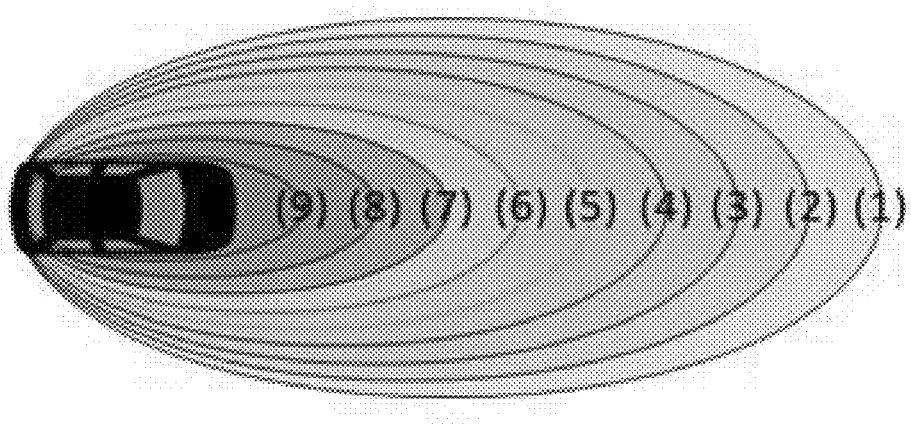
FIG. 26 illustrates one embodiment of the method for collision avoidance between VRUs and vehicles, wherein the method comprises a set of rules for providing a danger notification that may relate to a proximity range shaped like an ellipse.

FIG. 26 illustrates one embodiment of the method for collision avoidance between VRUs and vehicles, wherein the method comprises a set of rules for providing a danger notification that may relate to a proximity range shaped like an ellipse. When the vehicle is notified of a danger, the danger notification may include a prescription for collision avoidance including $(dx/dt)^2$ braking-terms and $(dy/dt)^2$ swerving-terms in the predicted spatiotemporal trajectory of the notified UE terminal belonging to the vehicle, which relates approximately to the shape of an ellipse on the road. Since the capacity to brake is higher than the capacity to swerve (e.g., $\mu_x > \mu_y$), the predicted spatiotemporal trajectory of the notified UE terminal belonging to the vehicle may exhibit a higher trajectory probability along the direction of driving in order to maintain vehicle control, and a progressively lower trajectory probability transversally given the standard deviations (a) for $t_r$, $\mu_x$ and, $\mu_y$. Therefore, according to one aspect of the described technology, the proximity range may have the shape of an ellipse, wherein the major axis of the ellipse is coincident with the predicted spatiotemporal trajectory of the notified UE terminal belonging to the vehicle. This two-dimensional gradient for the trajectory probability may relate to a collision-probability assessment and/or Confidence factor, within a PathPrediction danger notification. In some embodiments, the danger notification may be different depending on the distance (or proximity range) between the VRU and the vehicle. In level 1, the distance between the vehicle and the VRU is farthest where the danger notification may indicate that there is a relatively low risk of collision. In level 9, the distance between the vehicle and the VRU is closest where the danger notification may indicate that there is a very high risk of collision. In some embodiments, the danger notification may indicate that levels 5-9 may be more dangerous than levels 1-4, and the VRU may be appropriately warned and/or the vehicle may be controlled to slow down or stop. In some embodiments, the danger notification may indicate that level 8 or 9 may be extremely dangerous. In these embodiments, the vehicle may be immediately stopped and/or the VRU may be alerted with an extreme danger. In some embodiments, the danger notification may indicate that level 1 or 2 may not be an immediate threat to the VRU. In these embodiments, a low risk warning may be given to the VRU and/or the vehicle. In some embodiments, the danger notification may indicate that level 5 or 6 may be a moderate threat to the VRU. In these embodiments, a moderate or medium level warning may be given to the VRU and/or the vehicle may be controlled to slow down or to prepare for slowing down.

Figure 27:
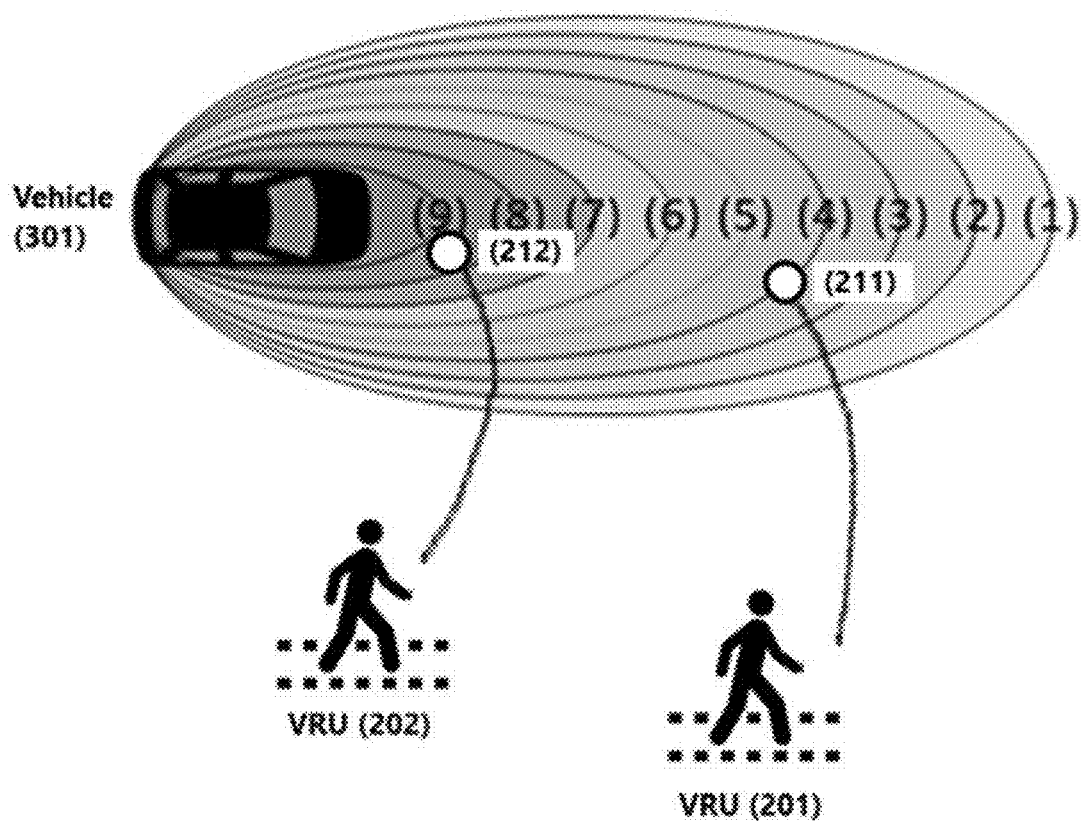
FIG. 27 illustrates one embodiment of the method for collision avoidance between VRUs and vehicles, wherein the method comprises a set of rules for providing a danger notification that may relate to a proximity range shaped like an ensemble of n concatenated ellipses, wherein smaller ellipses relate to higher collision-probability assessments.

FIG. 27 illustrates one embodiment of the method for collision avoidance between VRUs and vehicles, wherein the method comprises a set of rules for providing a danger notification that may relate to a proximity range shaped like an ensemble of n concatenated ellipses, wherein smaller ellipses relate to higher collision-probability assessments. According to one aspect of the described technology, the dimensional safety margin M may relate to a collision-probability assessment and/or a Confidence factor, such that if the dimensional safety margin M is set at a small value, the probability of collision will be higher. In the illustration of FIG. 18, the proximity range R (212) of the first VRU (202) is smaller than the proximity range R (211) of the second VRU (201), with respect to the same vehicle (301). Therefore, the proximity range R (212) may be labelled as a relatively unsafe close approach between VRU (202) and vehicle (301) at future time t, as compared to the moderate close approach between VRU (201) and vehicle (301) at a different future time t. The communications server (10), acting as a cloud-component of a collision-avoidance system (60), may then implement the provision of the danger notification including a prescription for collision avoidance to VRU (202), and of a warning message to VRU (201), and of a prescription for applying brakes to slow down or to stop for vehicle (301). Other danger notification may be implemented depending on the road context in order to optimize the collision avoidance.

Figure 28:
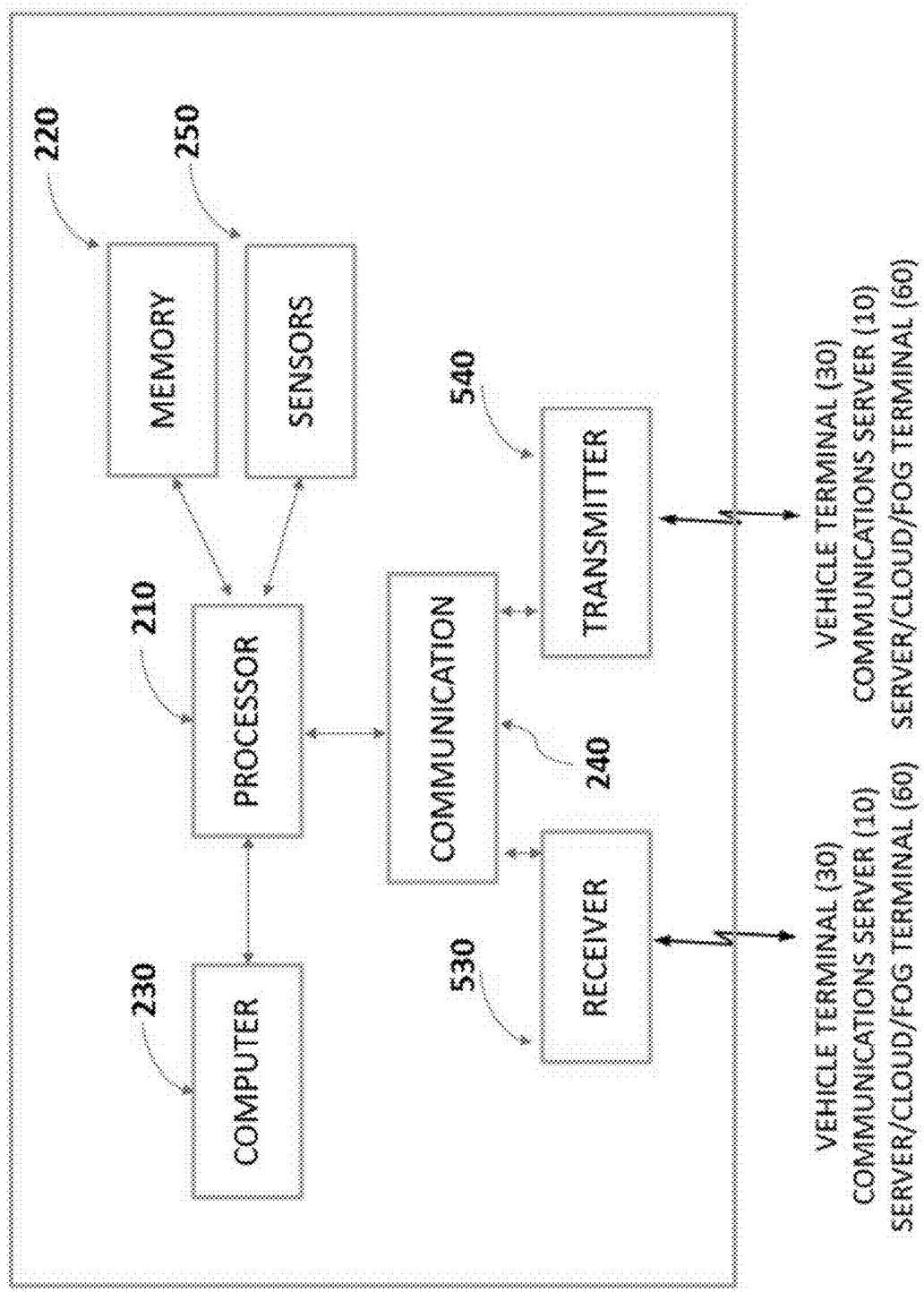
FIG. 28 is an example block diagram of a UE terminal linked to a VRU according to an embodiment of the described technology.

FIG. 28 is an example block diagram of a UE terminal (20) linked to a VRU according to an embodiment of the described technology. According to one embodiment, the VRU terminal (20) may include a processor (210), a memory (220), a computer (or computing) device (230), a communications circuit or module (240), and one or more sensors (250). In some embodiments, the communications device (240) may further comprise a receiver (530) for receiving wireless data, and a transmitter (540) for sending wireless data. For example, the receiver (530) and the transmitter (540) may communicate data with at least one of the vehicle terminal (30), communication server (10) or server/cloud/fog terminal (60). In some embodiments, at least one of the processor (210), memory (220), computer (230), communications circuit or module (240), and sensors (250) may be integrated within the body of Android based smartphones, tablets, iPhone, and/or iPad. In other embodiments, at least one of the processor (210), memory (220), computer (230), communications circuit or module (240), and sensors (250) may be integrated totally or partially within other portable information terminals. FIG. 28 is merely an example block diagram of a VRU UE terminal (20), and certain block elements may be removed, other elements added, two or more elements combined or one element can be separated into multiple elements depending on the specification and requirements. For example, the computer (230) and the processor (210) may be integrated into a single processor circuit or module.

Figure 29:
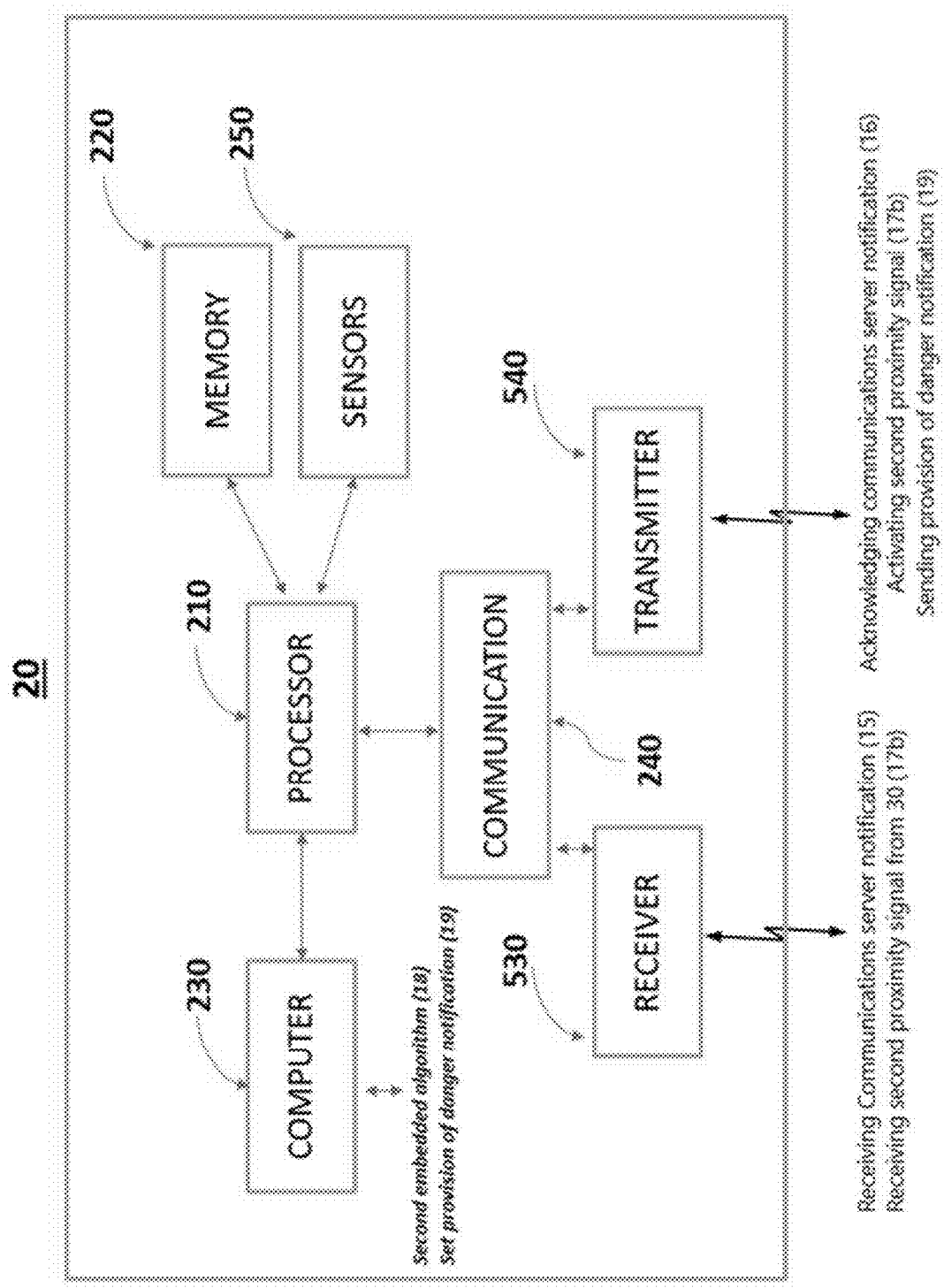
FIG. 29 is an example block diagram of a UE terminal linked to a VRU according to an embodiment of the described technology, where a communications server notification is received from the communication server.

FIG. 29 is an example block diagram of a UE terminal (20) linked to a VRU according to an embodiment of the described technology, where a communications server notification is received from the communication server (10). According to one embodiment, and referring to the diagrams of FIGS. 18 and 29, the UE terminal (20) may, upon receiving a communications server notification (15), acknowledge (16) the communications server notification (e.g., such that the notified UE terminal 'confirms that it is aware' of a probable accident course). The UE terminal (20) may also activate (17b) a second proximity signal including a radio frequency emission (e.g., such proximity radio signal creating a 'beacon that forces the notified UE terminals to be seen' despite any obstacles that block the direct optical/lidar/radar view). The UE terminal (20) may further compute (18a) the predicted spatiotemporal proximity of each the notified UE terminals. Each of the notified UE terminals may comprise a processor (e.g., a smartphone processor) and a second embedded algorithm for spatiotemporal proximity prediction (e.g., an A application). The UE terminal (20) may also perform second determining (18b) whether the predicted spatiotemporal proximity between each of the notified UE terminals is within a proximity threshold limit, and third determining (18c) whether the rate of approaching of the predicted spatiotemporal proximity between each of the notified UE terminals is increasing. The UE terminal (20) may also provide (19) a danger notification pertaining to road usage safety based on first, second, and third determining. The computer (230) may perform local computation using a second embedded algorithm for spatiotemporal proximity prediction (18). The computer (230) may also set rules for providing the danger notification pertaining to road usage safety (19). The receiver (530) may receive a communication server notification (15) from the communication server (10). The receiver (530) may also receive a proximity signal from the vehicle (30) (17). The transmitter (540) may perform at least one of the following: acknowledging the communication server notification (16), activating the proximity signal (17) or sending provision of the danger notification (19). The remaining components of the VRU (20) shown in FIG. 29 have been described with respect to FIG. 28.

Figure 30:
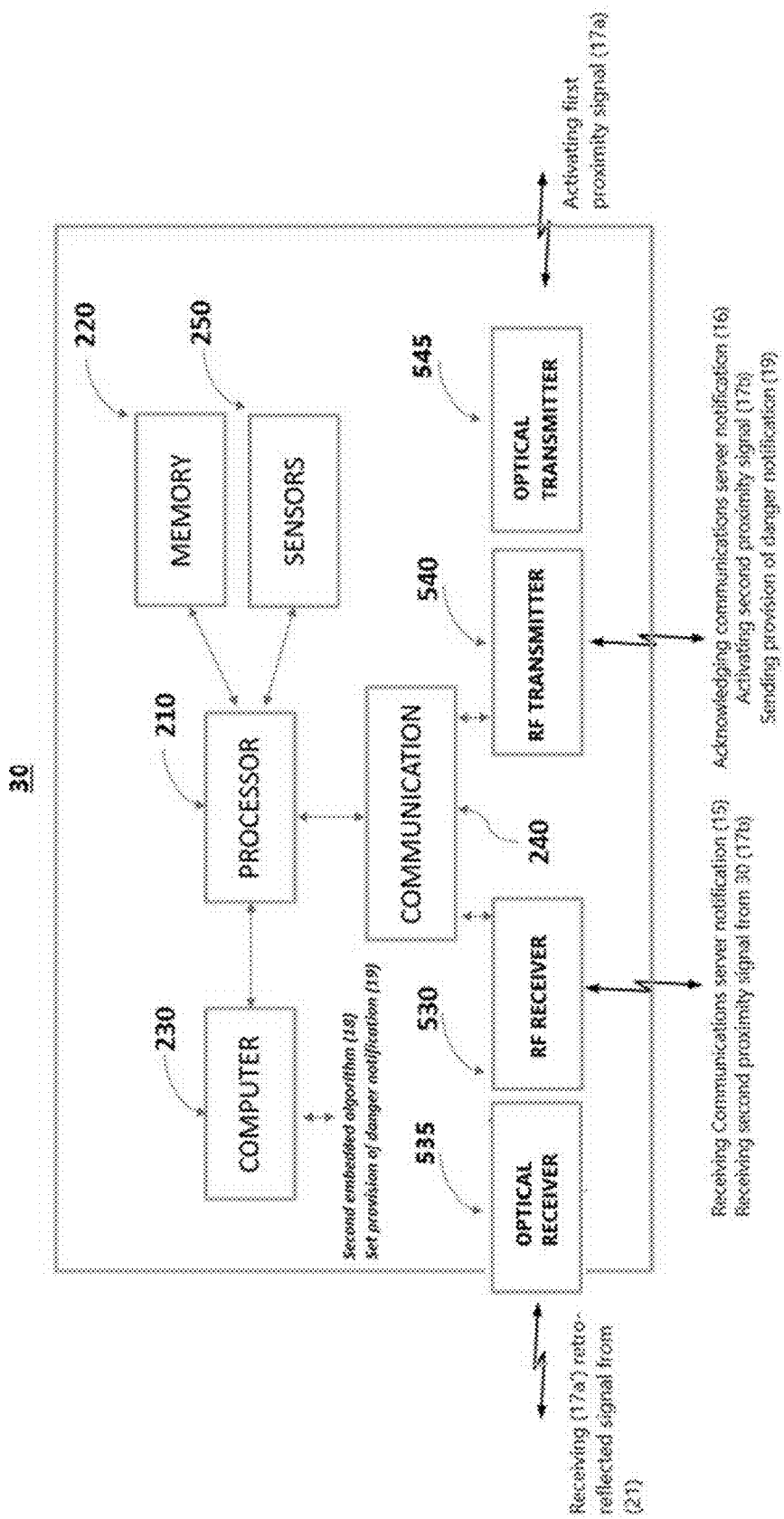
FIG. 30 is an example block diagram of a UE terminal linked to a vehicle according to an embodiment of the described technology, where a communications server notification is received from the communication server.

FIG. 30 is an example block diagram of a UE terminal (30) linked to a vehicle according to an embodiment of the described technology, where a communications server notification is received from the communication server (10). According to one embodiment, and referring to the diagrams of FIGS. 18 and 16, the UE terminal (30), upon receiving a communications server notification (15), may acknowledge (16) the communications server notification (e.g., such that the notified UE terminal (30) 'confirms that it is aware' of a probable accident course). The UE terminal (30) may also activate (17a) a first proximity signal including an optical emission from the optical transmitter (545) (e.g., the optical transmitter may include a LED (32)). The UE terminal (30) may further activate (17b) a second proximity signal including a radio frequency emission (e.g., such proximity radio signal creating a 'beacon that forces the notified UE terminals to be seen' despite any obstacles that block the direct optical/lidar/radar view). The UE terminal (30) may also compute (18a) the predicted spatiotemporal proximity of each of the notified UE terminals, wherein each of the notified UE terminals comprises a processor device (e.g., a smartphone processor) and a second embedded algorithm for spatiotemporal proximity prediction (e.g., an AI application). The UE terminal (30) may also perform second determining (18b) whether the predicted spatiotemporal proximity is within a proximity threshold limit, and third determining (18c) whether the rate of approaching of the predicted spatiotemporal proximity between the notified UE terminals is increasing. The UE terminal (30) may also provide (19) a danger notification pertaining to road usage safety based on first, second, and third determining. The UE terminal (30) may include an optical receiver (535) and an RF receiver (530). The optical receiver (535) may receive a retro-reflected signal (17a') from the non-Lambertian reflecting surfaces (21). The RF receiver (530) may receive a communication server notification (15) from the communication server (10). The RF receiver (530) may also receive a second proximity signal from the vehicle (30) (17b). The UE terminal (30) may also include an RF transmitter (540) and an optical transmitter (545). The RF transmitter (540) may perform at least one of the following: acknowledging the communication server notification (16), activating the second proximity signal (17b) or sending provision of the danger notification (19). The optical transmitter may activate the first proximity signal (17a).

According to some aspects of the described technology, and referring to FIGS. 29 and 30, the danger notification may include a prescription for collision avoidance intended to the VRU (e.g., an audible message or vibrating buzz warning the VRU of an impending danger), and of a warning message intended, and sent, to the approaching vehicle (e.g., an instruction of applying brakes to slow down or to stop for vehicle). Other danger notifications may be implemented depending on the road context. According to some aspects of the described technology, and referring to FIGS. 29 and 30, the danger notification may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, any audible, visual, haptic or cognitive message, or any combination thereof.

Figure 31:
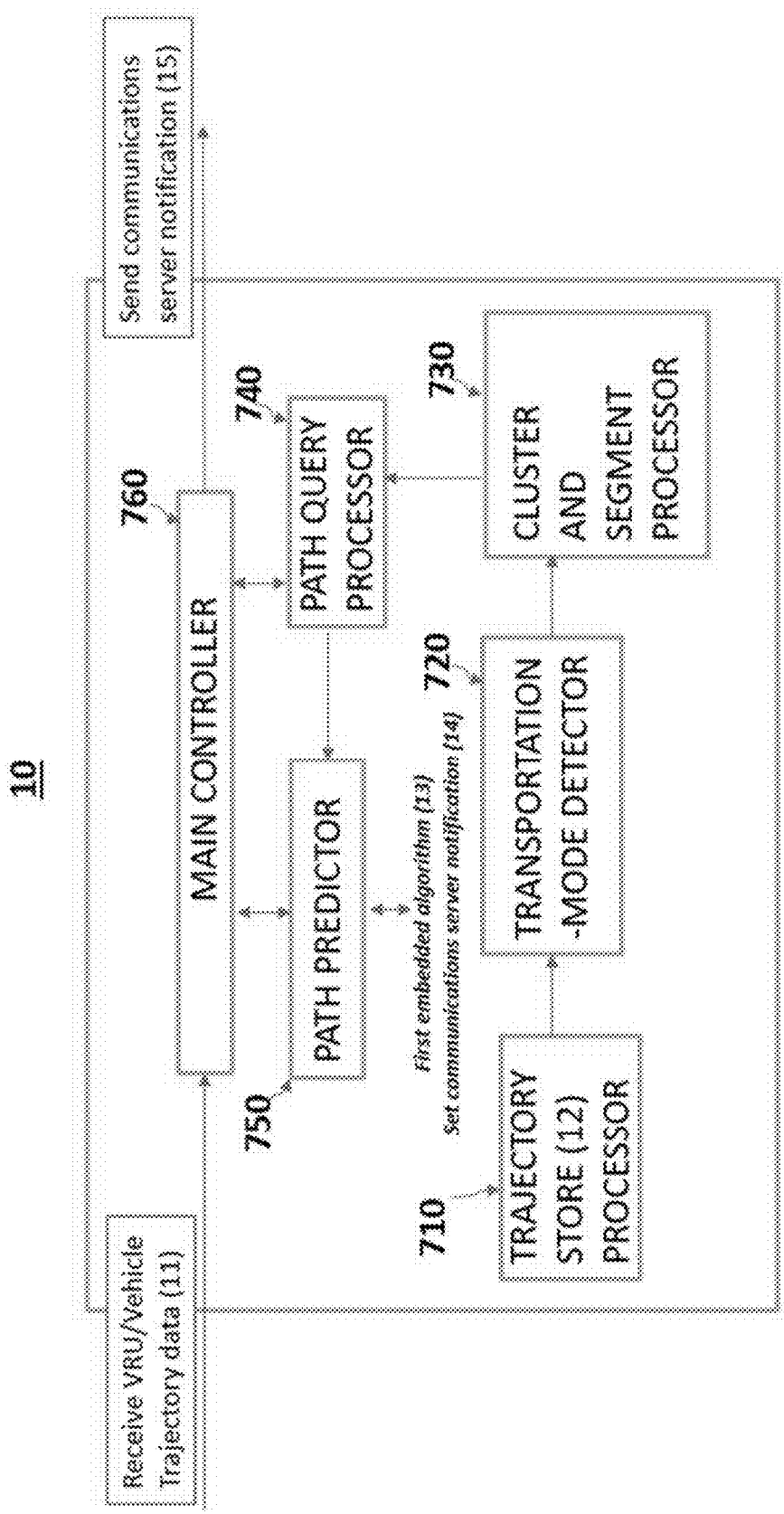
FIG. 31 is an example block diagram of a communications server according to one aspect of the described technology.

FIG. 31 is an example block diagram of a communications server (10) according to one aspect of the described technology. Referring to FIGS. 18 and 31, the communications server (10) may comprise a computing device configured to predict the spatiotemporal trajectory of a VRU (20) or a vehicle (30) based on past and current spatiotemporal trajectory data from one or more sensors associated with any one of each UE terminals linked to VRUs or vehicle. The communications server (10) may also set a communication server notification (14) and send the communication server notification to the VRU/vehicle (15). FIG. 31 is merely an example block diagram of the communications server (10), and certain elements may be removed, other elements added, two or more elements combined or one element can be separated into multiple elements. The communications server (10) may include a trajectory store processor 710, a transportation-mode detector 720, a cluster and segment processor 730, a path query server 740, a path predictor 750, and a main controller 760. In some embodiments, one or more of the elements 710-760 can be included in the UE terminal of the VRU (20), or in the UE terminal of the vehicle (30).

Referring to FIGS. 18 and 31, the trajectory store processor (710) may collect series of past and current spatiotemporal trajectory data of vehicles and VRUs. The trajectory store processor (710) may obtain this information in many different ways and employ different technologies, both for identifying location and storing the data, for example, of GPS, GNSS. LTE, WiFi. Bluetooth, etc. The transportation-mode detector (720) may receive the collected series of past and current spatiotemporal trajectory data and classify a trajectory as belonging to VRUs or vehicles (see. e.g., "*Real-Time Transportation Mode Detection via Tracking Global Positioning System Mobile Devices*" Byon et. al.). The cluster and segment processor (730) may break down the classified trajectories and group them to shorter paths along with visit-frequency information and transportation mode. The path query server (740) may, given a partial path, return the frequency of the path. The path query server (740) may also, given a path P, return other paths P in its close vicinity. The path predictor (750) may, given a trajectory, possibly leverage information for the path query server (740), and predict one or more future paths according to the computational content (13) of the first embedded algorithm, and set a communications server notification (14) based on first determining. The main controller (760) may communicate data with and control operations of the components (710-750). The main controller (760) may communicate data with the path query server (740) and the path predictor (750), receive VRU's current trajectory information and determine whether the VRU within a proximity range.

Figure 32:
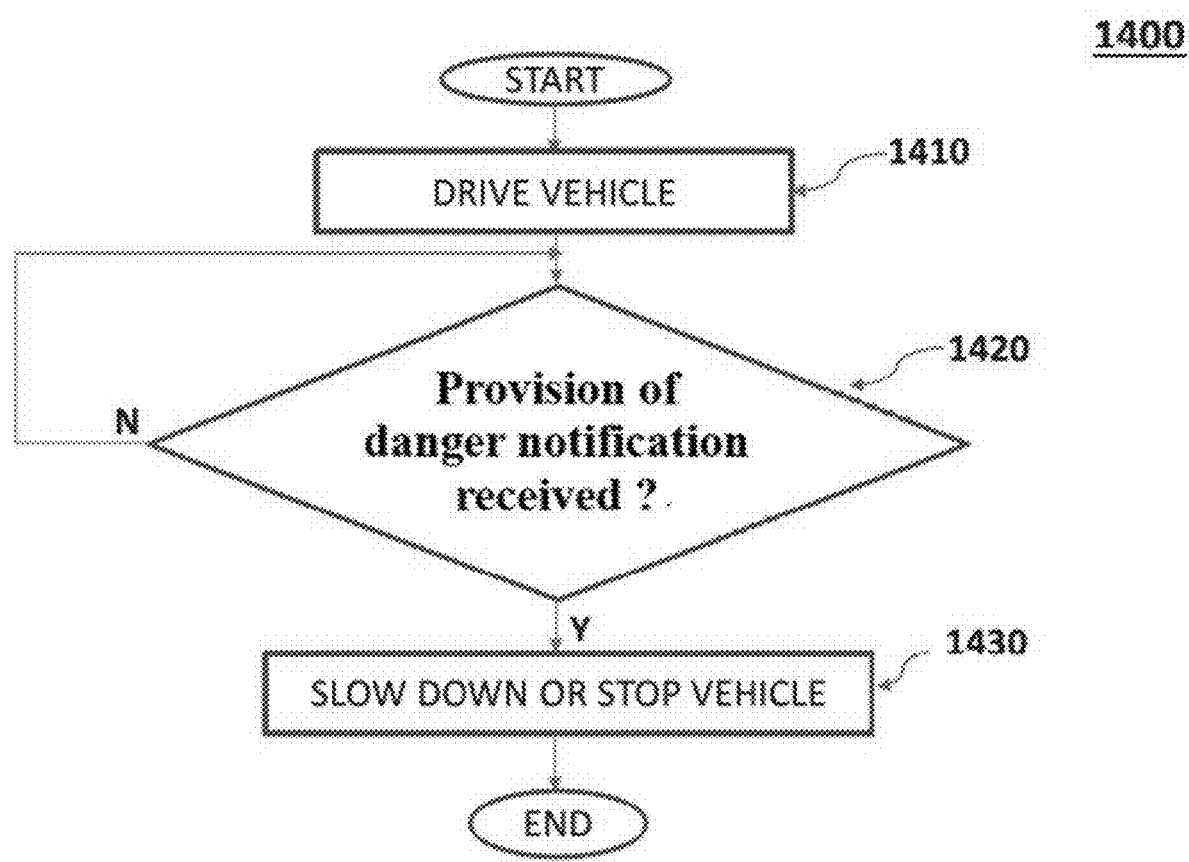
FIG. 32 illustrates an example flowchart for a process to be performed by a notified UE terminal linked to a vehicle, according to an embodiment of the described technology; such a block diagram being enabled at the notified UE terminal if a communications server notification is received from the communication server, and if a danger notification is received from the UE terminal linked to the corresponding notified VRU.

FIG. 32 illustrates an example flowchart for a process 1400 to be performed by a notified UE terminal (30) linked to a vehicle according to an embodiment of the described technology. The process 1400 can be enabled at the notified UE terminal (30) if a communications server notification is received from the communication server (10), and if the danger notification is received from the UE terminal (20) linked to the corresponding notified VRU. According to some aspects of the described technology, and referring to FIG. 32, the danger notification may include a prescription for collision avoidance intended to the VRU (e.g., an audible message or vibrating hum warning the VRU of an impending danger), and of a warning message intended, and sent, to the approaching vehicle (e.g., an instruction of applying brakes to slow down or to stop for vehicle). According to the embodiment illustrated in FIG. 32, the process 1400 for a notified UE terminal (30) linked to a vehicle may take the form of a feedback loop waiting to receive the danger notification. While the vehicle is driven (1410), if the danger notification is received from the UE terminal (20) linked to the corresponding notified VRU (1420), then a series of collision-avoidance measures may be triggered depending on the content of the danger notification, including but not limited to applying brakes to slow down or to stop for vehicle (1430). Other collision-avoidance measures may be triggered if the danger notification includes an information message, a warning message, an alert message, a prescription for danger avoidance, a prescription for collision avoidance, a prescription for moral conflict resolution, a statement of local applicable road regulations, a warning for obeying road regulations, any notification pertaining to road safety, any audible, visual, haptic or cognitive message, or any combination thereof.

Figure 33:
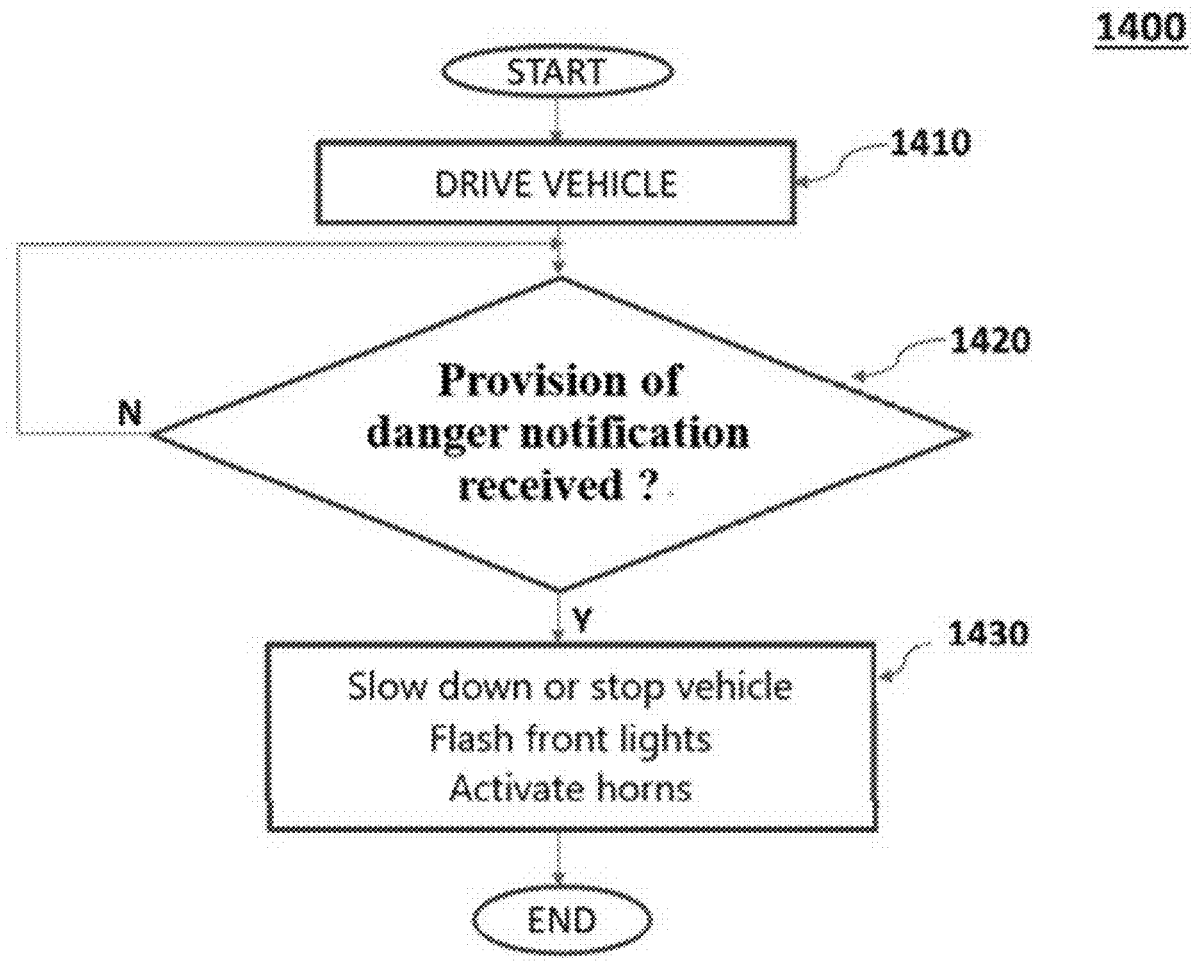
FIG. 33 illustrates an example flowchart for another process to be performed by a notified UE terminal linked to a vehicle, according to an embodiment of the described technology; such a block diagram being enabled at the notified UE terminal if a communications server notification is received from the communication server, and if a danger notification is received from the UE terminal linked to the corresponding notified VRU.

FIG. 33 illustrates an example flowchart for another process 1400 to be performed by a notified UE terminal linked to a vehicle, according to an embodiment of the described technology; such a block diagram being enabled at the notified UE terminal if a communications server notification is received from the communication server, and if a danger notification is received from the UE terminal linked to the corresponding notified VRU. According to the embodiment illustrated in FIG. 33, the process 1400 to be performed by a notified UE terminal (30) linked to a vehicle may take the form of a feedback loop waiting to receive a danger notification. While the vehicle is driven (1410), if the danger notification is received from the UE terminal (20) linked to the corresponding notified VRU (1420), then a series of collision-avoidance measures may be triggered depending on the content of the danger notification (1430). The series may comprise reading the content of the danger notification, and emitting an optical signal exhibiting time modulation, frequency modulation, phase modulation, polarization modulation, or a combination thereof. The emitted optical signal may include flashing the vehicle front lights (or any other LED lights) at a specific flash rate coincident with providing a cognitive sense of urgency to the VRU. The series may also comprise emitting an audible signal exhibiting time modulation, frequency modulation, or a combination thereof. The emitted audible signal may include activating the horns of the vehicle (or any other acoustic sound) at a specific pitch and cycle coincident with providing a cognitive sense of urgency to the VRU. Other measures may be provided in order to enhance the reactivity of the VRU upon receipt of a provision of danger notification.

Those skilled in the art will recognize that the method for collision avoidance between VRUs and vehicles disclosed herein may be translated to a system for collision avoidance between VRUs and vehicles. Therefore, another inventive aspect of the present disclosure is a system for collision avoidance between VRUs and vehicles, the system comprising: a plurality of vehicles linked to LTE-capable UE terminals including or exhibiting an IMSI; and a plurality of VRUs linked to LTE-capable UE terminals including or exhibiting an IMSI, and linked to non-Lambertian reflecting surfaces; and a communications server device configured to predict the spatiotemporal trajectory of any one of the UE terminals, and to receive past and current spatiotemporal trajectory data from one or more sensors associated with any one of the UE terminals, and to store past and current spatiotemporal trajectory of any one of the UE terminals, and to compute the predicted spatiotemporal trajectory of each the UE terminals, wherein the communications server comprises a computing device and a first embedded algorithm for spatiotemporal trajectory prediction, and to first determine whether the spatiotemporal distance between any one of the UE terminals is within a proximity range; and to obtain a communications server notification if the first determining relates a UE terminal belonging to a vehicle and a UE terminal belonging to a VRU, and to tag these two UE terminals as notified UE terminals.

According to one aspect of the system for collision avoidance between VRUs and vehicles herein described, the VRUs may include non-motorized road users such as pedestrians, construction workers, emergency services workers, policemen, firefighters, bicyclists, wheelchair users, or motorized road users such as scooters, motorcyclists, or any other vulnerable road users or persons with disabilities or reduced mobility or orientation. Also, according to one aspect of the system for collision avoidance between VRUs and vehicles herein described, the vehicles may include any motor propelled device that could present a road hazard for VRUs, including cars, autonomous vehicles, non-autonomous vehicles, self-driving vehicles, off-road vehicles, trucks, manufacturing vehicles, industrial vehicles, safety & security vehicles, electric vehicles, low-altitude airplanes, helicopters, drones (UAVs), boats, or any other types of automotive, aerial, or naval vehicles with some proximity to VRUs such as encountered in urban, industrial, commercial, airport, or naval environments.

According to one embodiment of the described technology, each of the notified UE terminals may be configured to determine their relative spatiotemporal proximity, and wherein the notified UE terminals may be further configured to acknowledge the communications server notification, and to activate a first proximity signal including a modulated optical emission, and to activate a second proximity signal including a radio-frequency emission, and to compute the predicted spatiotemporal proximity using a processor device and a second embedded algorithm for spatiotemporal proximity prediction, and to second determine whether the predicted spatiotemporal proximity between each of the notified UE terminals is within a proximity threshold limit, and to third determine whether the rate of approaching of the predicted spatiotemporal proximity between each of the notified UE terminals is increasing, and to provide a danger notification pertaining to road usage safety based on first, second, and third determining.

According to one embodiment of the described technology, the system may comprise the computational step of providing a danger notification pertaining to road usage safety, wherein the danger notification may include an information message, a warning message, an alert message, a prescription for danger avoidance, a prescription for collision avoidance, a prescription for moral conflict resolution, a statement of local applicable road regulations, a warning for obeying road regulations, any notification pertaining to road safety, any audible, visual, haptic or cognitive message, or any combination thereof.

According to one embodiment of the described technology, the system may comprise the computational step of providing a danger notification pertaining to road usage safety, wherein the danger notification may further comprise emitting an optical signal exhibiting time modulation, frequency modulation, phase modulation, polarization modulation, or a combination thereof.

According to one embodiment of the described technology, the system may comprise the computational step of setting a provision of danger notification pertaining to road usage safety, wherein the providing of the danger notification may comprise a prescription for collision avoidance including the provision of applying brakes to slow down or to stop the vehicle through the ADAS or the ADS of the notified vehicle.

According to one embodiment of the described technology, the system may comprise the computational step of providing a danger notification pertaining to road usage safety, wherein the providing of the danger notification may further comprise transmitting the danger notification to a communications network infrastructure, a road traffic infrastructure, a pedestrian crosswalk infrastructure, a cloud computing server, an edge computing device, an IoT device, a fog computing device, any information terminal pertaining to the field of road safety, or a combination thereof.

According to one embodiment of the described technology, the system may comprise a communications server, wherein the communications server may include any one of an LCS server, an LTE Base Station server, an LTE wireless network communications server, a gateway server, a cellular service provider server, a cloud server, or a combination thereof. According to one embodiment, the system may comprise UE terminals further comprising GNSS-capable sensors, and/or GPS-capable sensors, wherein the UE terminals may include smartphones, IoT devices, tablets, ADAS, ADS, any other portable information terminals or mobile terminals, or a combination thereof.

According to one embodiment, the system may involve a plurality of VRUs and vehicles linked to LTE-capable UE terminals including or exhibiting an IMSI, wherein the LTE equipment may use 5G NR new radio access technology (RAT) developed by 3GPP for 5G mobile networks.

According to one embodiment, the system may provide the optical equipment necessary to activate a first proximity signal, wherein the first proximity signal may include an LED optical signal, or a laser optical signal, emitting in the range of optical wavelengths comprising visible or infrared wavelengths. Also, the first proximity signal may comprise time modulation, frequency modulation, phase modulation, polarization modulation, or a combination thereof.

According to one embodiment, the system may provide the radio equipment necessary to activate a second proximity signal, wherein the second proximity signal may include a radio frequency communication signal configured with any one of IEEE 802, IEEE 802.11, or IEEE 802.15 signal protocols, or a combination thereof. Also, the second proximity signal may be configured to an interoperable system that communicates with an ITS-based standard, including DSRC and C-V2X. Also, the second proximity signal may comprise time modulation, frequency modulation, phase modulation, polarization modulation, or a combination thereof.

According to one embodiment, the system may provide a time-, frequency-, phase-, or polarization-based amplifier such as a positive-feedback loop amplifier, a heterodyne amplifier, a transistor-based amplifier, and/or any other type of electronic amplifiers to amplify the first and/or second proximity signals.

According to one embodiment of the described technology, the VRU may include non-motorized road users such as pedestrians, construction workers, emergency services workers, policemen, firefighters, bicyclists, wheelchair users, or motorized road users such as scooters, motorcyclists, or any other vulnerable road users or persons with disabilities or reduced mobility or orientation.

The various illustrative blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method and the functions of the system described in connection with the embodiments disclosed herein may be embodied directly in hardware, in firmware, or in a software module executed by a processor, or in a combination of the three. If implemented in software, the system functions may be stored on or transmitted over as one or more instructions or code on a tangible, non-transitory computer-readable medium. A software module may reside in random access memory (RAM), flash memory, read only memory (ROM), electrically programmable ROM (EPROM), electrically erasable programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

Those skilled in the art will appreciate that, in some embodiments, additional components and/or steps may be utilized, and disclosed components and/or steps may be combined or omitted.

The above description discloses embodiments of systems, apparatuses, devices, methods, and materials of the present disclosure. This disclosure is susceptible to modifications in the components, parts, elements, steps, and materials, as well as alterations in the fabrication methods and equipment. Such modifications will become apparent to those skilled in the art from a consideration of this disclosure or practice of the disclosure. Consequently, it is not intended that the disclosure be limited to the specific embodiments disclosed herein, but that it cover all modifications and alternatives coming within the scope and spirit of the described technology.

What is claimed is:

1. A method for collision avoidance between vulnerable road users (VRUs) and vehicles, the method comprising:
   first interrogating, at a communications server comprising a computing device and a first embedded algorithm for spatiotemporal trajectory prediction, a predicted spatiotemporal trajectory of at least one of a plurality of long-term evolution (LTE)-capable user equipment (UE) terminals, wherein each of the UE terminals is linked to either (i) one of a plurality of vehicles or (ii) one of a plurality of VRUs, wherein the communications server comprises a computing device and a first embedded algorithm for spatiotemporal trajectory prediction, wherein one or more of the VRUs is further linked to a non-Lambertian reflecting surface, and wherein the first interrogating comprises:
   receiving past and current spatiotemporal trajectory data from one or more sensors associated with the at least one UE terminal;
   storing the past and current spatiotemporal trajectory of the at least one UE terminal;
   computing the predicted spatiotemporal trajectory of each of the UE terminals;
   first determining whether a spatiotemporal distance between any one pair of the UE terminals is within a proximity range;
   obtaining a communications server notification in response to the first determining relating one of the pair of UE terminals linked to one of the vehicles and the other of the pair of UE terminals linked to one of the VRUs; and
   tagging the pair of UE terminals as notified UE terminals,
   the communications server further configured to control each of the notified UE terminals to perform second interrogating the predicted spatiotemporal proximity, wherein the second interrogating comprises:
   acknowledging the communications server notification;
   activating a first proximity signal including a modulated optical emission;
   activating a second proximity signal including a radio-frequency emission;
   computing the predicted spatiotemporal proximity based on the first and second proximity signals;
   second determining whether the predicted spatiotemporal proximity is within a proximity threshold limit;
   third determining whether a rate of approaching of the predicted spatiotemporal proximity is increasing; and
   providing a danger notification pertaining to road usage safety based on the first, second, and third determining.

2. The method of claim 1, wherein the communications server includes: a location service client (LCS) server, an LTE base station server, an LTE wireless network communications server, a gateway server, a cellular service provider server, a cloud server, or a combination thereof.

3. The method of claim 2, wherein the at least one UE terminal further comprises: a global navigation satellite systems (GNSS)-capable sensor, a global positioning system (GPS)-capable sensor, or a combination thereof.

4. The method of claim 3, wherein the at least one UE terminal includes: a smartphone, an Internet of Things (IoT) device, a tablet, an advanced driver assistant system (ADAS), an automated driving system (ADS), any other portable information terminal or mobile terminal, or a combination thereof.

5. The method of claim 4, wherein the LTE-capable UE terminals are configured to be implemented with 5G NR new radio access technology (RAT) developed by 3GPP for 5G mobile networks.

6. The method of claim 1, wherein the non-Lambertian reflecting surface includes: a corrugated surface, a woven surface, a textile surface, a retro-reflective surface, an off-specular reflection surface, a polarizing surface, a photonic-bandgap surface, or a combination thereof.

7. The method of claim 1, wherein the first embedded algorithm is configured to cause the computing device of the communications server to compute the predicted spatiotemporal trajectory based on the past and current spatiotemporal trajectory data comprising position, speed, acceleration, direction components, or a combination thereof, of the at least one UE terminal.

8. The method of claim 7, wherein the first embedded algorithm comprises: a dead reckoning algorithm, an artificial intelligence (AI) algorithm, a recurrent neural network (RNN) algorithm, a reinforcement learning (RL) algorithm, a conditional random fields (CRFs) algorithm, or a combination thereof.

9. The method of claim 8, wherein the first embedded algorithm is configured to cause the computing device of the communications server to: train a machine learning (ML) model based on the past and current spatiotemporal trajectory data comprising position, speed, acceleration, direction components, or a combination thereof, of the at least one UE terminal.

10. The method of claim 1, wherein the communications server notification comprises: a duet comprising a mobile equipment identifier (MEID) of a first one of the notified UE terminals linked to the vehicle, and an MEID of a second one of the notified UE terminals linked to the VRU.

11. A system for collision avoidance between vulnerable road users (VRUs) and vehicles, the system comprising:
   a communications server comprising a computing device and a first embedded algorithm for spatiotemporal trajectory prediction, the communications server configured to:
      predict a spatiotemporal trajectory of at least one of a plurality of user equipment (UE) terminals, wherein each of the UE terminals is linked to either (i) one of a plurality of vehicles or (ii) one of a plurality of VRUs, and wherein one or more of the VRUs is further linked to a non-Lambertian reflecting surface;
      receive past and current spatiotemporal trajectory data from one or more sensors associated with the at least one UE terminal;
      store the past and current spatiotemporal trajectory of the at least one UE terminal;
      compute the predicted spatiotemporal trajectory of each of the UE terminals;
      first determine whether the spatiotemporal distance between any one pair of the UE terminals is within a proximity range;
      obtain a communications server notification in response to the first determining relating to one of the pair of UE terminals linked to one of the vehicles and the other one of the pair of the UE terminals linked to one of the VRUs; and
      tag the pair of the UE terminals as notified UE terminals,
   the communications server further configured to control each of the notified UE terminals to:
      determine their relative spatiotemporal proximity;
      acknowledge the communications server notification;
      activate a first proximity signal including a modulated optical emission;
      activate a second proximity signal including a radio-frequency emission;
      compute the predicted spatiotemporal proximity using the processor device and the second embedded algorithm;
      second determine whether the predicted spatiotemporal proximity between the notified UE terminals is within a proximity threshold limit;
      third determine whether a rate of approaching of the predicted spatiotemporal proximity between the notified UE terminals is increasing; and
      provide a danger notification pertaining to road usage safety based on the first, second, and third determining.

12. The system of claim 11, wherein the communications server comprises: a location service client (LCS) server, an LTE base station server, an LTE wireless network communications server, a gateway server, a cellular service provider server, a cloud server, or a combination thereof.

13. The system of claim 12, wherein the at least one UE terminal further comprises: a global navigation satellite systems (GNSS)-capable sensor, a global positioning system (GPS)-capable sensor, or a combination thereof.

14. The system of claim 13, wherein the at least one UE terminal comprises: a smartphone, an Internet of Things (IoT) device, a tablet, an advanced driver assistant system (ADAS), an automated driving system (ADS), any other portable information terminal or mobile terminal, or a combination thereof.

15. The system of claim 14, wherein the LTE-capable UE terminals are configured to be implemented with 5G NR new radio access technology (RAT) developed by 3GPP for 5G mobile networks.

16. The system of claim 11, wherein the first embedded algorithm is configured to cause the computing device of the communications server to compute the predicted spatiotemporal trajectory based on the past and current spatiotemporal trajectory data comprising position, speed, acceleration, direction components, or a combination thereof, of the at least one UE terminal.

17. The system of claim 11, wherein the communications server notification comprises a duet comprising a mobile equipment identifier (MEID) of a first one of the notified UE terminals linked to the vehicle, and an MEID of a second one of the notified UE terminals linked to the VRU.

18. The system of claim 11, wherein the non-Lambertian reflecting surface includes: a corrugated surface, a woven surface, a textile surface, a retro-reflective surface, an off-specular reflection surface, a polarizing surface, a photonic-bandgap surface, or a combination thereof.

19. The system of claim 18, wherein the first proximity signal comprises: a light-emitting diode (LED) optical signal and/or a laser optical signal comprising visible or infrared wavelengths.

20. The method of claim 19, wherein the first proximity signal is configured to be modulated by time modulation, frequency modulation, phase modulation, polarization modulation, or a combination thereof.

* * * * *